(12) United States Patent
Wang et al.

(10) Patent No.: US 12,349,166 B2
(45) Date of Patent: Jul. 1, 2025

(54) METHOD FOR CHANNEL ESTABLISHMENT, BASE STATION AND MULTI-CELL MULTICAST COORDINATION ENTITY MCE

(71) Applicant: Samsung Electronics Co., Ltd., Suwon-si (KR)

(72) Inventors: Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 17/640,955

(22) PCT Filed: Sep. 9, 2020

(86) PCT No.: PCT/KR2020/012169
§ 371 (c)(1),
(2) Date: Mar. 7, 2022

(87) PCT Pub. No.: WO2021/049871
PCT Pub. Date: Mar. 18, 2021

(65) Prior Publication Data
US 2022/0322291 A1 Oct. 6, 2022

(30) Foreign Application Priority Data

Sep. 9, 2019 (CN) .......................... 201910849529.3
Sep. 25, 2019 (CN) .......................... 201910913790.5

(51) Int. Cl.
*H04H 20/71* (2008.01)
*H04W 4/06* (2009.01)
(Continued)

(52) U.S. Cl.
CPC ............. *H04W 72/30* (2023.01); *H04W 4/06* (2013.01); *H04W 76/10* (2018.02); *H04W 76/40* (2018.02); *H04L 12/189* (2013.01)

(58) Field of Classification Search
CPC ....... H04W 72/30; H04W 4/06; H04W 76/10; H04W 76/40; H04W 4/70; H04W 88/085; H04W 76/11; H04L 12/189
(Continued)

(56) References Cited

U.S. PATENT DOCUMENTS 9,025,511 B2 * 5/2015 Zhu ........................ H04W 4/06
370/312
11,678,388 B2 6/2023 Fiorani et al.
(Continued)

FOREIGN PATENT DOCUMENTS

CN 101483811 A 7/2009
CN 102378113 A 3/2012
(Continued)

OTHER PUBLICATIONS

Chinese Office Action dated Nov. 28, 2023, issued in Chinese Application No. 201910913790.5.
(Continued)

*Primary Examiner* — Chuong T Ho
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health
(Continued)

care, digital education, smart retail, security and safety services. Embodiments of the present disclosure provides a method for establish a channel, a base station, and a multi-cell multicast coordination entity (MCE), the method being applied in the base station and including: a point-to-point establishment request transmitted by a multi-cell multicast coordination entity (MCE) is received, the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU session), and a bearer establishment request is transmitted to a core network in accordance with the point-to-point establishment request, for determining that the point-to-point channel is successfully established and converting the point-to-multipoint channel to a point-to-point channel. The method provided by the present disclosure implements establishment of the point-to-point channel to a point-to-multipoint channel. The embodiments of the present application provide a multimedia broadcast and multicast service (MBMS) transmission method and device. The method is applied to a DU, comprising: receiving a first notification message transmitted by a CU; transmitting a first message to the CU; transmitting the MBMS notification message to the UE according to the first notification message, wherein the MBMS notification message is used to notify the UE to receive a message transmitted on a MBMS control channel; receiving an MBMS service start request message transmitted by the CU; transmitting a MBMS message to the UE, used for establishing an MBMS bearer and transmitting MBMS data. The method provided in the present application realizes the successful establishment of a MBMS bearer and the effective transmission of MBMS data under a separated architecture.

16 Claims, 32 Drawing Sheets

(51) Int. Cl.
*H04W 72/30* (2023.01)
*H04W 76/10* (2018.01)
*H04W 76/40* (2018.01)
*H04L 12/18* (2006.01)

(58) Field of Classification Search
USPC .................................................... 370/312
See application file for complete search history.

(56) References Cited

U.S. PATENT DOCUMENTS

| | | | |
|---|---|---|---|
| 2008/0045228 A1* | 2/2008 | Zhang | H04L 1/0026 455/450 |
| 2011/0149783 A1* | 6/2011 | Zhang | H04L 65/611 370/252 |
| 2011/0154421 A1 | 6/2011 | Chun | |
| 2012/0155364 A1 | 6/2012 | Kim et al. | |
| 2012/0224577 A1* | 9/2012 | Gou | H04W 4/06 370/390 |
| 2014/0153476 A1 | 6/2014 | Wang et al. | |
| 2015/0229677 A1* | 8/2015 | Gu | H04L 65/80 709/219 |
| 2017/0251341 A1 | 8/2017 | Frost et al. | |
| 2017/0251398 A1* | 8/2017 | Xu | H04W 28/10 |
| 2018/0213507 A1 | 7/2018 | Futaki et al. | |
| 2019/0174391 A1 | 6/2019 | Ode et al. | |
| 2020/0374352 A1* | 11/2020 | Ge | H04L 67/146 |
| 2020/0374947 A1 | 11/2020 | Jin et al. | |
| 2022/0174119 A1 | 6/2022 | Ge et al. | |

FOREIGN PATENT DOCUMENTS

| | | |
|---|---|---|
| CN | 102487482 A | 6/2012 |
| CN | 102769825 A | 11/2012 |
| CN | 102892078 A | 1/2013 |
| CN | 105519147 A | 4/2016 |
| CN | 106211200 A | 12/2016 |
| CN | 110035472 A | 7/2019 |
| CN | 110167051 A | 8/2019 |
| CN | 110167190 A | 8/2019 |
| WO | 2019/029520 A1 | 2/2019 |
| WO | 2019/057307 A1 | 3/2019 |
| WO | 2019/098918 A1 | 5/2019 |

OTHER PUBLICATIONS

Chinese Office Action dated Sep. 3, 2024, issued in Chinese Patent Application No. 2019108495293.
R3-174260, 3GPP TSG-RAN WG3 #98, Nov. 28, 2017, Reno, NV, USA.
Radiocommunication Study Groups, Document 5D/TEMP/148, Document 5D/TEMP/172-E, SWG IMT Specifications, Detailed specifications of the terrestrial radio interfaces of International Mobile Telecommunications—2020 (IMT-2020) [IMT-2020.SPECS], Jan. 22, 2018.
Chinese Notice of Allowance dated Mar. 13, 2024, issued in Chinese Application No. 201910913790.5.
Chinese Office Action dated Apr. 22, 2024, issued in Chinese Application No. 201910849529.3.
Chinese Office Action dated Nov. 29, 2024, issued in Chinese Application No. 201910849529.3.

* cited by examiner

FIG. 2

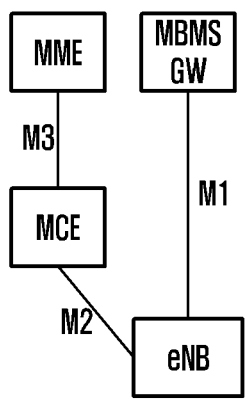

MBMS GW : MBMS Gateway
Multimedia Broadcast Multicast Service Gateway

MCE : Multi-Cell/Multicast Coordination Entity
Multi-cell multicast coordination entity M1 : userplane interface
Interface for user plane data transmission M2 : E-UTRAN internal control plane interface
Interface for transmitting related information of radio resource configuration and session control signaling M3 : control plane interface between E-UTRAN and EPC
Interface for communication on between MME and MCE

METHOD FOR CHANNEL ESTABLISHMENT, BASE STATION AND MULTI-CELL MULTICAST COORDINATION ENTITY MCE

TECHNICAL FIELD

The present disclosure relates to a field of wireless communication technologies, and in particular, to a method for channel establishment, a base station, and a multi-cell multicast coordination entity (MCE). Also the present application relates to a multimedia broadcast and multicast service transmission method and device.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The MBSFN transmission mode is suitable for broadcast multicast services with a large number of users and widely distributed users. Generally, the MBSFN area covers a range of multiple base stations, and the same resource needs to be allocated to multiple base stations, which is configured by an MCE and transmitted to base stations by an M2 interface. A conventional base station is a collective base station, and the functional entities of base stations are all on one physical entity. A new developing base station can have a separate architecture, and functional entities of the base station can be distributed on different physical entities. In this separate architecture, how to provide multicast services has not been involved before. And also in the separated architecture, How to achieve the successful establishment of an MBMS bearer in the separated architecture and the effective transmission of MBMS data is also not involved.

DISCLOSURE OF INVENTION

Technical Problem

A new developing base station can have a separate architecture, and functional entities of the base station can be distributed on different physical entities. However in this separate architecture, how to provide multicast services has not been involved before. And also in the separated architecture, How to achieve the successful establishment of an MBMS bearer in the separated architecture and the effective transmission of MBMS data is also not involved.

Solution to Problem

In view of the shortcomings of existing methods, the present disclosure proposes a method for channel establishment, a base station, and a multi-cell multicast coordination entity (MCE).

In a first aspect, a method for channel establishment is provided, which is applied to a base station and includes: receiving a point-to-point establishment request transmitted by a multi-cell multicast coordination entity (MCE), the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU Session); and transmitting a bearer establishment request to a core network in accordance with the point-to-point establishment request.

And in view of the shortcomings of the existing methods, the application proposes a multimedia broadcast and multicast service (MBMS) transmission method and device to solve the problem of how to successfully establish an MBMS bearer and effectively transmit MBMS data in a separated architecture.

In a second aspect, a multimedia broadcast and multicast service (MBMS) transmission method, which is applied to a distribution unit (DU) is provided, comprising: receiving a first notification message transmitted by a central control node (CU); transmitting a first message to the CU; transmitting a MBMS notification message to the UE according to the first notification message, wherein the MBMS notification message is used to notify the UE to receive a message transmitted on a MBMS control channel; receiving a MBMS service start request message transmitted by the CU; and transmitting a MBMS message to the UE, used for establishing a MBMS bearer and transmitting MBMS data.

Advantageous Effects of Invention

The technical solutions provided by the embodiments of the present disclosure have at least the following beneficial effects:

receiving a point-to-point establishment request transmitted by a multi-cell multicast coordination entity (MCE), the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU Session); transmitting a bearer establishment request to a core network in accordance with the point-to-point establishment request, for determining that the point-to-point channel is successfully established and converting the point-to-multipoint channel to a point-to-point channel; successfully establishing an MBMS bearer, and reducing signaling data, the number of interfaces, and delay of data transmission, and effectively transmitting multimedia broadcast multicast services.

Also, receiving a first notification message transmitted by the CU; transmitting a first message to the CU; transmitting a MBMS notification message to the UE according to the first notification message, wherein the MBMS notification message is used to notify the UE to receive a message transmitted on a MBMS control channel; receiving a MBMS service start request message transmitted by the CU; transmitting a MBMS message to the UE, used for establishing a MBMS bearer and transmitting MBMS data. In this way, under the separated architecture, the MBMS bearer is successfully established and the MBMS data is effectively transmitted.

BRIEF DESCRIPTION OF DRAWINGS

In order to more clearly illustrate the technical solutions in the embodiments of the present disclosure, the drawings used in the description of the embodiments of the present disclosure will be briefly described below.

FIG. 2 is an architecture diagram of an LTE MBMS;

MODE FOR THE INVENTION

Figure 1:
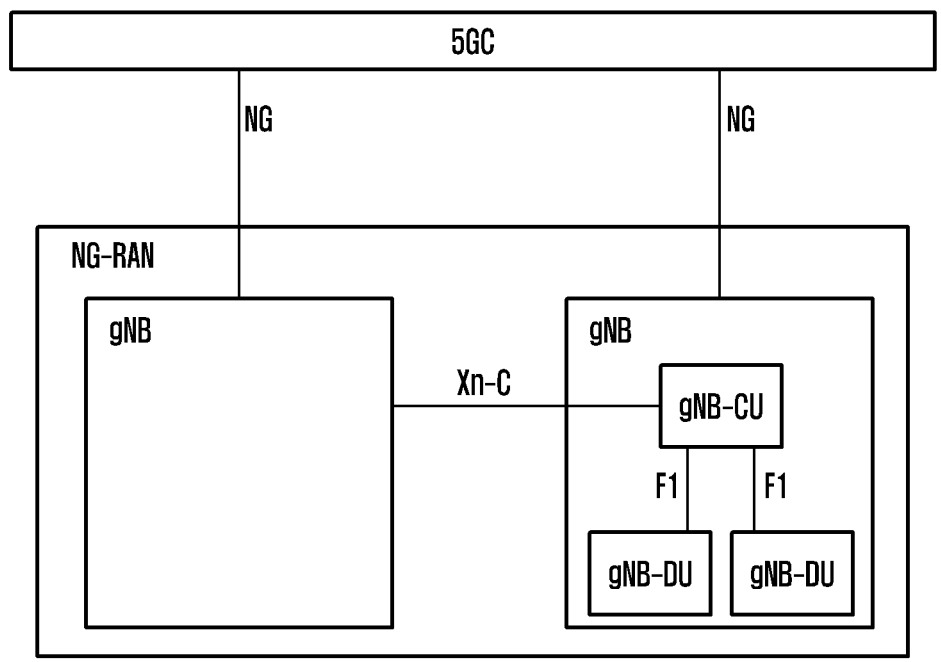
FIG. 1 is an architecture diagram of a 5G system in the prior art.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The MBSFN transmission mode is suitable for broadcast multicast services with a large number of users and widely distributed users. Generally, the MBSFN area covers a range of multiple base stations, and the same resource needs to be allocated to multiple base stations, which is configured by an MCE and transmitted to base stations by an M2 interface. A conventional base station is a collective base station, and the functional entities of base stations are all on one physical entity. A new developing base station can have a separate architecture, and functional entities of the base station can be distributed on different physical entities. In this separate architecture, how to provide multicast services has not been involved before. And also In the separated architecture, How to achieve the successful establishment of an MBMS bearer in the separated architecture and the effective transmission of MBMS data is also not involved.

A new developing base station can have a separate architecture, and functional entities of the base station can be distributed on different physical entities. However in this separate architecture, how to provide multicast services has not been involved before. And also in the separated architecture, How to achieve the successful establishment of an MBMS bearer in the separated architecture and the effective transmission of MBMS data is also not involved.

In view of the shortcomings of existing methods, the present disclosure proposes a method for channel establishment, a base station, and a multi-cell multicast coordination entity (MCE).

In a first aspect, a method for channel establishment is provided, which is applied to a base station and includes:

receiving a point-to-point establishment request transmitted by a multi-cell multicast coordination entity (MCE), the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU Session); and transmitting a bearer establishment request to a core network in accordance with the point-to-point establishment request.

In a second aspect, a method for channel establishment is provided, which is applied to an MCE and includes:

receiving an MBMS statistics report transmitted by a base station, the MBMS statistics report comprising the number of UEs receiving MBMS in a cell of the base station; and transmitting a point-to-point establishment request to the base station in accordance with the MBMS statistics report, the point-to-point establishment request being used to indicate establishment of a point-to-point channel and convert a point-to-multipoint channel into a point-to-point channel, and the point-to-point establishment request including at least one of an MBMS service identifier, a PDU Session identifier.

In a third aspect, a method for channel establishment is provided, which is applied to a base station and includes:

transmitting MBMS statistics report to a multi-cell multicast coordination entity (MCE);

receiving scheduling information transmitted by the MCE, the scheduling information including an MBMS service identifier and a transmission mode;

transmitting the scheduling information to an UE; and receiving a request message for establishing a point-to-point channel transmitted by the UE.

In a fourth aspect, a method for channel establishment is provided, which is applied to a base station and includes:

receiving a PDU Session establishment request transmitted by a core network, wherein the PDU Session establishment request is used to request the base station to establish a point-to-point channel, and the point-to-point channel includes a point-to-point UE dedicated channel;

transmitting an RRC reconfiguration request to the UE in accordance with the PDU Session establishment request, to establish the point-to-point UE dedicated channel;

receiving an RRC reconfiguration response transmitted by the UE;

transmitting a PDU Session establishment response message to the core network to confirm that the point-to-point UE dedicated channel is successfully established;

determining the number of UEs receiving MBMS, and transmitting an MBMS statistics report to the MCE, the MBMS statistics report comprising the number of UEs receiving MBMS in a cell of the base station;

receiving scheduling information transmitted by the MCE;

transmitting the scheduling information to the UE; and initiating a PDU Session release to the core network, in accordance with the scheduling information, to release a point-to-point channel.

In a fifth aspect, a method for channel establishment is provided, which is applied to an MCE and includes:

receiving an MBMS statistics report transmitted by a base station;

transmitting a service start request to a core network in accordance with the MBMS statistics report, to request the core network to transmit MBMS data to the base station via a point-to-multipoint channel;

receiving a service recovery request transmitted by the core network, to determine that the core network transmits MBMS data to the base station via a point-to-multipoint channel; and transmitting scheduling information to the base station, such that the base station releases the point-to-point channel and converts the point-to-point channel into a point-to-multipoint channel.

In a sixth aspect, a base station is provided, including:

a first processing module, configured to receive a point-to-point establishment request transmitted by a multi-cell multicast coordination entity (MCE), the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU Session); and a second processing module, configured to transmit a bearer establishment request to a core network in accordance with the point-to-point establishment request.

In a seventh aspect, an MCE is provided, including:

a third processing module, configured to receive an MBMS statistics report transmitted by a base station, wherein the MBMS statistics report includes the number of UEs receiving MBMS in a cell of the base station; and a fourth processing module, configured to transmit a point-to-point establishment request to the base station in accordance with the MBMS statistics report, the point-to-point establishment request being used to indicate establishment of a point-to-point channel and convert a point-to-multipoint channel into a point-to-point channel, and the point-to-point establishment request including at least one of an MBMS service identifier, a PDU Session identifier.

In an eighth aspect, a base station is provided, including:

a fifth processing module, configured to transmit an MBMS statistics report to a multi-cell multicast coordination entity (MCE);

a sixth processing module, configured to receive scheduling information transmitted by the MCE, the scheduling information including an MBMS service identifier and a transmission mode;

a seventh processing module, configured to transmit the scheduling information to an UE; and an eighth processing module, configured to receive a request message for establishing a point-to-point channel transmitted by the UE.

In a ninth aspect, a base station is provided, including:

an eleventh processing module, configured to receive a PDU Session establishment request transmitted by a core network, wherein the PDU Session establishment request is used to request the base station to establish a point-to-point channel, and the point-to-point channel includes a point-to-point UE dedicated channel;

a twelfth processing module, configured to transmit an RRC reconfiguration request to an UE in accordance with the PDU Session establishment request, to establish the point-to-point UE dedicated channel;

a thirteenth processing module, configured to receive the RRC reconfiguration response transmitted by the UE;

a fourteenth processing module, configured to transmit a PDU Session establishment response message to the core network to confirm that the point-to-point UE dedicated channel is successfully established;

a fifteenth processing module, configured to determine the number of UEs receiving MBMS, and transmit an MBMS statistics report to the MCE, the MBMS statistics report comprising the number of UEs receiving MBMS in a cell of the base station;

a sixteenth processing module, configured to receive scheduling information transmitted by the MCE;

a seventeenth processing module, configured to transmit the scheduling information to the UE; and an eighteenth processing module, configured to initiate a PDU Session release to the core network, in accordance with the scheduling information, to release a point-to-point channel.

In a tenth aspect, an MCE is provided, including:

a nineteenth processing module, configured to receive an MBMS statistics report transmitted by a base station;

a twentieth processing module, configured to transmit a service start request to a core network in accordance with the MBMS statistics report, to request the core network to transmit MBMS data to the base station through a point-to-multipoint channel;

a twenty-first processing module, configured to receive a service recovery request transmitted by the core network, to determine that the core network transmits MBMS data to the base station through a point-to-multipoint channel; and a twenty-second processing module, configured to transmit scheduling information to the base station, such that the base station releases the point-to-point channel and converts the point-to-point channel into a point-to-multipoint channel.

The technical solutions provided by the embodiments of the present disclosure have at least the following beneficial effects:

receiving a point-to-point establishment request transmitted by a multi-cell multicast coordination entity (MCE), the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU Session); transmitting a bearer establishment request to a core network in accordance with the point-to-point establishment request, for determining that the point-to-point channel is successfully established and converting the point-to-multipoint channel to a point-to-point channel; successfully establishing an MBMS bearer, and reducing signaling data, the number of interfaces, and delay of data transmission, and effectively transmitting multimedia broadcast multicast services.

In view of the shortcomings of the existing methods, the application proposes a multimedia broadcast and multicast service (MBMS) transmission method and device to solve the problem of how to successfully establish an MBMS bearer and effectively transmit MBMS data in a separated architecture.

In a first aspect, a multimedia broadcast and multicast service (MBMS) transmission method, which is applied to a distribution unit (DU) is provided, comprising:

receiving a first notification message transmitted by a central control node (CU);

transmitting a first message to the CU;

transmitting a MBMS notification message to the UE according to the first notification message, wherein the MBMS notification message is used to notify the UE to receive a message transmitted on a MBMS control channel;

receiving a MBMS service start request message transmitted by the CU; and transmitting a MBMS message to the UE, used for establishing a MBMS bearer and transmitting MBMS data.

In a second aspect, a MBMS transmission method, which is applied to a CU is provided, comprising:

receiving a MBMS service start request message transmitted by a core network;

transmitting a first notification message to the DU according to the MBMS service start request message, wherein the first notification message is used to notify the DU to transmit a MBMS notification message to the UE;

receiving a first message transmitted by the DU; and transmitting a MBMS service start response message to the core network according to the first message, and transmitting the MBMS service start request message to the UE, used for establishing a MBMS bearer and transmitting MBMS data.

In a third aspect, a MBMS transmission method, which is applied to a control plane of a central control node (CU-CP) is provided, comprising:

receiving a MBMS service start request message transmitted by a multi-cell multicast coordination entity (MCE);

transmitting a first notification message to the DU according to the MBMS service start request message, wherein the first notification message is used to notify the DU to transmit a MBMS notification message to the UE;

receiving a first message transmitted by the DU;

transmitting a MBMS service start response message to the MCE according to the first message;

receiving a MBMS scheduling information request message transmitted by the MCE; and transmitting a MBMS scheduling information response message to the MCE according to the MBMS scheduling information request message, and transmitting a MBMS control message to the DU, used for establishing a MBMS bearer and transmitting MBMS data.

In a fourth aspect, a MBMS transmission method, which is applied to an MCE is provided, comprising:

receiving a MBMS service start request message transmitted by a core network;

transmitting the MBMS service start request message to a CU-CP;

receiving a MBMS service request response message transmitted by the CU-CP; and transmitting the MBMS service request response message to the core network according to the MBMS service request response message, and transmitting a MBMS scheduling information request message to the CU-CP, used for establishing an MBMS bearer and transmitting MBMS data, wherein the MBMS scheduling information request message includes at least one of a MCCH update time and configuration information of a MBMS data channel.

In a fifth aspect, a MBMS transmission method, which is applied to an MCE is provided, comprising:

transmitting a user statistics message to a CU or CU-CP, used for determining the number of users that receive a MBMS service in a cell;

receiving a user statistics response message transmitted by the CU or the CU-CP, used for determining that the CU or the CU-CP receives the user statistics message; and receiving a user statistics report message transmitted by the CU or the CU-CP, used for establishing a MBMS bearer and transmitting MBMS data, wherein the user statistics report message includes at least one of an identifier of a service for performing user statistics, an identifier of a SFN area, an identifier of the cell where a UE is located, and a number of users.

In a sixth aspect, a DU is provided, comprising:

a first processing module, configured to receive a first notification message transmitted by a CU;

a second processing module, configured to transmit a first message to the CU;

a third processing module, configured to transmit a MBMS notification message to a UE according to the first notification message, wherein the MBMS notification message is used to notify the UE to receive a message transmitted on a MBMS control channel;

a fourth processing module, configured to receive a MBMS service start request message transmitted by the CU; and a fifth processing module, configured to transmit a MBMS message to the UE, used for establishing a MBMS bearer and transmitting MBMS data.

In a seventh aspect, a CU is provided, comprising:

a sixth processing module, configured to receive a MBMS service start request message transmitted by a core network;

a seventh processing module, configured to transmit a first notification message to a DU according to the MBMS service start request message, wherein the first notification message is used to notify the DU to transmit a MBMS notification message to a UE;

an eighth processing module, configured to receive a first message transmitted by the DU; and a ninth processing module, configured to transmit a MBMS service start response message to the core network and transmit a MBMS service start request message to the DU according to the first message, used for establishing a MBMS bearer and transmitting MBMS data.

In an eighth aspect, a CU-CP is provided, comprising:

a tenth processing module, configured to receive a MBMS service start request message transmitted by a MCE;

an eleventh processing module, configured to transmit a first notification message to a DU according to the MBMS service start request message, wherein the first notification message is used to notify the DU to transmit a MBMS notification message to a UE;

a twelfth processing module, configured to receive a first message transmitted by the DU;

a thirteenth processing module, configured to transmit a MBMS service start response message to the MCE according to the first message;

a fourteenth processing module, configured to receive a MBMS scheduling information request message transmitted by the MCE; and a fifteenth processing module, configured to transmit a MBMS scheduling information response message to the MCE according to the MBMS scheduling information request message, and transmit a MBMS control message to the DU, used for establishing a MBMS bearer and transmitting MBMS data.

In a ninth aspect, a MCE is provided, comprising:

a sixteenth processing module, configured to receive a MBMS service start request message transmitted by a core network;

a seventeenth processing module, configured to transmit the MBMS service start request message to a CU-CP;

an eighteenth processing module, configured to receive a MBMS service request response message transmitted by the CU-CP; and a nineteenth processing module, configured to transmit the MBMS service request response message to the core network according to the MBMS service request response message, and transmit a MBMS scheduling information request message to the CU-CP, used for establishing a MBMS bearer and transmitting MBMS data, wherein the MBMS scheduling information request message includes at least one of a MCCH update time and configuration information of a MBMS data channel.

In a tenth aspect, a MCE is provided, comprising:

a twentieth processing module, configured to transmit a user statistics message to a CU or a CU-CP, and configured to determine a number of users that receive a MBMS service in a cell;

a twenty-first processing module, configured to receive a user statistics response message transmitted by the CU or the CU-CP, and configured to determine that the CU or the CU-CP receives the user statistics message; and a twenty-second processing module, configured to receive a user statistics report message transmitted by the CU or the CU-CP, used for establishing a MBMS bearer and transmitting MBMS data, wherein the user statistics report message includes at least one of an identifier of a service for performing user statistics, an identifier of a SFN area, an identifier of a cell where a UE is located, and a number of users.

The technical solutions provided in the embodiments of the present application have at least the following beneficial effects:

receiving a first notification message transmitted by the CU; transmitting a first message to the CU; transmitting a MBMS notification message to the UE according to the first notification message, wherein the MBMS notification message is used to notify the UE to receive a message transmitted on a MBMS control channel; receiving a MBMS service start request message transmitted by the CU; transmitting a MBMS message to the UE, used for establishing a MBMS bearer and transmitting MBMS data. In this way, under the separated architecture, the MBMS bearer is successfully established and the MBMS data is effectively transmitted.

Additional aspects and advantages of the present application will be given in the following description, which will become apparent from the following description or be learned through the practice of the present application.

In order to more clearly illustrate the technical solutions in the embodiments of the present disclosure, the drawings used in the description of the embodiments of the present disclosure will be briefly described below.

Figure 3:
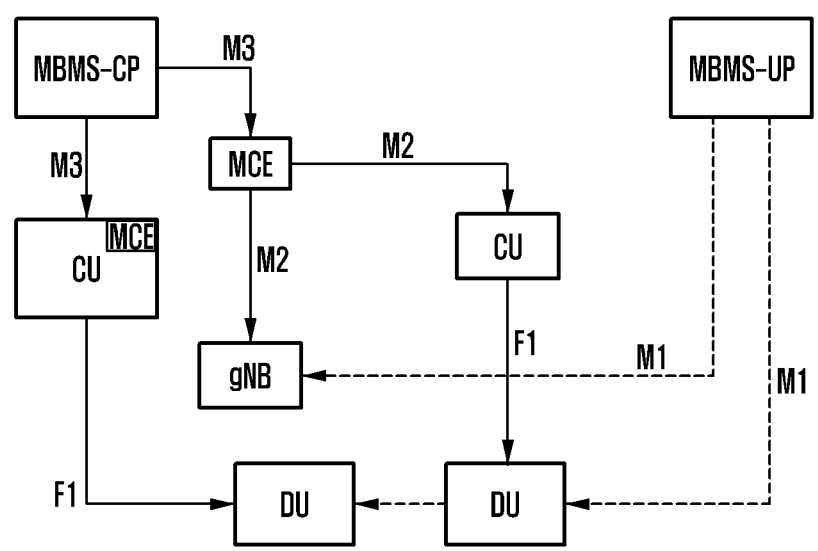
FIG. 3 is an architecture diagram of a network provided by an embodiment of the present disclosure.
Figure 4:
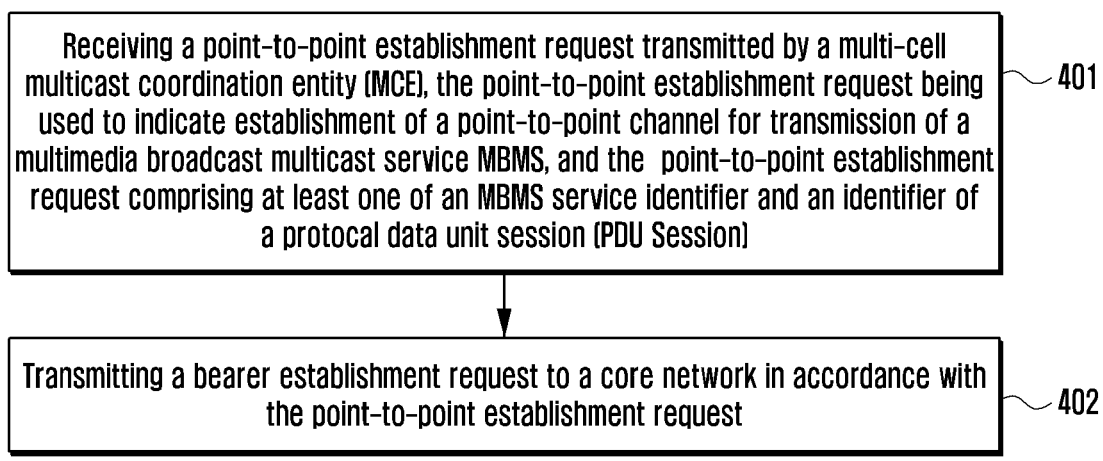
FIG. 4 is a schematic flowchart of a method for channel establishment provided by an embodiment of the present disclosure.
Figure 5:
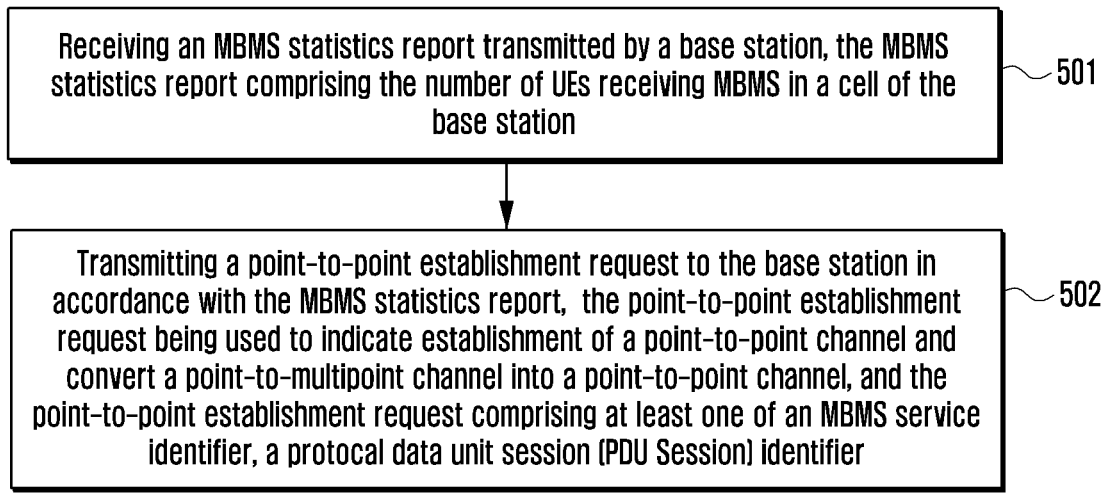
FIG. 5 is a schematic flowchart diagram of another method for channel establishment provided by an embodiment of the present disclosure.
Figure 6:
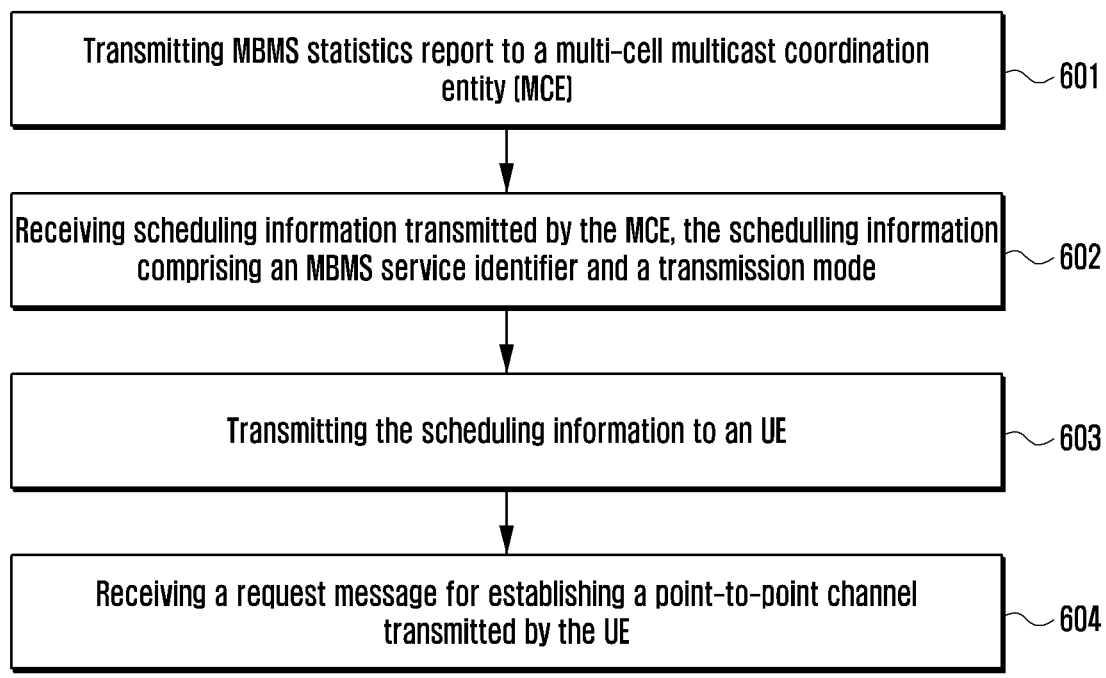
FIG. 6 is a schematic flowchart diagram of another method for channel establishment provided by an embodiment of the present disclosure.
Figure 7:
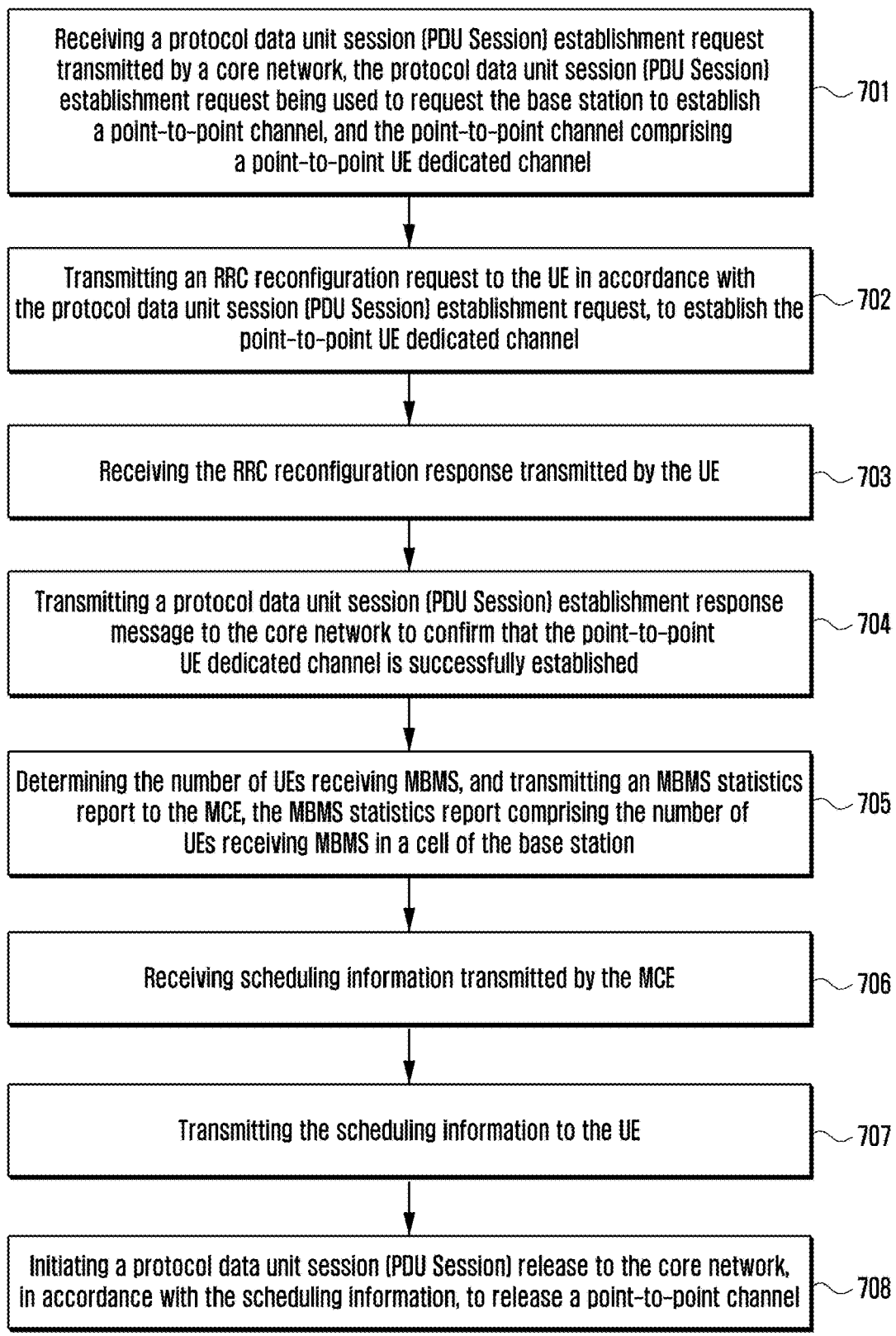
FIG. 7 is a schematic flowchart of another method for channel establishment provided by an embodiment of the present disclosure.
Figure 8:
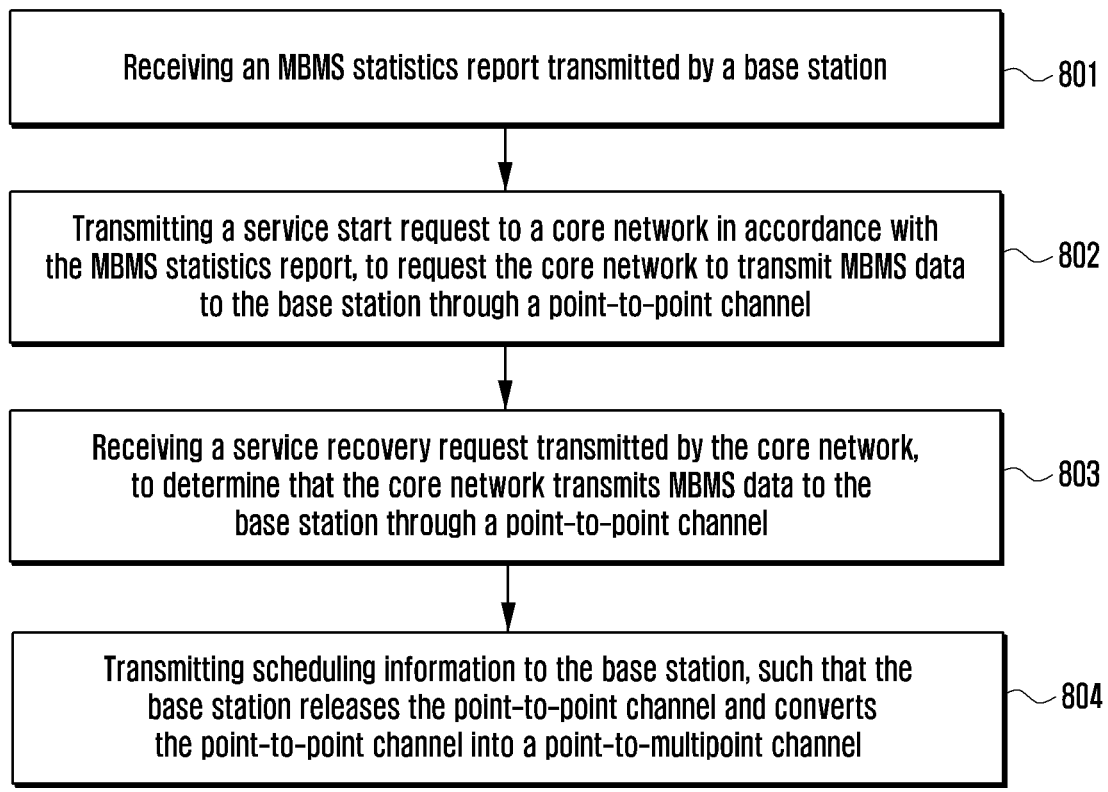
FIG. 8 is a schematic flowchart diagram of another method for channel establishment provided by an embodiment of the present disclosure.
Figure 9:
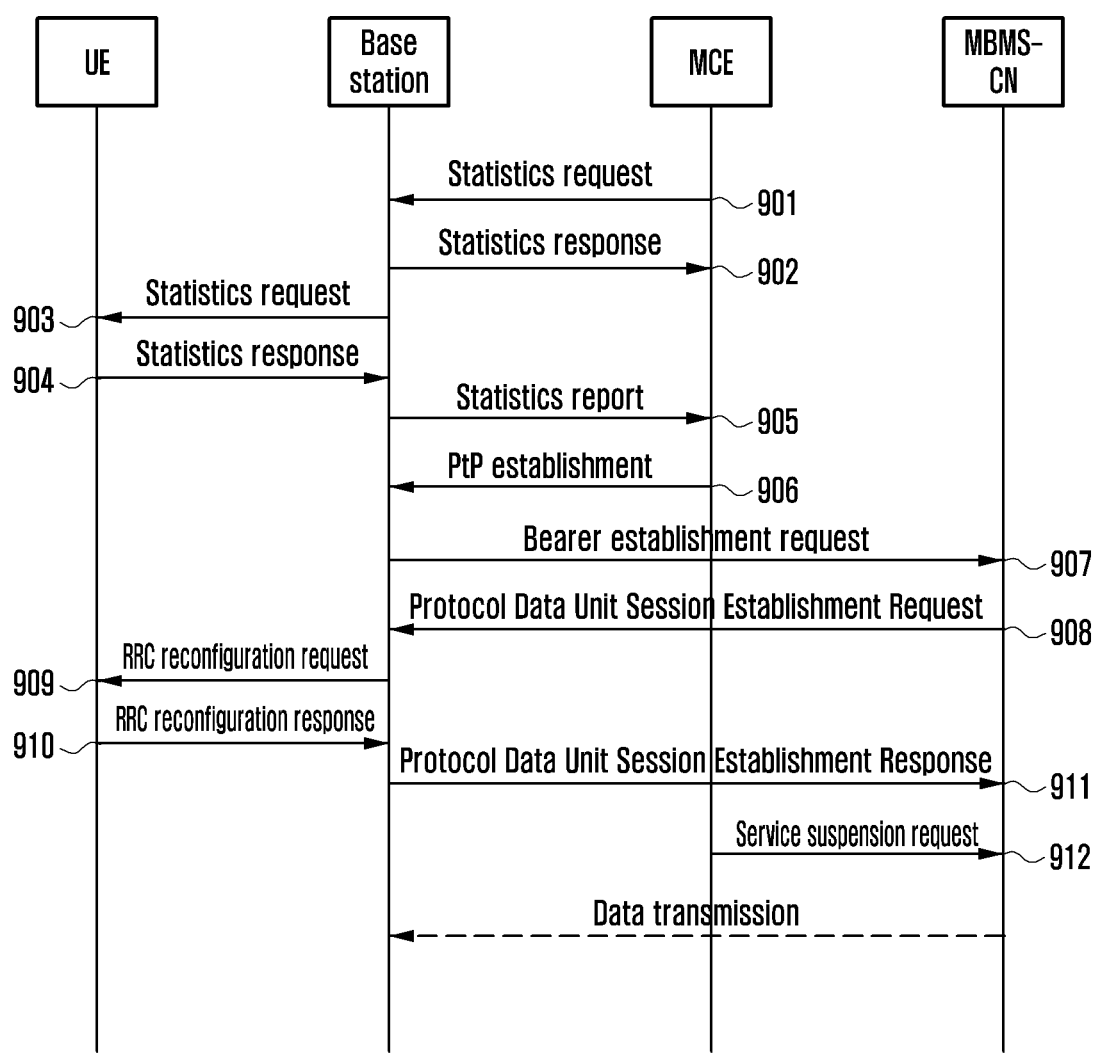
FIG. 9 is a schematic diagram of conversion from multipoint transmission to single-point transmission provided by an embodiment of the present disclosure.
Figure 10:
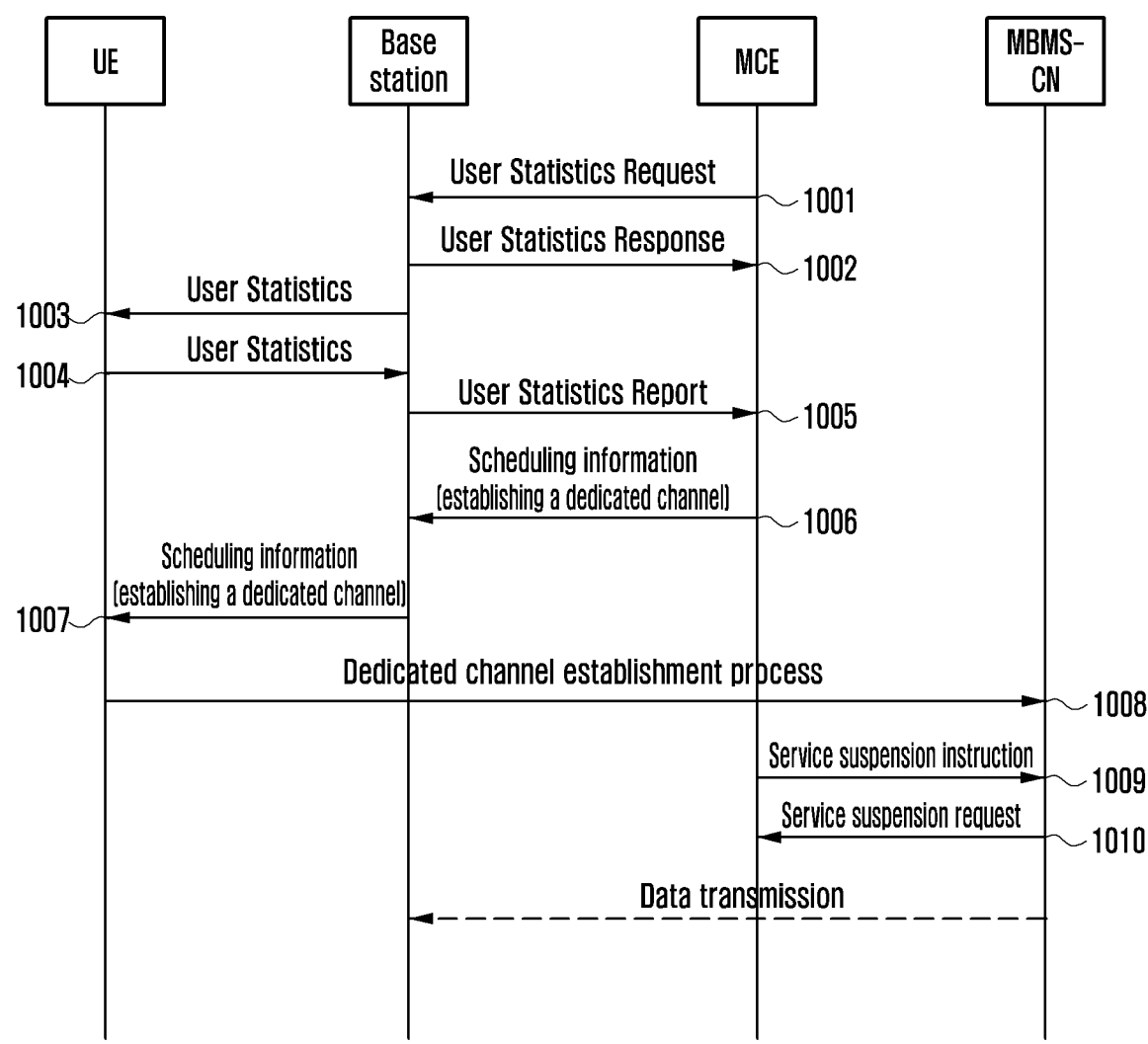
FIG. 10 is a schematic diagram of conversion from multipoint transmission to single-point transmission provided by an embodiment of the present disclosure.
Figure 11:
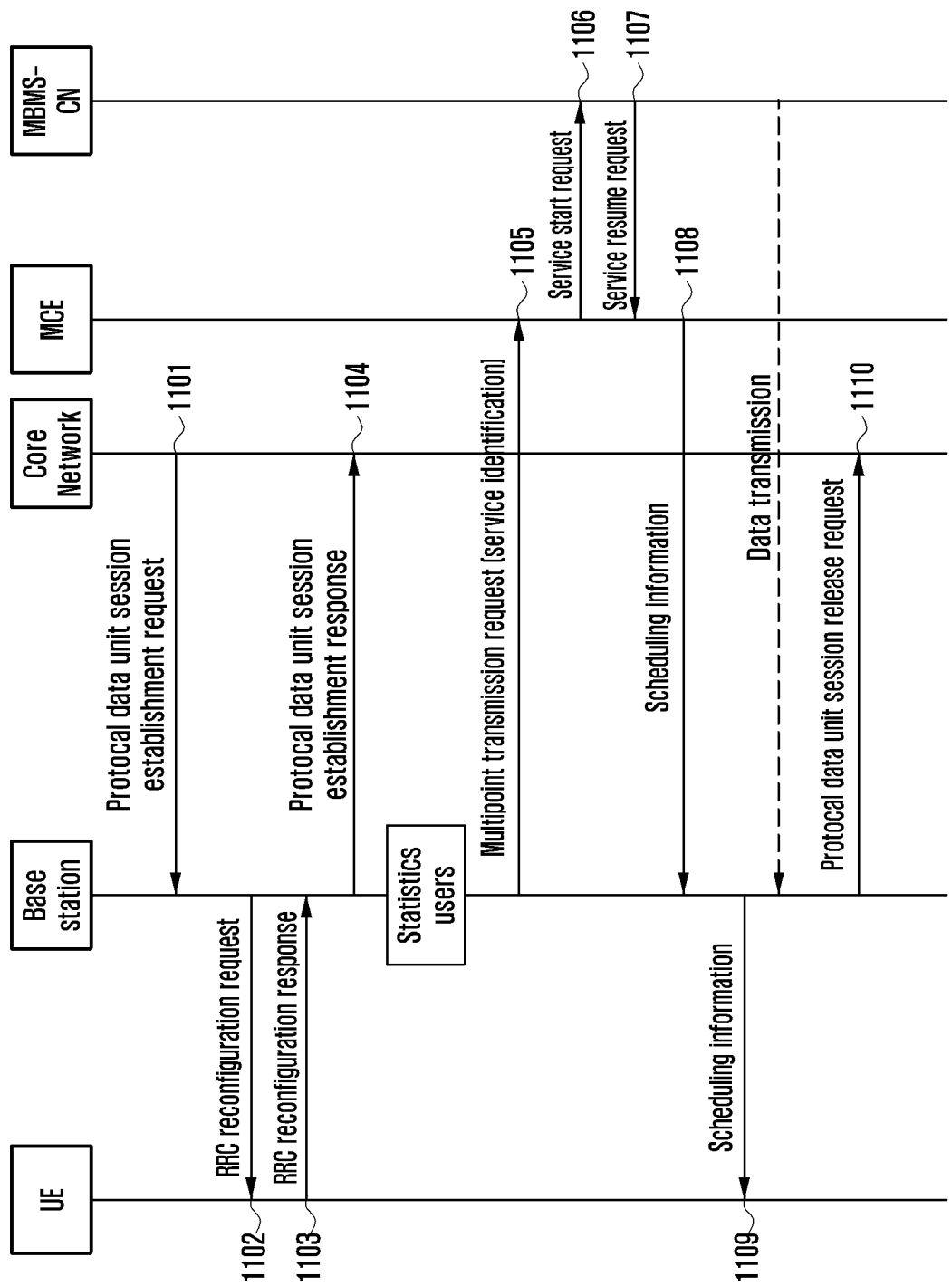
FIG. 11 is a schematic diagram of conversion from single-point transmission to multipoint transmission provided by an embodiment of the present disclosure.
Figure 12:
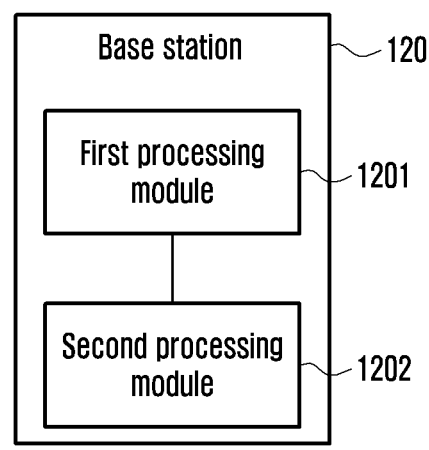
FIG. 12 is a schematic structural diagram of a base station provided by an embodiment of the present disclosure.
Figure 13:
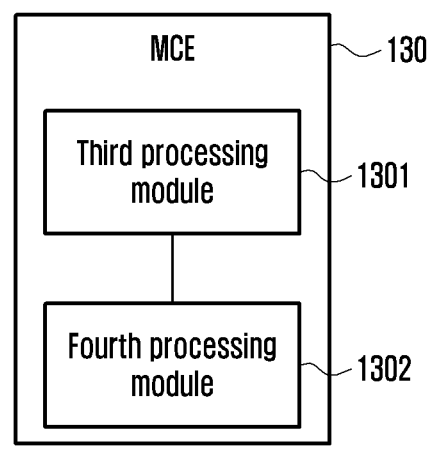
FIG. 13 is a schematic structural diagram of an MCE provided by an embodiment of the present disclosure.
Figure 14:
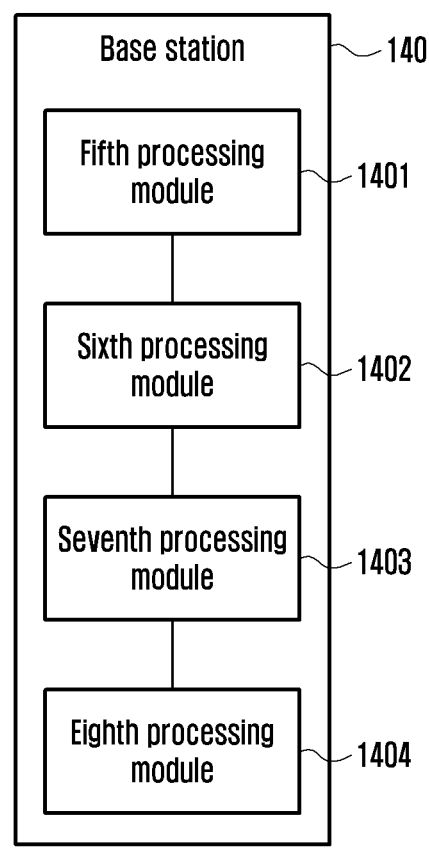
FIG. 14 is a schematic structural diagram of another base station provided by an embodiment of the present disclosure.
Figure 15:
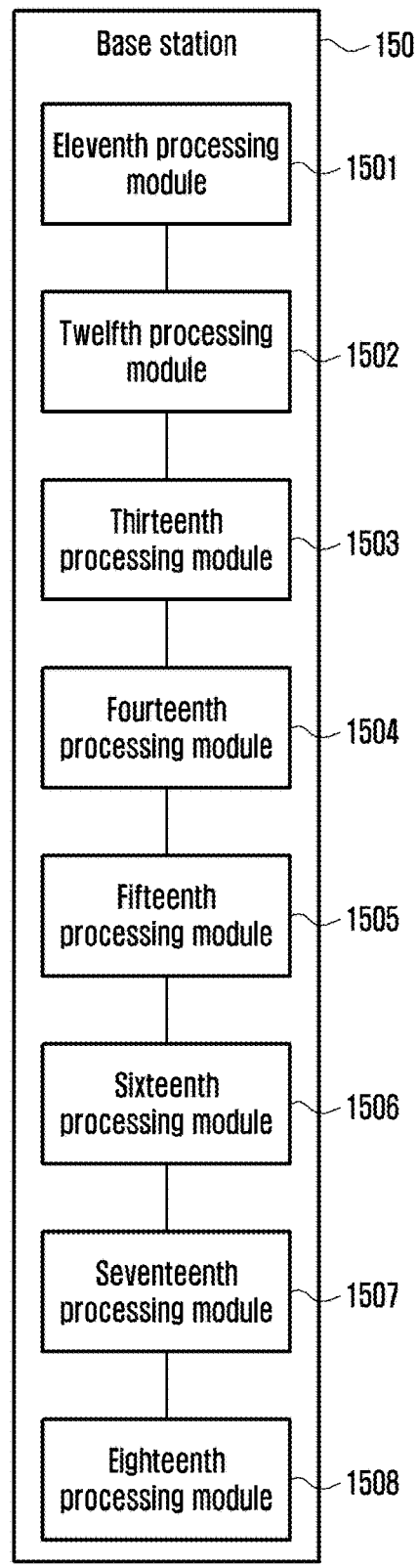
FIG. 15 is a schematic structural diagram of another base station provided by an embodiment of the present disclosure.
Figure 16:
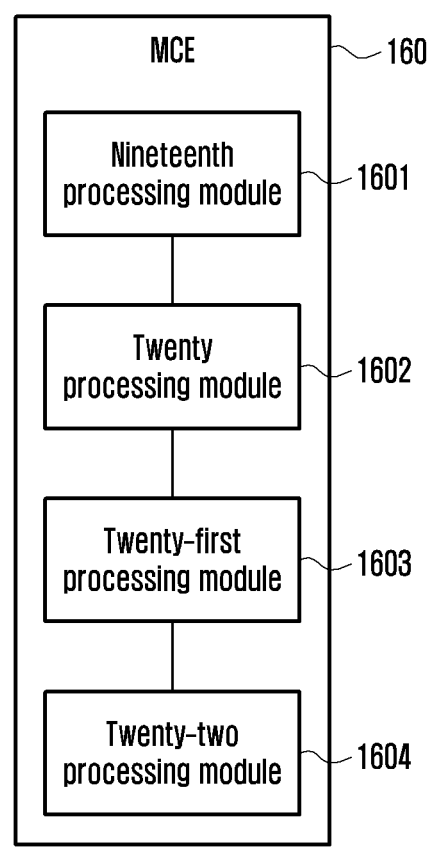
FIG. 16 is a schematic structural diagram of another MCE provided by an embodiment of the present disclosure.

FIG. 1 is an architecture diagram of a 5G system in the prior art;

FIG. 2 is an architecture diagram of an LTE MBMS;

FIG. 3 is an architecture diagram of a network provided by an embodiment of the present disclosure;

FIG. 4 is a schematic flowchart of a method for channel establishment provided by an embodiment of the present disclosure;

FIG. 5 is a schematic flowchart diagram of another method for channel establishment provided by an embodiment of the present disclosure;

FIG. 6 is a schematic flowchart diagram of another method for channel establishment provided by an embodiment of the present disclosure;

FIG. 7 is a schematic flowchart of another method for channel establishment provided by an embodiment of the present disclosure;

FIG. 8 is a schematic flowchart diagram of another method for channel establishment provided by an embodiment of the present disclosure;

FIG. 9 is a schematic diagram of conversion from multipoint transmission to single-point transmission provided by an embodiment of the present disclosure;

FIG. 10 is a schematic diagram of conversion from multipoint transmission to single-point transmission provided by an embodiment of the present disclosure;

FIG. 11 is a schematic diagram of conversion from single-point transmission to multipoint transmission provided by an embodiment of the present disclosure;

FIG. 12 is a schematic structural diagram of a base station provided by an embodiment of the present disclosure;

FIG. 13 is a schematic structural diagram of an MCE provided by an embodiment of the present disclosure;

FIG. 14 is a schematic structural diagram of another base station provided by an embodiment of the present disclosure;

FIG. 15 is a schematic structural diagram of another base station provided by an embodiment of the present disclosure; and FIG. 16 is a schematic structural diagram of another MCE provided by an embodiment of the present disclosure.

Figure 17:
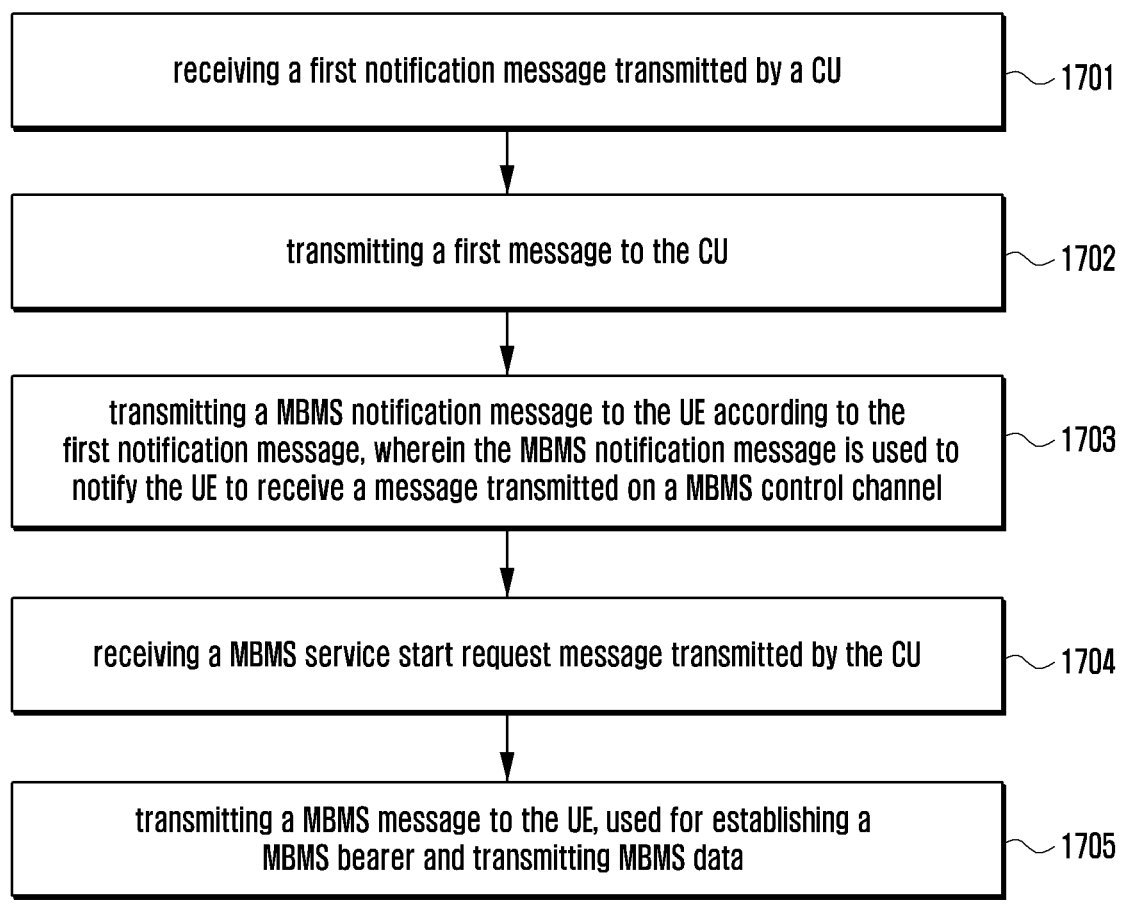
FIG. 17 is a schematic flowchart of an MBMS transmission method according to an embodiment of the present application.
Figure 18:
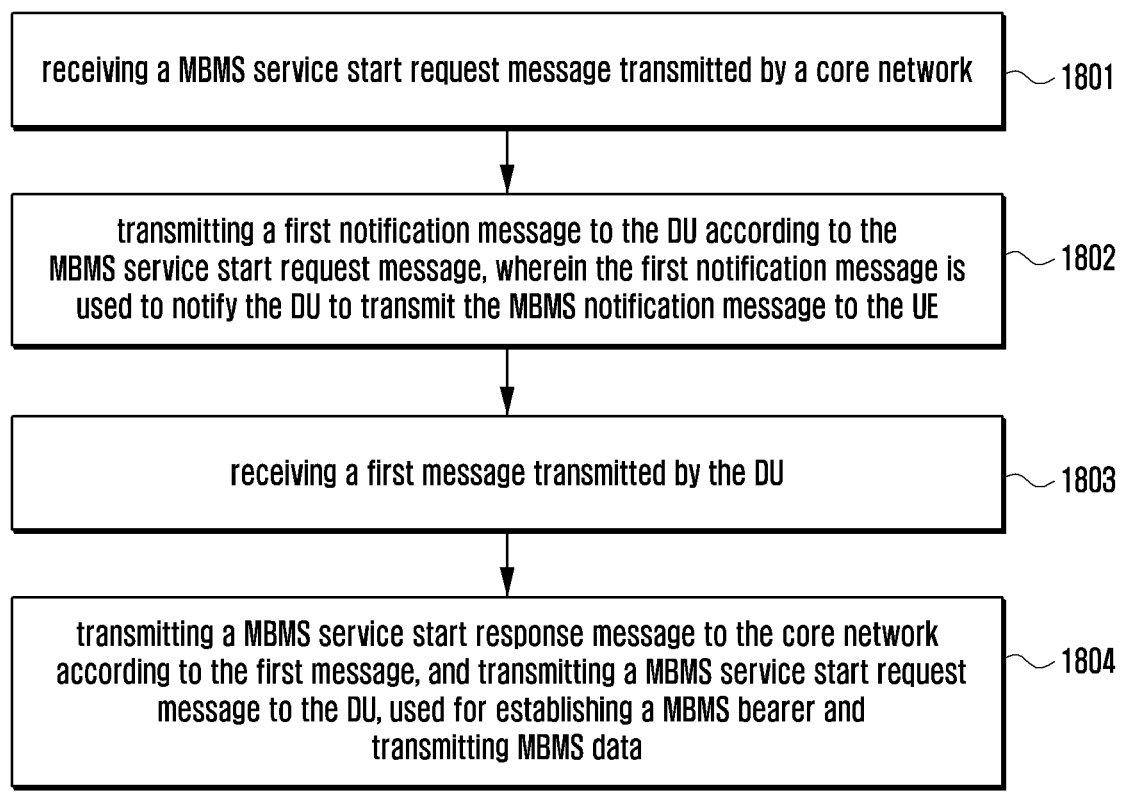
FIG. 18 is a schematic flowchart of another MBMS transmission method according to an embodiment of the present application.
Figure 19:
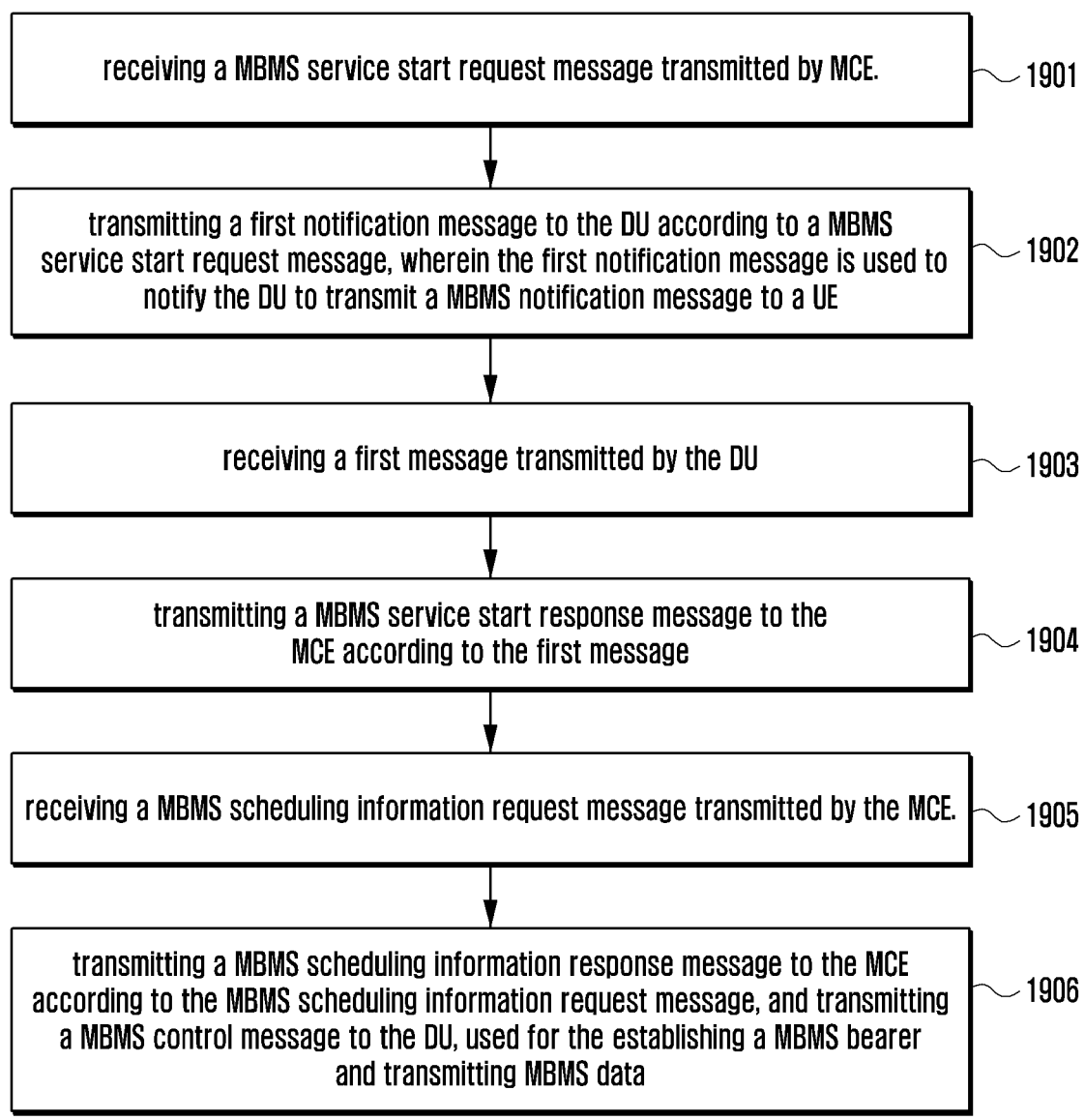
FIG. 19 is a schematic flowchart of another MBMS transmission method according to an embodiment of the present application.
Figure 20:
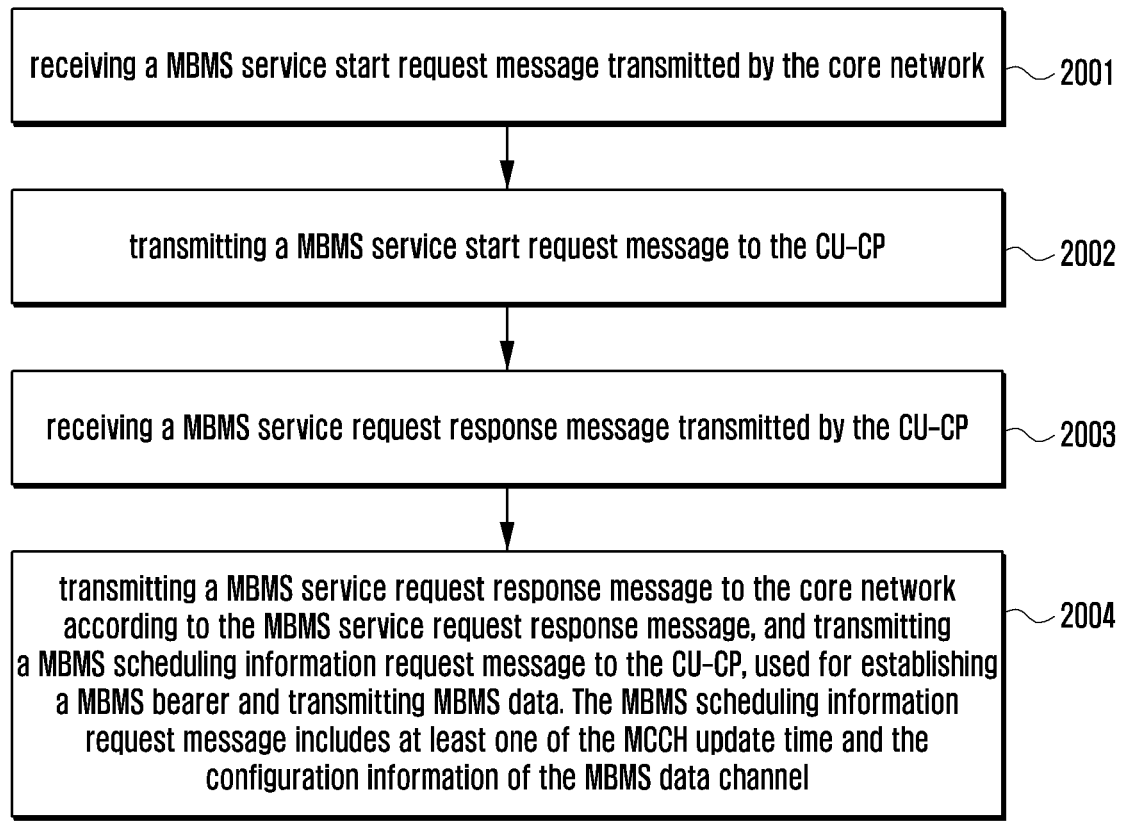
FIG. 20 is a schematic flowchart of another MBMS transmission method according to an embodiment of the present application.
Figure 21:
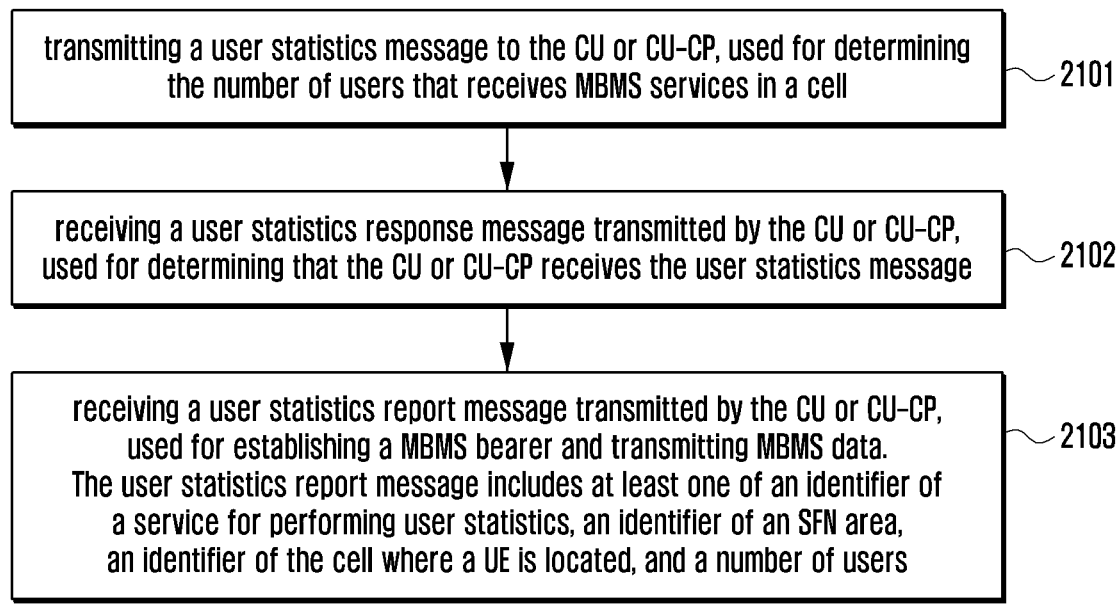
FIG. 21 is a schematic flowchart of another MBMS transmission method according to an embodiment of the present application.
Figure 22:
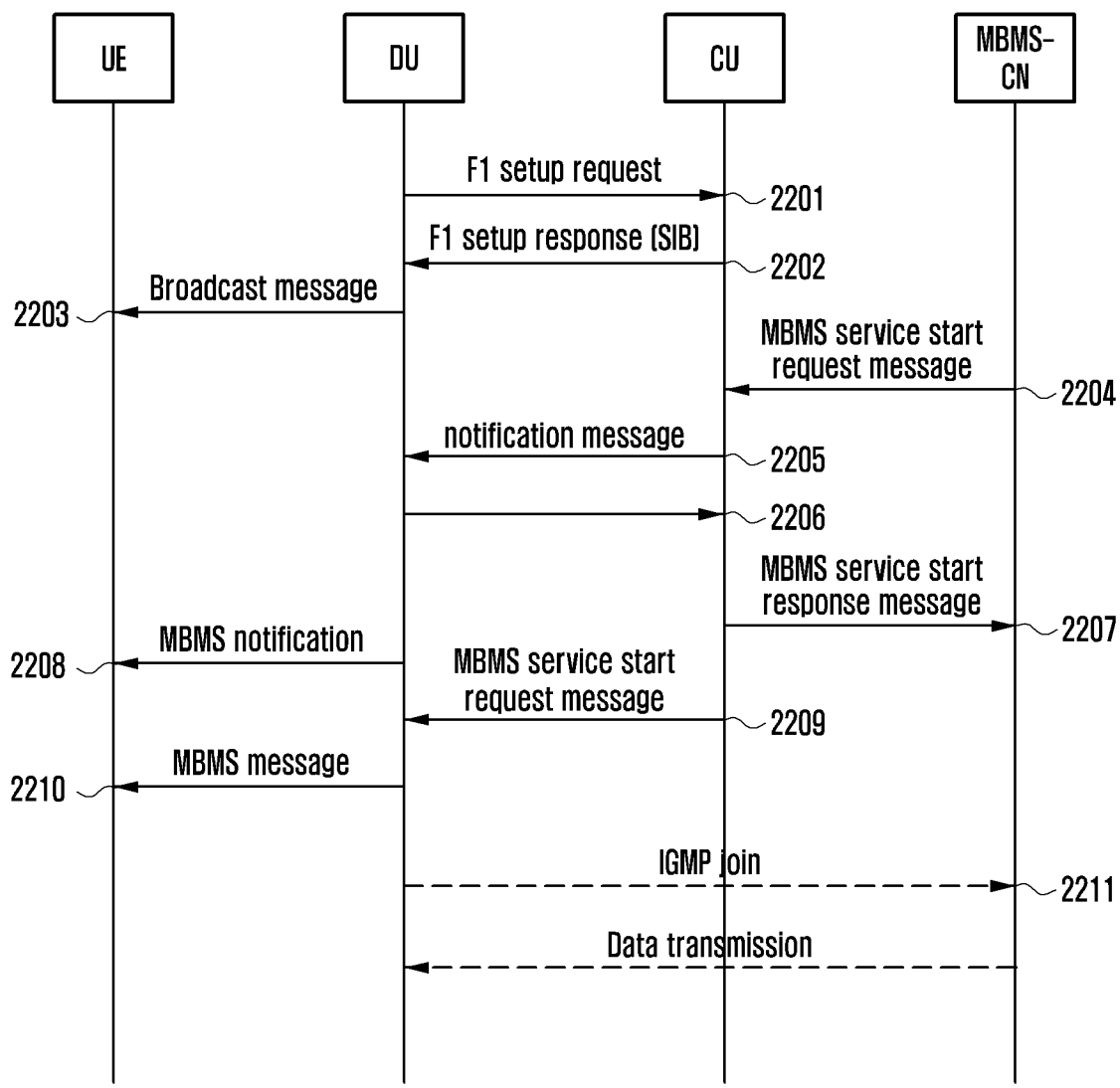
FIG. 22 is a schematic diagram of a MBMS bearer setup process provided by an embodiment of the present application.
Figure 23:
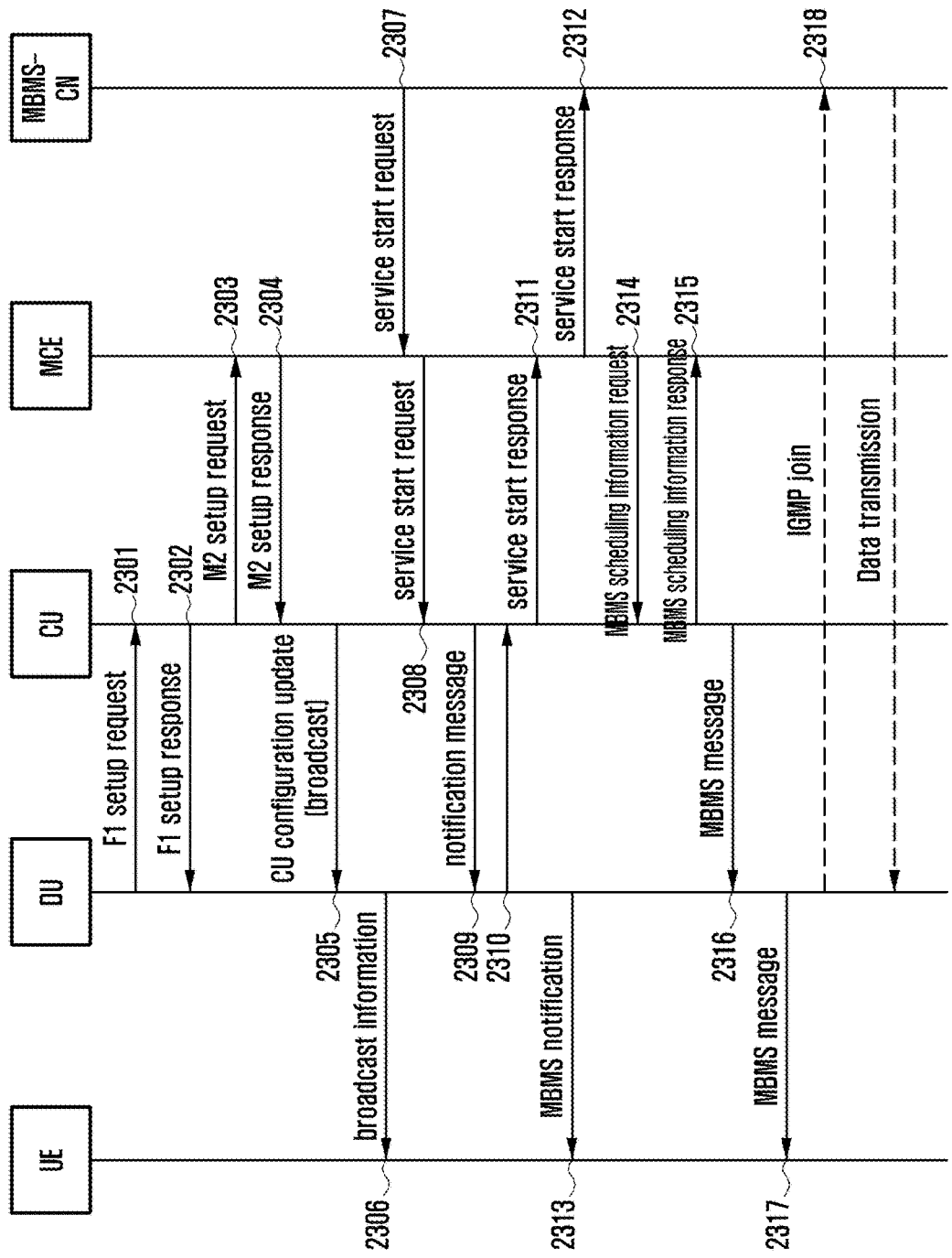
FIG. 23 is a schematic diagram of a MBMS bearer setup process provided by an embodiment of the present application.
Figure 24:
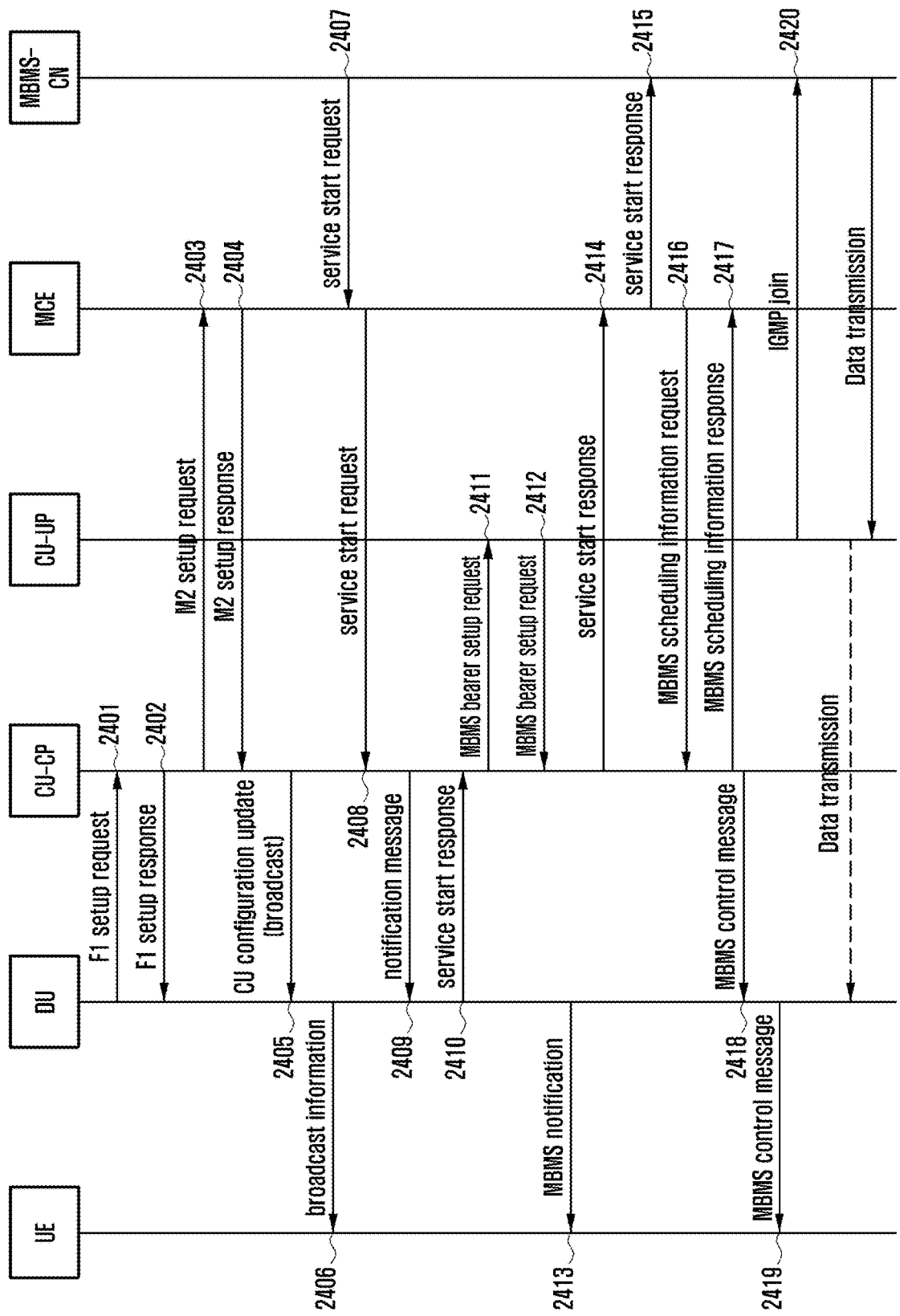
FIG. 24 is a schematic diagram of a MBMS bearer setup process provided by an embodiment of the present application.
Figure 25:
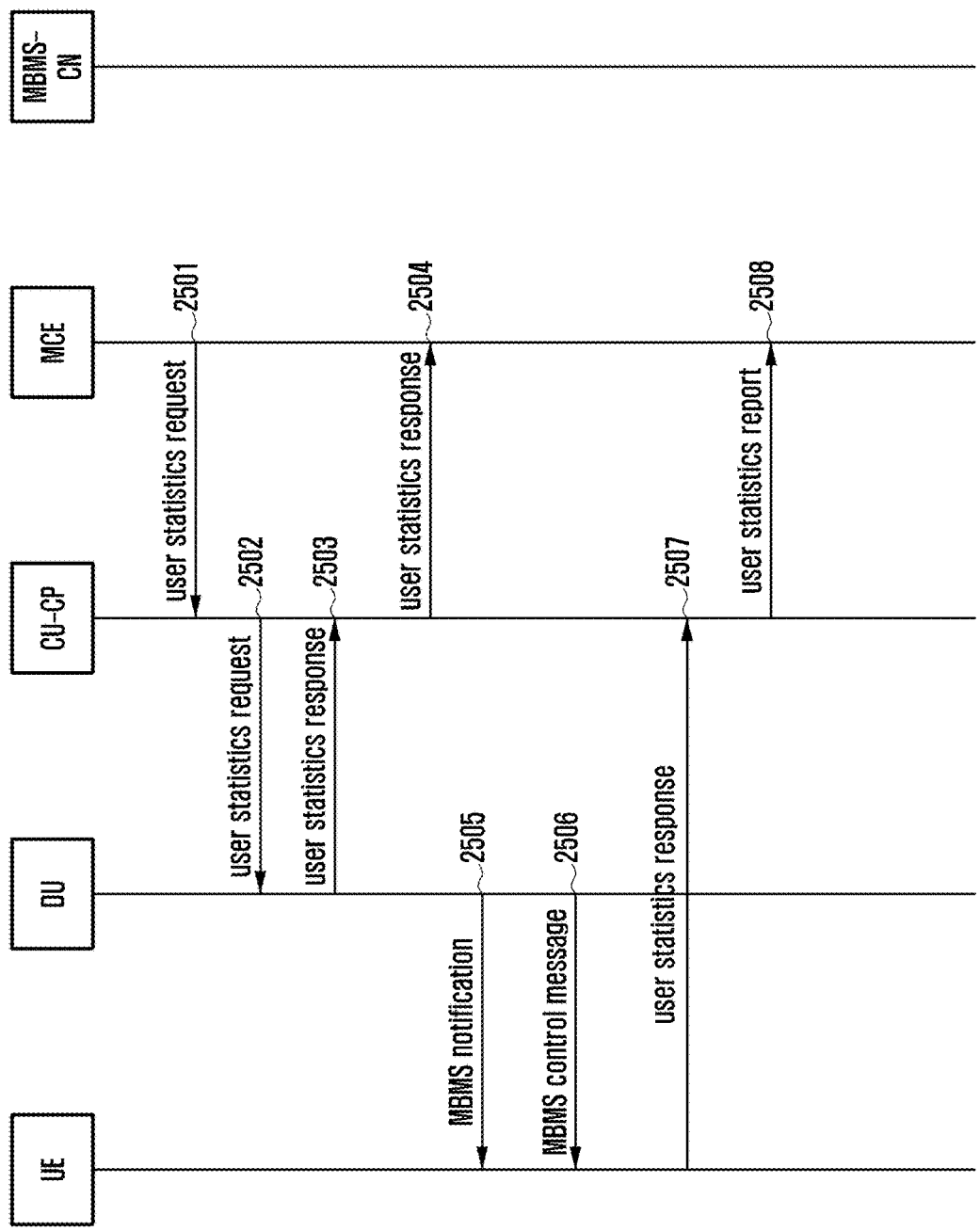
FIG. 25 is a schematic diagram of a process of counting the number of users by MBMS according to an embodiment of the present application.
Figure 26:
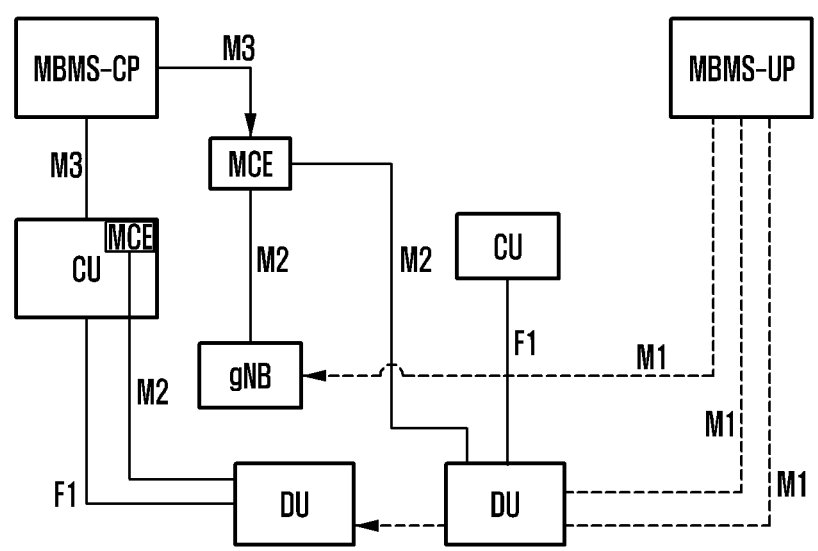
FIG. 26 is another network architecture diagram provided by an embodiment of the present application.
Figure 27:
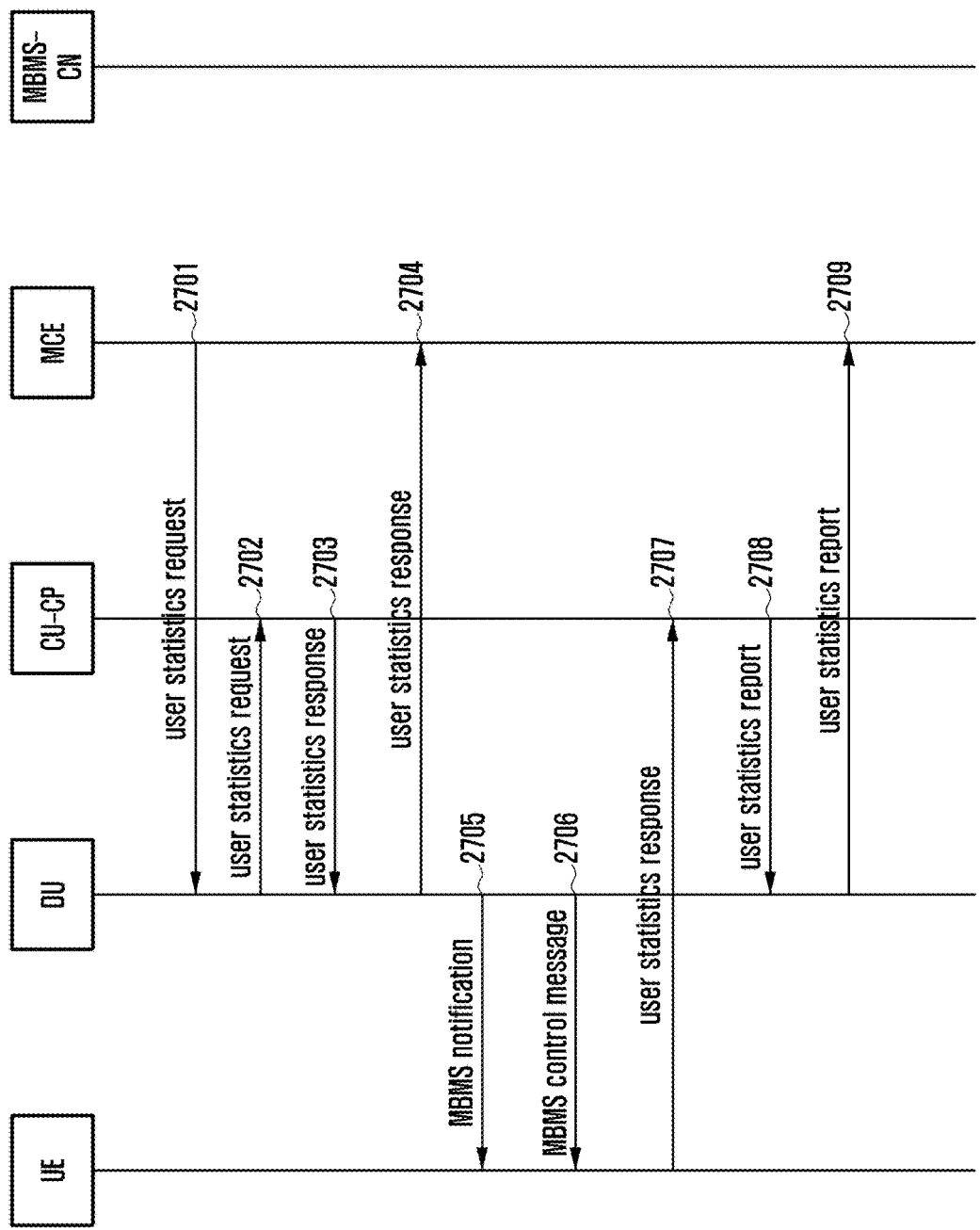
FIG. 27 is a schematic diagram of a process of counting the number of users by MBMS according to an embodiment of the present application.
Figure 28:
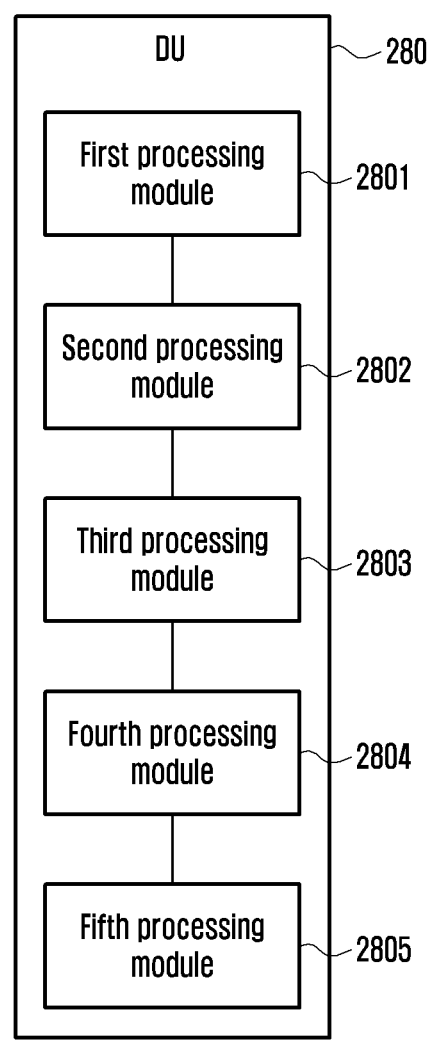
FIG. 28 is a schematic structural diagram of a DU according to an embodiment of the present application.
Figure 29:
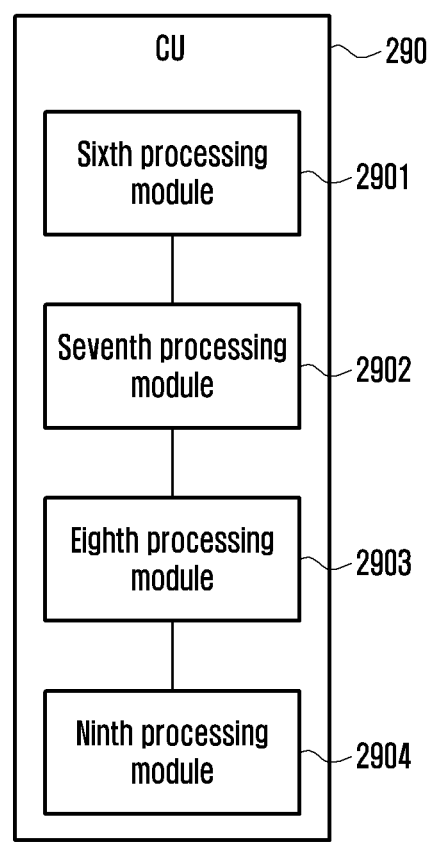
FIG. 29 is a schematic structural diagram of a CU according to an embodiment of the present application.
Figure 30:
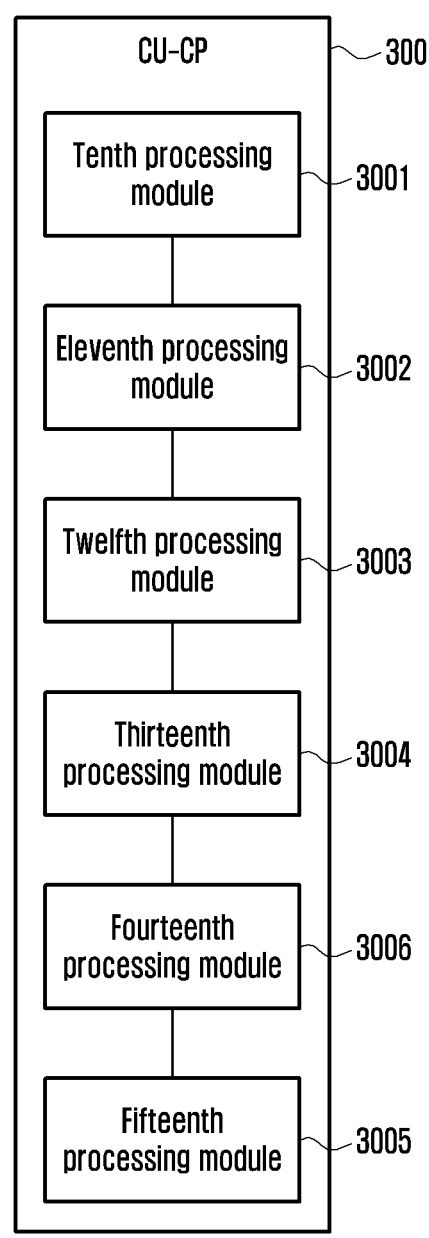
FIG. 30 is a schematic structural diagram of a CU-CP according to an embodiment of the present application.
Figure 31:
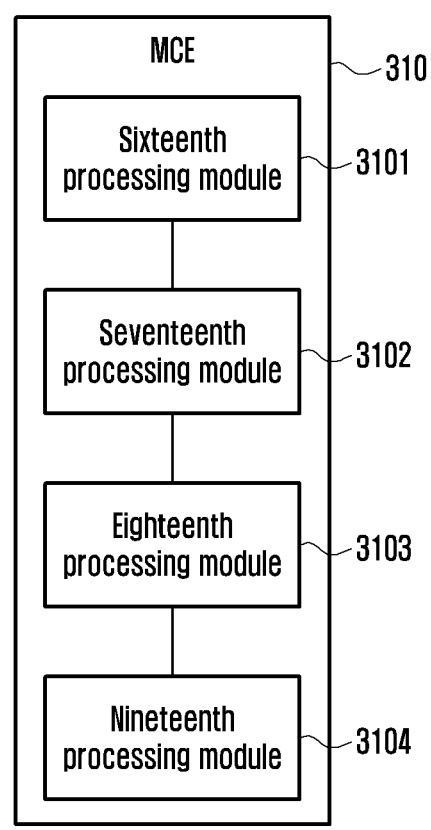
FIG. 31 is a schematic structural diagram of a MCE according to an embodiment of the present application.
Figure 32:
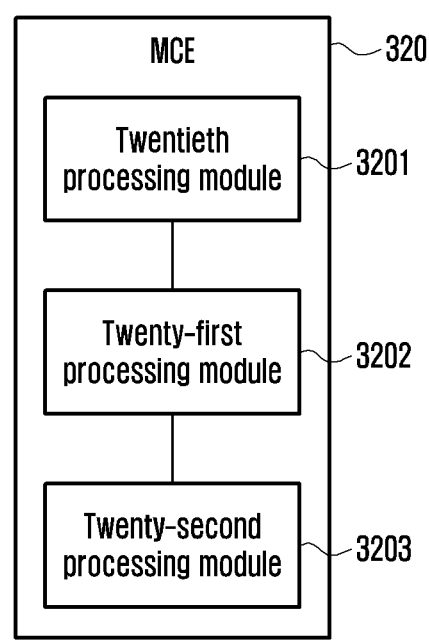
FIG. 32 is a schematic structural diagram of another MCE according to an embodiment of the present application.

FIG. 17 is a schematic flowchart of an MBMS transmission method according to an embodiment of the present application;

FIG. 18 is a schematic flowchart of another MBMS transmission method according to an embodiment of the present application;

FIG. 19 is a schematic flowchart of another MBMS transmission method according to an embodiment of the present application;

FIG. 20 is a schematic flowchart of another MBMS transmission method according to an embodiment of the present application;

FIG. 21 is a schematic flowchart of another MBMS transmission method according to an embodiment of the present application;

FIG. 22 is a schematic diagram of a MBMS bearer setup process provided by an embodiment of the present application;

FIG. 23 is a schematic diagram of a MBMS bearer setup process provided by an embodiment of the present application;

FIG. 24 is a schematic diagram of a MBMS bearer setup process provided by an embodiment of the present application;

FIG. 25 is a schematic diagram of a process of counting the number of users by MBMS according to an embodiment of the present application;

FIG. 26 is another network architecture diagram provided by an embodiment of the present application;

FIG. 27 is a schematic diagram of a process of counting the number of users by MBMS according to an embodiment of the present application;

FIG. 28 is a schematic structural diagram of a DU according to an embodiment of the present application;

FIG. 29 is a schematic structural diagram of a CU according to an embodiment of the present application;

FIG. 30 is a schematic structural diagram of a CU-CP according to an embodiment of the present application;

FIG. 31 is a schematic structural diagram of a MCE according to an embodiment of the present application; and FIG. 32 is a schematic structural diagram of another MCE according to an embodiment of the present application.

Embodiments of the present disclosure will be described in detail hereinafter. The examples of the embodiments have been illustrated in the drawings, throughout which same or similar reference numerals refer to same or similar elements or elements having same or similar functions. The embodiments described hereinafter with reference to the drawings are illustrative, merely used for explaining the present disclosure and should not be regarded as any limitations thereto.

It should be understood by those skill in the art that singular forms "a" "an", "the", and "said" may be intended to include plural forms as well, unless otherwise stated. It should be further understood that terms "include(s)" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or one or more intervening elements may also be present therebetween. In addition, "connected to" or "coupled to" as used herein may include wireless connection or coupling. As used herein, term "and/or" includes all or any of one or more associated listed units or combinations thereof.

In order to make the objects, technical solutions and advantages of the present disclosure more clear, the embodiments of the present disclosure will be further described in detail below with reference to the accompanying drawings.

Modern mobile communications are tending to provide high speed transmission of multimedia services for users. As shown in FIG. 1, it is a system architecture diagram of 5G (Fifth-Generation Mobile Communication Technology) wireless access network (hereinafter referred to as NG-RAN).

In FIG. 1, NG-RAN includes a group of base stations, gNBs (or enhanced eNBs), which are connected to a core network 5GC in 5G through a NG interface. The base stations can support FDD (frequency division) mode and TDD (time division) mode. The gNBs can be connected with each other through an Xn interface. One base station gNB may include a central control node (hereinafter referred to as CU) and one or more distribution nodes (hereinafter referred to as DU). The CU and the DU are connected with each other through an F1 interface. A DU can only be connected to one CU at present. The CU can be further separated into a central control plane (hereinafter referred to as CU-CP) and a central user plane (hereinafter referred to as CU-UP). CU-UP has functions of a data adaptation layer (hereinafter referred to as SDAP) and data aggregation (hereinafter referred to as PDCP), CU-CP has a radio connection control (hereinafter referred to as RRC) function, and DU has functions of link control (hereinafter referred to as RLC), a media access layer (hereinafter referred to as MAC), and a physical layer.

In order to use air interface resources effectively, service data that is to be received by multiple receiving users is provided to the users via broadcasting and multicasting. The service is also referred to as multimedia broadcast and multicast service (MBMS). FIG. 2 is an architecture diagram of MBMS in LTE (Long Term Evolution), which includes the core network and access network, the core network including an MBMS core network, MME (Mobility Management Entity), and MBMS-GW (Multimedia Broadcast and Multicast Service Gateway), and the access network including an MBMS central control node MCE (Multi-cell/multicast Coordination Entity) and a base station. Each MBMS bearer provides services within its service area. Each cell in a service area has a dedicated control channel (MCCH) for transmitting MBMS signaling. MBMS data is transmitted from a BM-SC (broadcast multicast service center) to an MBMS-GW, wherein the MBMS-GW is a logic node between a BM-SC and an eNB and is for transmitting/broadcasting MBMS data packets to each eNB that is to transmit data, or the MBMS-GW is another network node. The MBMS-GW transmits a data packet to a corresponding eNB which transmits data to a user. Control signaling is transmitted by the BM-SC to the MBMS-GW, and then transmitted to E-UTRAN by an MME. MCE is a node in E-UTRAN which receives MBMS signaling, decides the MBSFN (Multicast Broadcast Single Frequency Network) transmission mode that is to be adopted and transmits signaling to a corresponding eNB. In the prior art, a continuous area is defined, and respective eNBs in the area synchronously transmit the same MBMS signals on the same carrier to improve reception quality of MBMS services at users. The continuous area is referred to as a single frequency network (SFN) area. An SFN area includes a group of cells that cover a continuous geological area. The cells synchronously transmit a certain MBMS service using the same radio resources.

The MBSFN transmission mode is suitable for broadcast multicast services with a large number of users and widely distributed users. Generally, the MBSFN area covers a range of multiple base stations, and the same resource needs to be allocated to multiple base stations, which is configured by an MCE and transmitted to base stations by an M2 interface. A conventional base station is a collective base station, and the functional entities of base stations are all on one physical entity.

As shown in FIG. 3, an access network includes a central control node control plane (CU-CP), a central control node user plane (CU-UP), and a distribution unit (DU). The CU-CP and the CU-UP can be on one entity, which is a central control node (CU). Optionally, the DU supports the IP multicast function. The DU can transmit an IGMP join message to a core network to join a multicast network, and a core network directly transmits MBMS data to the DU. Optionally, the CU-UP or CU supports the IP multicast function, and can transmit an IGMP join message to the core network, and the core network directly transmits MBMS data to the CU-UP or CU. The access network also includes a node MCE that is controlled centrally by the MBMS. The MCE is a central control node of the MBMS. The MCE determines a data transmission method, for example, whether to use an MBSFN (MBMS single frequency network) manner to transmit data or a multi-cell multicast manner to transmit data. The MBSFN transmission manner is that all cells are on the same frequency and synchronized in an SFN area, and all cells in the SFN area use the same air interface resources to transmit the same MBMS data at the same time. The MBSFN transmission manner can also be named in other ways in 5G. This MCE can be a separate physical node, the interface between the MCE and the CU-CP, which is referred to as an M2 interface herein. The interface between the CU-CP and the DU needs to be enhanced currently to support the transmission of MBMS services. The MCE can also be placed on the CU-CP. When the MCE is placed on the CU-CP, the interface between the CU-CP and the DU can be an enhanced F1 interface or an M2 interface. In the following, transmission in the MBSFN manner is to be transmitted in a single cell in a broadcast manner, which is referred to as point-to-multipoint transmission. The transmission through a UE-specific channel is referred to as point-to-point transmission.

Embodiment 1

Another method for channel establishment is provided in this embodiment of the present disclosure, and is applied to a base station. The schematic flowchart of the method is as shown in FIG. 4, and the method includes:

Step S401, receiving a point-to-point establishment request transmitted by a multi-cell multicast coordination entity (MCE), the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU Session); and Step S402, transmitting a bearer establishment request to a core network in accordance with the point-to-point establishment request.

In the present embodiment, a point-to-point establishment request transmitted by a multi-cell multicast coordination entity (MCE) is received, the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU Session); a bearer establishment request is transmitted to a core network in accordance with the point-to-point establishment request; the point-to-point channel is determined to be successfully established; and the point-to-multipoint channel is converted into a point-to-point channel. Thus, conversion from the point-to-multipoint channel into a point-to-point channel is achieved.

Optionally, before receiving the point-to-point establishment request transmitted by the MCE, the method further includes:

receiving an MBMS statistics request transmitted by the MCE, wherein the MBMS statistics request includes at least one of time for updating multicast control channel (MCCH), an identifier of a single-frequency network (SFN) area, and an identifier of MBMS service to be performed with statistics;

transmitting an MBMS statistics response to the MCE to confirm that the base station has received an MBMS statistics request transmitted by the MCE;

transmitting the MBMS statistics request to an UE;

receiving an MBMS statistics response transmitted by the UE, to confirm that the UE has received the MBMS statistics request transmitted by the base station; and transmitting an MBMS statistics report to the MCE, wherein the MBMS statistics report includes the number of UEs receiving MBMS in a cell of the base station.

Optionally, after transmitting the bearer establishment request to the core network, the method further includes:

receiving a PDU Session establishment request transmitted by the core network, and establishing a point-to-point channel, wherein the PDU Session establishment request includes at least one of an MBMS service identifier and a PDU Session identifier, and the MBMS service identifier or the PDU Session identifier being used to convert MBMS bearer from point-to-multipoint transmission to point-to-point transmission.

Optionally, the manner of transmitting a bearer establishment request to a core network includes at least one of the following:

transmitting, when the UE is in a connection mode, the bearer establishment request to the core network through a signaling bearer that has been established with the core network;

establishing an RRC connection between the base station and the UE, and transmitting, by the base station, the bearer establishment request to the core network, when the UE is in an idle mode; and transmitting, when the UE is in the idle mode, an MBMS control signaling, the MBMS control signaling being used to indicate establishing an RRC connection between the base station and the UE, and transmitting, by the base station, the bearer establishment request to the core network.

Another method for channel establishment is provided in the embodiment of the present disclosure, and is applied to an MCE. The schematic flowchart of the method is as shown in FIG. 5, and the method includes:

Step S501, receiving an MBMS statistics report transmitted by a base station, wherein the MBMS statistics report includes the number of UEs receiving MBMS in a cell of the base station; and Step S502, transmitting a point-to-point establishment request to the base station in accordance with the MBMS statistics report, the point-to-point establishment request being used to indicate establishment of a point-to-point channel and convert a point-to-multipoint channel into a point-to-point channel, and the point-to-point establishment request including at least one of an MBMS service identifier, a PDU Session identifier.

In the embodiment of the present disclosure, a point-to-multipoint channel is converted into a point-to-point channel.

Optionally, after transmitting the point-to-point establishment request to the base station, the method further includes:

receiving an MBMS suspension request transmitted by the core network; and updating a message on an MBMS control channel in accordance with the MBMS suspension request, and transmitting a service suspension message to the UE.

Optionally, the MBMS service identifier of the includes at least one of a temporary mobile group identifier (TMGI) and first indication information, the first indication information indicating an MBMS bearer mode after the MCE performs statics on the number of UEs, and the MBMS bearer mode includes at least one of a point-to-point channel, a point-to-multipoint channel, a multimedia broadcast multicast service single frequency network (MBSFN) mode, and a single cell mode.

Optionally, an MBMS control message is transmitted to the UE, the MBMS control message including the MBMS service identifier and second indication information of the point-to-point channel, and the MBMS control message being used for the UE to initiate the establishment of the point-to-point channel and for the UE to save correspondence between the PDU Session identifier and MBMS service identifier.

Another method for channel establishment is provided in the embodiment of the present disclosure, and is applied to a base station. The schematic flowchart of the method is as shown in FIG. 6, and the method includes:

Step S601, transmitting MBMS statistics report to a multi-cell multicast coordination entity (MCE);

Step S602, receiving scheduling information transmitted by the MCE, the scheduling information including an MBMS service identifier and a transmission mode;

Step S603, transmitting the scheduling information to an UE; and

Step S604, receiving a request message for establishing a point-to-point channel transmitted by the UE.

In the embodiment of the present disclosure, a point-to-multipoint channel is converted into a point-to-point channel.

Another method for channel establishment is provided in the embodiment of the present disclosure, and is applied to a base station. The schematic flowchart of the method is as shown in FIG. 7, and the method includes:

Step S701, receiving a PDU Session establishment request transmitted by a core network, wherein the PDU Session establishment request is used to request the base station to establish a point-to-point channel, and the point-to-point channel includes a point-to-point UE dedicated channel;

Step S702, transmitting an RRC reconfiguration request to the UE in accordance with the PDU Session establishment request, to establish the point-to-point UE dedicated channel;

Step S703, receiving the RRC reconfiguration response transmitted by the UE;

Step S704, transmitting a PDU Session establishment response message to the core network to confirm that the point-to-point UE dedicated channel is successfully established;

Step S705, determining the number of UEs receiving MBMS, and transmitting an MBMS statistics report to the MCE in accordance with the number of UEs receiving MBMS, wherein the MBMS statistics report includes the number of UEs receiving MBMS in a cell of the base station;

Step S706, receiving scheduling information transmitted by the MCE;

Step S707, transmitting the scheduling information to the UE; and

Step S708, initiating a PDU Session release request to the core network, in accordance with the scheduling information, to release a point-to-point channel.

Optionally, the manner of determining the number of UEs receiving MBMS includes at least one of the following:

determining the number of UEs receiving the MBMS in accordance with a correspondence between the PDU Session identifier and the MBMS service identifier, the PDU Session establishment request including a PDU Session identifier and an MBMS service identifier, and the MBMS service identifier including a TMGI, wherein all point-to-point UE dedicated channels corresponding to one MBMS use the same PDU Session identifier;

receiving a message including the PDU Session identifier and the MBMS service identifier transmitted by the MCE, and determining the number of UEs receiving the MBMS in accordance with a correspondence between the PDU Session identifier and the MBMS service identifier, wherein all point-to-point UE dedicated channels corresponding to one MBMS use the same PDU Session identifier; and determining the number of UEs receiving the MBMS in accordance with a correspondence, pre-configured on the base station by Operation Administration and Maintenance (OAM), between the PDU Session identifier and the MBMS service identifier, wherein all point-to-point UE dedicated channels corresponding to one MBMS use the same PDU Session identifier.

In the embodiment of the present disclosure, a point-to-point channel is converted into a point-to-multipoint channel.

Another method for channel establishment is provided in the embodiment of the present disclosure, and is applied to an MCE. The schematic flowchart of the method is as shown in FIG. 8, and the method includes:

Step S801, receiving an MBMS statistics report transmitted by a base station;

Step S802, transmitting a service start request to a core network in accordance with the MBMS statistics report, to request the core network to transmit MBMS data to the base station via a point-to-multipoint channel;

Step S803, receiving a service recovery request transmitted by the core network, to determine that the core network transmits the MBMS data to the base station via a point-to-multipoint channel; and Step S804, transmitting scheduling information to the base station, such that the base station releases the point-to-point channel and converts the point-to-point channel into a point-to-multipoint channel.

Optionally, it is determined to establish a point-to-multipoint channel in accordance with the MBMS statistics report, and an MBMS control message is transmitted to the UE, such that the UE receives the MBMS data via the point-to-multipoint channel.

In the embodiment of the present disclosure, a point-to-point channel is converted into a point-to-multipoint channel.

A comprehensive and detailed description of the method for channel establishment in the above embodiments of the present disclosure is provided by the following embodiments.

FIG. 9 illustrates the conversion of the broadcast multicast service MBMS bearer from point-to-multipoint transmission to point-to-point transmission. In accordance with the number of users, QoS requirements, and cell resources, MBMS services can be transmitted in a point-to-multipoint transmission mode, such as MBSFN transmission or single-cell multicast, or in a point-to-point transmission mode, such as transmitting MBMS services by establishing a UE dedicated channel. If the number of users decreases, the transmission mode of the MBMS service can be changed from point-to-multipoint to point-to-point transmission, and the MCE performs statistics on the number of users, decides to convert from point-to-multipoint transmission to point-to-point transmission, and transmits a request to the core network to request the core network to initiate the establishment of the point-to-point channel. Specifically, as shown in FIG. 9:

Step 901: transmitting, by an MCE, an MBMS statistics request message to a base station.

Optionally, the MCE decides to initiate an MBMS statistics process. The purpose of the statistics process is to determine the number of users receiving a certain MBMS service in a certain area, for example, in a cell or in an SFN area. The MCE transmits an MBMS statistics request message to the base station. The base station receiving the message can perform statistics on the number of users in the base station or the cells under the base station through the RRC message, and then the base station reports the result of the user statistics to the MCE. The MCE learns where the UE is located and determines the MBMS data transmission mode for a time duration, wherein the data transmission mode may be a single-cell multicast mode, a point-to-point mode for dedicated channel transmission, or an MBSFN mode. In accordance with the statistics result, the MCE can make a decision, for example, deciding to use a single cell group broadcast mode if many users are in the same or the same group of cells, and single-cell multicast transmission can reduce the waste of air interface resources. If users are scattered in several cells, it may decide to use point-to-point channel transmission.

Optionally, the MBMS statistics request message includes time for updating an MBMS control channel (MCCH), an SFN area identifier, and an identifier of MBMS service to be performed with statistics, such as TMGI (Temporary Mobile Group Identifier). The time for updating the MCCH indicates the time when the base station transmits statistics requests on the air interface. The SFN area identifier indicates the area to be performed with statistics, wherein the base station will transmit the corresponding statistics request message on the MBMS control channel of the cell if the cell within the base station belongs to this SFN area. The identifier of MBMS service to be performed with statistics indicates which service users are being performed with statistics, wherein the user receives the service identifier from the MBMS control channel, and if the user is interested in the service and needs to receive data for the service, the user will transmit an RRC statistics response message to the base station.

Step 902: transmitting, by the base station, an MBMS statistics response message to the MCE, to confirm that the base station has received the statistics request message transmitted by the MCE.

Step 903: transmitting, by the base station, an MBMS statistics request to the user.

Optionally, after receiving the message in step 901, the base station transmits the MBMS statistics request to the user via the MBMS control channel, wherein the MBMS statistics request carries the MBMS service identifier for user statistics, such as TMGI, and a user in RRC connection mode and/or idle mode can receive the MBMS statistics request.

Step 904: transmitting, by the user, an MBMS statistics response to the base station.

Optionally, after receiving the MBMS statistics request, the user in the connection mode may directly transmit an RRC message (e.g., an MBMS statistics response message) to the base station. A user in idle mode needs to establish an RRC connection before transmitting an MBMS statistics response message to the base station, and the base station can keep the user in connection mode until it learns that the MCE statistics process is completed and does not need to establish a point-to-point channel. The RRC connection is then released by the base station, such that the UE enters the idle mode. Alternatively, in order to speed up the statistics process, the existing RRC establishment process is enhanced, and responding to MBMS statistics is conducted through the RRC establishment process, that is, the UE transmits a first RRC message (i.e., an RRC establishment request message), the message carrying statistics response information, for example, indication information indicates that the UE needs to receive a certain MBMS service that is being performed with user statistic, and the indication information having a correspondence with the MBMS service identifier. Through the indication information, the base station can learn whether the UE is receiving a certain MBMS service. After receiving the MBMS statistics response message, the base station records the UE, updates the statistics result, and then transmits an RRC release message such that the UE returns to the idle mode.

Step 905: transmitting, by the base station, an MBMS statistics report to the MCE.

Optionally, the base station performs statistics on the number of user receiving the MBMS service in the cell within the base station, and then transmits the MBMS statistics report to the MCE. The message carries the MBMS service identifier (such as the TMGI), the SFN area identifier, the identifier of the cell where the UE is located, and the result of user statistics, that is, the number of users. The number of users can be the number of users of a service in an SFN area, or the number of users in a cell.

Step 906: transmitting, by the MCE, a point-to-point establishment request to the base station.

Optionally, according to the result of user statistics, the MCE determines the MBMS transmission mode to be used in the next stage, and then notifies the base station of the transmission mode. This step can be implemented in two manners as follows.

First, the MCE transmits a point-to-point establishment request message indicating that a point-to-point channel needs to be established for a certain MBMS service. The message carries the MBMS service identifier, such as TMGI, which indicating a point-to-point channel needs to be established. The message may also carry the PDU Session identifier used by the point-to-point bearer. The MCE stores the MBMS service identifier and its corresponding PDU Session identifier in advance, which can be preconfigured on the MCE through OAM, or the MBMS service start request message transmitted by the core network includes the MBMS service identifier and its corresponding PDU Session identifier.

Second, the MCE transmits a message to the base station, wherein the message carries the MBMS service identifier, such as TMGI, and also carries indication information which is the first indication information indicating the MBMS bearer mode after the MCE has performed user statistics, wherein the bearer mode may be set as one of point-to-point channel, point-to-multipoint channel, MBSFN mode, single cell mode or the like. The message may also carry the PDU Session identifier used by the point-to-point bearer. Similarly, the MBCE service identifier and its corresponding PDU Session identifier are stored in advance on the MCE.

Step 907: transmitting, by the base station, a bearer establishment request message to the core network.

Optionally, the base station receives the message in step 906 and learns that it needs to establish point-to-point information for a certain MBMS service. The context of the MBMS service is saved on the base station, and through the previous statistics process, the base station learns and saves which users are receiving MBMS. Therefore, the base station can transmit a user-specific bearer establishment request message to the core network for each user, in which the bearer establishment request message carries the MBMS service identifier of the point-to-point channel, such as TMGI, or the bearer establishment request message carries the PDU Session identifier used by the point-to-point bearer. According to the mode of the UE, there are several methods:

Method 1: if the UE is in a connection mode, the base station may transmit the bearer establishment request through a signaling bearer that has been established with the core network.

Method 2: if the UE is in the idle mode, during the MBMS statistics, the UE enters the RRC connection mode for statistics; the base station can continue to keep the UE in the connection mode after performing the user statistics process until it receives the message in step 906 indicating the result of user statistics, learn that there is no need to establish a point-to-point channel for MBMS services, and release the RRC connection of the UE. In this case, the RRC connection between the base station and the UE has been established, and the base station transmits a first message to the core network, such as an initial UE message transmission. The message carries the MBMS service identifier, such as TMGI, or the message carries the PDU Session identifier used by the point-to-point bearer.

Method 3: If the UE is in the idle mode, the base station needs to allow the UE receiving the MBMS service to enter the connection mode; in this case, the base station needs to transmit a MBMS control signaling to indicate the UE to establish an RRC connection and enter the RRC connection mode, and then operates the same as Method 2.

Step 908: the core network transmits a protocol data unit session (PDU Session) establishment request message to the base station.

Optionally, the core network, for example, the AMF, receives the bearer establishment request message, and the AMF forwards the message to the SMF. If the message in step 906 includes the MBMS service identifier, the AMF or SMF obtains correspondence between the MBMS service and the PDU Session identifier in accordance with the pre-configured information. The SMF transmits a PDU Session establishment request message to the AMF, and the AMF transmits a message to the base station, wherein the message includes the PDU Session identifier used by the point-to-point bearer. This process is similar to the current bearer establishment process, except that a certain node of the core network needs to save the correspondence between the MBMS service and the PDU Session identifier.

Step 909: the base station transmits an RRC reconfiguration request to the UE.

The base station configures a wireless channel of the UE corresponding to the point-to-point transmission mode.

Step 910: the UE transmits the RRC reconfiguration response to the base station.

The UE configures a point-to-point channel and then transmits a response message to the base station.

Step 911: the base station transmits a protocol data unit session (PDU Session) establishment response to the core network.

After the channel configuration is successful, the base station transmits a successful response message to the core network.

Step 912: the MCE transmits a service suspension request to the core network.

After the MCE decides to transmit MBMS data by using a point-to-point channel, the MCE can transmit a service suspension request to the MBMS core network, and the MBMS core network can suspend transmitting data by broadcasting. Alternatively, as for the message in step 912, when the core network may obtain a point-to-point channel request from the base station, the core network may start transmitting MBMS data to the UE via the point-to-point channel, and the MBMS core network may transmit a message that the MBMS service is temporarily stopped to the MCE. The MCE can update the message on the MBMS control channel and transmit a service suspension message to the UE. Alternatively, after step 906, the MCE transmits scheduling information to the base station, the information including the suspended MBMS service identifier, and the base station transmits the scheduling information on the MBMS control channel.

FIG. 10 illustrates the conversion of the broadcast multicast service MBMS bearer from point-to-multipoint transmission to point-to-point transmission. According to the number of users, QoS requirements, and cell resources, MBMS services can be transmitted in a point-to-multipoint transmission mode, such as MBSFN transmission or single-cell multicast, or in a point-to-point transmission mode, such as transmitting MBMS services by establishing a UE dedicated channel. If the number of users decreases, the transmission mode of the MBMS service can be changed from point-to-multipoint to point-to-point transmission, and the MCE performs statistics on the number of users, decides to convert from point-to-multipoint transmission to point-to-point transmission, and transmits a request to the UE to request the UE to initiate the establishment of the point-to-point channel. Specifically, as shown in FIG. 10:

Step 1001: transmitting, by the MCE, an MBMS statistics request message to the base station.

Optionally, the MCE decides to initiate an MBMS statistics process. The purpose of the statistics process is to determine the number of users receiving a certain MBMS service in a certain area, for example, in a cell or in an SFN area. The MCE transmits an MBMS statistics request message to the base station. The base station receiving the message can perform statistics on the number of users in the base station or the cell within the base station by using the RRC message, and then the base station reports the result of user statistics to the MCE. The MCE learns where the UE is located and determines the MBMS data transmission mode for a time duration, wherein the data transmission mode may be a single-cell multicast mode, a point-to-point mode channel transmission mode, or an MBSFN mode. According to the statistics results, the MCE can decides to use for example a single cell group broadcast mode if many users are in the same cell or the same group of cells, and single-cell multicast transmission can reduce the waste of air interface resources. If users are scattered in several cells, it may decide to use point-to-point channel transmission.

Optionally, the MBMS statistics request message includes time for updating an MBMS control channel (MCCH), an SFN area identifier, and an identifier of MBMS service to be performed with statistics, such as TMGI. The time for updating the MCCH indicates the time when the base station transmits statistics requests in the air. The SFN area identifier indicates the areas to be performed with statistics, wherein the base station will transmit the corresponding statistics request message on the MBMS control channel of the cell if the cell within the base station belongs to this SFN area. The identifier of MBMS service to be performed with statistics indicates the users having a certain service are to be performed with statistics, wherein the user receives the service identifier from the MBMS control channel, and if the user is interested in the service and needs to receive data for the service, the user will transmit an RRC statistics response message to the base station.

Step 1002: transmitting, by the base station, an MBMS statistics response message to the MCE, to confirm that the base station has received the statistics request message transmitted by the MCE.

Step 1003: transmitting, by the base station, an MBMS statistics request to the user.

Optionally, after receiving the message in step 1001, the base station transmits the MBMS statistics request to the user via the MBMS control channel, wherein the MBMS statistics request carries the MBMS service identifier for user statistics, such as TMGI, and a user is in RRC connection mode and/or idle mode can receive the MBMS statistics request.

Step 1004: transmitting, by the user, an MBMS statistics response to the base station.

Optionally, after receiving the MBMS statistics request, the user in the connection mode may directly transmit an RRC message (e.g., an MBMS statistics response message) to the base station. A user in idle mode needs to establish an RRC connection before transmitting an MBMS statistics response message to the base station, and the base station can keep the user in connection mode until it learns that the MCE statistics process is completed and does not need to establish a point-to-point channel. The RRC connection is released by the base station, such that the UE enters the idle mode. Alternatively, in order to speed up the statistics process, the existing RRC establishment process is enhanced, and respond to MBMS statistics is conducted through the RRC establishment process, that is, the UE transmits a first RRC message (i.e., an RRC establishment request message), the message carrying statistics response information, for example, indication information indicates that the UE needs to receive a certain MBMS service that is being performed with user statistic. After receiving the message, the base station records the UE, and then transmits an RRC release message such that the UE returns to the idle mode.

Step 101005: transmitting, by the base station, an MBMS statistics report to the MCE.

Optionally, the base station performs statistics on the number of user receiving the MBMS service in the cell within the base station, and then transmits the MBMS statistics report to the MCE. The message carries the MBMS service identifier (such as the TMGI), the SFN area identifier, the identifier of the cell where the UE is located, and the result of user statistics, that is, the number of users. The number of users can be the number of users for a service in an SFN area, or the number of users in a cell.

Step 1006: transmitting, by the MCE, the scheduling information to the base station.

Optionally, according to the result of user statistics, the MCE determines the MBMS transmission mode to be used in the next stage, and then notifies the base station of the transmission mode via the scheduling information. The base station receives the scheduling information and transmits the scheduling information via the air interface. This step can be implemented in two manners:

First, the scheduling information includes the indication information of establishing a point-to-point channel indicating that a point-to-point channel needs to be established for a certain MBMS service. The indication information may carry MBMS service identification information that needs to establish a point-to-point channel, such as TMGI or information that can infer TMGI. The information may also carry the PDU Session identifier used by the point-to-point bearer. The MCE stores the MBMS service identifier and its corresponding PDU Session identifier in advance, which can be preconfigured on the MCE through OAM, or the MBMS service start request message transmitted by the core network includes the MBMS service identifier and its corresponding PDU Session identifier.

Second, the scheduling information carries the MBMS service identification information, such as TMGI or information that can infer TMGI, and also carries indication information indicating MBMS bearer mode decided by the MCE, wherein the bearer mode may be set as one of point-to-point channel, point-to-multipoint channel, MBSFN mode, single cell mode or the like. The message may also carry the PDU Session identifier used by the point-to-point bearer. The MCE stores the MBMS service identifier and its corresponding PDU Session identifier of advance that can be preconfigured on the MCE through OAM, or the MBMS service start request message transmitted by the core network includes the MBMS service identifier and its corresponding PDU Session identifier.

Step 1007: transmitting, by the base station, the scheduling information to the UE.

Optionally, the base station receives the message in step 1006, and the base station transmits the scheduling information on the MBMS control channel. After receiving the information, the UE actively initiates a process, such as a service request process, to establish a point-to-point channel for transmitting MBMS service data. If the scheduling information includes the PDU session identifier used by the point-to-point bearer channel, the UE uses the identifier to initiate the service request process; otherwise, the UE can use the PDU Session identifier to initiate a service request since the correspondence between the MBMS service identifier and the PDU Session identifier is configured in advance on the UE.

Step 1008: initiating, by the UE, a process of establishing a point-to-point channel.

Step 1009: transmitting, by the MCE, a service suspension indication message to the MBMS core network.

Step 1010: transmitting, by the MBMS core network, a service suspension request to the MCE. The MCE learns that the core network has begun to transmit MBMS data through the point-to-point transmission.

Optionally, the core network may start to transmit MBMS data to the UE via the point-to-point channel, and the MBMS core network may transmit a message that the MBMS service is temporarily stopped to the base station. The base station can update the message on the MBMS control channel and transmit a service termination message to the UE.

FIG. 11 illustrates the conversion of the broadcast multicast service MBMS bearer from point-to-point transmission to point-to-multipoint transmission. According to the number of users, QoS requirements, and cell resources, MBMS services can be transmitted in a point-to-multipoint transmission mode, such as MBSFN transmission or single-cell multicast, or in a point-to-point transmission mode, such as transmitting MBMS services by establishing a UE dedicated channel. The base station performs statistics on the number of users receiving MBMS services via the point-to-point channel. As the number of users increases, the transmission mode of the MBMS service can be changed from the point-to-point transmission to the point-to-multipoint transmission. Specifically, as shown in FIG. 11:

Step 1101: transmitting, by a core network, a protocol data unit session (PDU Session) establishment request message to a base station to request the base station to establishing a point-to-point channel.

Optionally, one method is that the MBMS core network decides to establish a point-to-point channel to transmit data at the beginning, and the other method is to use the methods of Embodiment 1 and Embodiment 2 of the present disclosure to initially decide to transmit in the MBSFN mode, and later decide, by the MCE, to convert from point-to-multipoint transmission to point-to-point transmission according to the number of users. The specific process can refer to Embodiment 1 and Embodiment 2. The method of establishing a point-to-point channel is the same as the current method of establishing a PDU Session bearer. The message includes the PDU Session identifier, the QoS flow identifier included in the PDU Session, the quality requirements of the QoS flow, and other information. Optionally, the message also includes the MBMS service identifier, which indicates that the MBMS service data indicated by the service identifier is transmitted on the PDU Session.

Step 1102: transmitting, by the base station, a radio access connection (i.e., radio resource control, RRC) reconfiguration request message to the UE, requesting to establish a point-to-point UE dedicated channel.

Optionally, the base station needs to configure a wireless channel between the base station and the UE. The base station transmits an RRC reconfiguration request message to the UE, the message including configuration information of the wireless channel. This step is the same as the current RRC reconfiguration process.

Step 1103: transmitting, by a UE, a RRC reconfiguration response message to the base station.

Optionally, the UE establishes a wireless channel in accordance with the configuration, and the UE transmits a response message to the base station.

Step 1104: transmitting, by the base station, a protocol data unit session (PDU Session) establishment response message to the core network.

Optionally, the base station transmits a response message to the core network, indicating that the UE dedicated channel is successfully established.

Step 1105: performing, by the base station, statistics on the number of users receiving MBMS services, and if necessary, transmitting, by the base station, a user statistics report message to an MCE.

Optionally, if the MBMS service is transmitted using a point-to-point channel, that is, a UE-specific channel, in order to perform statistics on the number of users, the base station needs to learn the correspondence between the MBMS service identifier and the PDU Session. One method is that these point-to-point channels are all assigned with the same PDU Session identifier; as the base station needs to learn the correspondence between the MBMS service identifier and the PDU Session identifier, the base station can learn the correspondence through the OAM configuration method; alternatively, when the UE dedicated channel is established, the corresponding MBMS service identifier is also transmitted to the base station, that is, the base station can learn the correspondence between the MBMS service identifier and the PDU Session identifier carried in the message in step 1101. The base station can perform statistics on how many users are receiving MBMS service data in accordance with the correspondence. Specifically, it can be learned through the following methods.

Method 1: the PDU Session establishment request message transmitted by the core network includes the PDU Session identifier and its corresponding MBMS service identifier, such as TMGI. According to the correspondence between the MBMS service identifier and the PDU Session identifier, the base station can perform statistics on users for a certain MBMS service. In this case, all point-to-point UE dedicated channels corresponding to one MBMS service use the same PDU Session identifier or may use different PDU Session identifiers.

Method 2: when the MCE decides to establish a point-to-point channel, the MCE transmits a message to the base station, notifying the base station that the point-to-point channel needs to be established, and simultaneously notifying the base station of the correspondence between the MBMS service identifier and the PDU Session identifier. In this case, all point-to-point UE dedicated channels corresponding to an MBMS service use the same PDU Session identifier.

Method 3: the OAM (Operation Maintenance and Maintenance) is pre-configured on the base station, and the base station learns the correspondence between the PDU Session identifier and the MBMS service identifier through configuration. In this case, all point-to-point UE dedicated channels corresponding to an MBMS service use the same PDU Session identifier.

Optionally, the base station performs statistics on the number of users for a certain MBMS service, and reports the number of users to the MCE. The reporting manner, such as periodic reporting or time-triggered reporting, can be based on the configuration in the MBMS statistics request message transmitted by the MCE. The report message transmitted by the base station includes at least one of a service identifier, a cell identifier, and the number of users.

Step 1106: transmitting, by the MCE, a service start request message to a MBMS core network.

Optionally, according to the report from the base station, the MCE decides whether to start to transmit the MBMS service by using the point-to-multipoint service, and the MCE transmits a message to the MBMS core network, requesting the core network to transmit data to the base station in a point-to-multipoint manner. The message includes the service identifier and information indicating the start of the transmission.

Step 1107: transmitting, by the MBMS core network, a service recovery request message to the MCE.

Optionally, the MBMS core network confirms, and transmits a response message to the MCE, confirming that data of the MBMS service can be transmitted using a point-to-multipoint channel.

Step 1108: transmitting, by the MCE, a scheduling information to the base station.

Optionally, the MCE transmits the scheduling information to the base station, and the message includes the service identifier, indicating that the MBMS service is to start transmitting data. The message may also include the MBMS data channel, that is, the MTCH configuration information.

Step 1109: transmitting, by the base station, the scheduling information to the UE.

Optionally, the base station transmits the received scheduling information on the MBMS control channel. After receiving this information, the UE learns that the MBMS service starts to be used to transmit data in a point-to-multipoint manner, and receives the MBMS service data on the corresponding channel according to the configuration information of the MBMS data channel.

Step 1110: initiating, by the base station, a protocol data unit session (PDU Session) release request.

Optionally, the base station may initiate a channel release request to release the point-to-point channel.

Embodiment 2

Based on the same inventive concept as that of Embodiment 1, the embodiment of the present disclosure further provides a base station. A schematic structural diagram of the base station is shown in FIG. 12. The base station 120 includes a first processing module 1201 and a second processing module 1202.

The first processing module 1201 is configured to receive a point-to-point establishment request transmitted by a multi-cell multicast coordination entity (MCE), the point-to-point establishment request being used to indicate establishment of a point-to-point channel for transmission of a multimedia broadcast multicast service MBMS, and the point-to-point establishment request including at least one of an MBMS service identifier and an identifier of a protocol data unit session (PDU Session).

The second processing module 1202 is configured to transmit a bearer establishment request to a core network in accordance with the point-to-point establishment request.

Optionally, before receiving the point-to-point establishment request transmitted by the MCE, the first processing module 1201 is further configured to: receive an MBMS statistics request transmitted by the MCE, wherein the MBMS statistics request includes at least one of time for updating multicast control channel (MCCH), an identifier of a single-frequency network (SFN) area, and an identifier of MBMS service to be performed with statistics; transmit an MBMS statistics response to the MCE to confirm that the base station has received an MBMS statistics request transmitted by the MCE; transmit the MBMS statistics request to the UE; receive the MBMS statistics response transmitted by the UE, to confirm that the UE has received an MBMS statistics request transmitted by the base station; and transmit an MBMS statistics report to the MCE, wherein the MBMS statistics report includes the number of UEs receiving MBMS in a cell of the base station.

Optionally, after transmitting a bearer establishment request to a core network, the second processing module 1202 is further configured to receive a PDU Session establishment request transmitted by the core network, and establish a point-to-point channel, wherein the PDU Session establishment request includes at least one of an MBMS service identifier and a PDU Session identifier, and the MBMS service identifier or the PDU Session identifier is used to convert MBMS bearer from point-to-multipoint transmission to point-to-point transmission.

Optionally, the manner of transmitting a bearer establishment request to a core network includes at least one of the following:

transmitting, when the UE is in a connection mode, the bearer establishment request to the core network through the signaling bearer that has been established with the core network;

establishing an RRC connection between the base station and the UE, and transmitting, by the base station, the bearer establishment request to the core network, when the UE is in an idle mode; and transmitting, when the UE is in the idle mode, an MBMS control signaling, the MBMS control signaling being used to indicate establishing an RRC connection between the base station and the UE, and transmitting, by the base station, the bearer establishment request to the core network.

For the content that is not described in detail for the base station 120 provided in the embodiment of the present disclosure, reference may be made to the foregoing method for channel establishment, and beneficial effects that may be implemented by the base station 120 provided in this embodiment of the present disclosure is consistent with the foregoing method for channel establishment, which are not repeated herein.

The embodiment of the present disclosure has at least the following beneficial effects:

a point-to-point establishment request transmitted by a multi-cell multicast coordination entity (MCE) is received, the point-to-point establishment request being used to indicate establishment of a point-to-point channel for transmission of a multimedia broadcast multicast service MBMS, and a bearer establishment request is transmitted to a core network in accordance with the point-to-point establishment request, for determining that the point-to-point channel is successfully established and converting the point-to-multipoint channel to a point-to-point channel, thereby implementing conversion from the point-to-point channel to a point-to-multipoint channel.

Based on the same inventive concept as that of Embodiment 1, the embodiment of the present disclosure further provides an MCE. A schematic structural diagram of the base station is shown in FIG. 13. The MCE 130 includes a third processing module 1301 and a fourth processing module 1302.

The third processing module 1301 is configured to receive an MBMS statistics report transmitted by a base station, wherein the MBMS statistics report includes the number of UEs receiving MBMS in a cell of the base station.

The fourth processing module 1302 is configured to transmit a point-to-point establishment request to the base station in accordance with the MBMS statistics report, the point-to-point establishment request being used to indicate establishment of a point-to-point channel and convert a point-to-multipoint channel into a point-to-point channel, and the point-to-point establishment request including at least one of an MBMS service identifier, a PDU Session identifier.

Optionally, after transmitting a point-to-point establishment request to the base station, the fourth processing module 1302 is configured to receive an MBMS suspension request transmitted by the core network, and update a message on an MBMS control channel in accordance with the MBMS suspension request, and transmit a service suspension message to the UE.

Optionally, the point-to-point establishment request includes at least one of an MBMS service identifier, a PDU Session identifier; the MBMS service identifier includes at least one of a temporary mobile group identifier (TMGI) and first indication information, the first indication information indicating an MBMS bearer mode after the MCE performs statics on the number of UEs, and the MBMS bearer mode includes at least one of a point-to-point channel, a point-to-multipoint channel, a multimedia broadcast multicast service single frequency network (MBSFN) mode, and a single cell mode.

Optionally, an MBMS control message is transmitted to the UE, the MBMS control message including the MBMS service identifier and second indication information of the point-to-point channel, and the MBMS control message being used for the UE to initiate the establishment of the point-to-point channel and for the UE to save correspondence between the PDU Session identifier with MBMS service identifier.

For the content that is not described in detail for the MCE 130 provided in the embodiment of the present disclosure, reference may be made to the foregoing method for channel establishment, and beneficial effects that may be implemented by the MCE 130 provided in this embodiment of the present disclosure is consistent with the foregoing method for channel establishment, which are not repeated herein.

The embodiment of the present disclosure has at least the following beneficial effects: a point-to-multipoint channel is converted into a point-to-point channel.

Based on the same inventive concept as that of Embodiment 1, the embodiment of the present disclosure further provides a base station. A schematic structural diagram of the base station is shown in FIG. 14. The base station 140 includes a fifth processing module 1401, a sixth processing module 1402, a seventh processing module 1403, and an eighth processing module 1404.

The fifth processing module 1401 is configured to transmit MBMS statistics report to a multi-cell multicast coordination entity (MCE).

The sixth processing module 1402 is configured to receive scheduling information transmitted by the MCE, the scheduling information including an MBMS service identifier and a transmission mode.

The seventh processing module 1403 is configured to transmit the scheduling information to the UE.

The eighth processing module 1404 is configured to receive a request message for establishing a point-to-point channel transmitted by the UE.

For the content that is not described in detail for the base station 140 provided in the embodiment of the present disclosure, reference may be made to the foregoing method for channel establishment, and beneficial effects that may be implemented by the base station 140 provided in this embodiment of the present disclosure is consistent with the foregoing method for channel establishment, which are not repeated herein.

The embodiment of the present disclosure has at least the following beneficial effects: a point-to-multipoint channel is converted into a point-to-point channel.

Based on the same inventive concept as that of Embodiment 1, the embodiment of the present disclosure further provides a base station. A schematic structural diagram of the base station is shown in FIG. 15. The base station 150 includes an eleventh processing module 1501, a twelfth processing module 1502, a thirteenth processing module 1503, a fourteenth processing module 1504, a fifteenth processing module 1505, a sixteenth processing module 1506, a seventeenth processing module 1507, and an eighteenth processing module 1508.

The eleventh processing module 1501 is configured to receive a PDU Session establishment request transmitted by a core network, wherein the PDU Session establishment request is used to request the base station to establish a point-to-point channel, and the point-to-point channel includes a point-to-point UE dedicated channel.

The twelfth processing module 1502 is configured to transmit an RRC reconfiguration request to the UE in accordance with the PDU Session establishment request, to establish the point-to-point UE dedicated channel;

The thirteenth processing module 1503 is configured to receive the RRC reconfiguration response transmitted by the UE;

The fourteenth processing module 1504 is configured to transmit a PDU Session establishment response message to the core network to confirm that the point-to-point UE dedicated channel is successfully established;

The fifteenth processing module 1505 is configured to determine the number of UEs receiving MBMS, and transmit an MBMS statistics report to the MCE, wherein the MBMS statistics report includes the number of UEs receiving MBMS in a cell of the base station.

The sixteenth processing module 1506 is configured to receive scheduling information transmitted by the MCE.

The seventeenth processing module 1507 is configured to transmit the scheduling information to the UE.

The eighteenth processing module 1508 is configured to initiate a PDU Session release to the core network, in accordance with the scheduling information, to release a point-to-point channel.

Optionally, the manner of determining the number of UEs receiving MBMS includes at least one of the following:

determining the number of UEs receiving the MBMS in accordance with a correspondence between the PDU Session identifier and the MBMS service identifier, the PDU Session establishment request including a PDU Session identifier and an MBMS service identifier, and the MBMS service identifier including a TMGI, wherein all point-to-point UE dedicated channels corresponding to one MBMS use the same PDU Session identifier;

receiving a message transmitted by the MCE including the PDU Session identifier and the MBMS service identifier, and determining the number of UEs receiving the MBMS in accordance with a correspondence between the PDU Session identifier and the MBMS service identifier, wherein all point-to-point UE dedicated channels corresponding to one MBMS use the same PDU Session identifier; and determining the number of UEs receiving the MBMS in accordance with a correspondence, pre-configured on the base station by Operation Administration and Maintenance (OAM), between the PDU Session identifier and the MBMS service identifier, wherein all point-to-point UE dedicated channels corresponding to one MBMS use the same PDU Session identifier.

For the content that is not described in detail for the base station 150 provided in the embodiment of the present disclosure, reference may be made to the foregoing method for channel establishment, and beneficial effects that may be implemented by the base station 150 provided in this embodiment of the present disclosure is consistent with the foregoing method for channel establishment, which are not repeated herein.

The embodiment of the present disclosure has at least the following beneficial effects: a point-to-point channel is converted into a point-to-multipoint channel.

Based on the same inventive concept as that of Embodiment 1, the embodiment of the present disclosure further provides another MCE. A schematic structural diagram of the base station is shown in FIG. 16. The MCE 160 includes a nineteenth processing module 1601, a twentieth processing module 1602, a twenty-first processing module 1603, and twenty-second processing module 1604.

The nineteenth processing module 1601 is configured to receive an MBMS statistics report transmitted by a base station.

The twentieth processing module 1602 is configured to transmit a service start request to a core network in accordance with the MBMS statistics report, to request the core network to transmit MBMS data to the base station via a point-to-multipoint channel.

The twenty-first processing module 1603 is configured to receive a service recovery request transmitted by the core network, to determine that the core network transmits MBMS data to the base station via a point-to-multipoint channel.

The twenty-second processing module 1604 is configured to transmit scheduling information to the base station, such that the base station releases the point-to-point channel and converts the point-to-point channel into a point-to-multipoint channel.

Optionally, it is determined to establish a point-to-multipoint channel in accordance with the MBMS statistics report, and an MBMS control message is transmitted to the UE, such that the UE receives the MBMS data from the point-to-multipoint channel.

For the content that is not described in detail for the MCE 160 provided in the embodiment of the present disclosure, reference may be made to the foregoing method for channel establishment, and beneficial effects that may be implemented by the MCE 160 provided in this embodiment of the present disclosure is consistent with the foregoing method for channel establishment, which are not repeated herein.

The embodiment of the present disclosure has at least the following beneficial effects: a point-to-point channel is converted into a point-to-multipoint channel.

It should be appreciated by the person skilled in the art that each block as well as the combination of the blocks in the structural block graphs and/or block graphs and/or flowcharts may be implemented through computer program instructions. It should be appreciated by the person skilled in the art that these computer program instructions may be provided to general-purpose computer, dedicated computer or other processors capable of programming the data processing methods, to generate machines, so as to implement the methods specified in the block(s) of the structural block graphs and/or block graphs and/or flowcharts through the instructions executed on the computer or other processors capable of programming the data processing methods.

It should be appreciated by the person skilled in the art that the various operations, methods, steps in the flow, measures and schemes discussed in the present invention can be alternated, modified, combined or deleted. Furthermore, other operations, methods, steps in the flow, measures and schemes involving the various operations, methods, steps in the flow, measures and schemes discussed in the present disclosure may also be alternated, modified, rearranged, dissolved, combined or deleted. Furthermore, other operations, methods, steps in the flow, measures and schemes having the same functions with the various operations, methods, steps in the flow, measures and schemes discussed in the present disclosure may also be alternated, modified, rearranged, dissolved, combined or deleted.

The above description is only part of the embodiments of the present disclosure. It should be noted that, for those of ordinary skill in the art, without departing from the principles of the present disclosure, several improvements and retouches can be made. These improvements and retouches also should be regarded as the protection scope of the present disclosure.

Embodiment 3

An embodiment of the present application provides a multimedia broadcast and multicast service (MBMS) method, which is applied to a distribution unit (DU). A schematic flowchart of the method is shown in FIG. 17, and the method includes:

Step S1701: receiving a first notification message transmitted by a CU.

Step S1702: transmitting a first message to the CU.

Step S1703: transmitting a MBMS notification message to the UE according to the first notification message. The MBMS notification message is used to notify the UE to receive a message transmitted on an MBMS control channel.

Step S1704: receiving a MBMS service start request message transmitted by the CU.

Step S1705: transmitting a MBMS message to the UE, used for establishing a MBMS bearer and transmitting MBMS data.

In the embodiment of the present application, the method includes: transmitting a first notification message transmitted by the CU, wherein the first notification message is used to notify the DU to transmit a MBMS notification message to the UE; transmitting the first message to the CU; and transmitting the MBMS notification message to UE, wherein the MBMS notification message is used to notify the UE to receive the message transmitted on the MBMS control channel; receiving the MBMS service start request message transmitted by the CU; transmitting the MBMS message to the UE used for establishing the MBMS bearer and transmitting the MBMS data. In this way, under a separated architecture, MBMS data transmission delay is reduced, and the MBMS data is efficiently transmitted.

Optionally, before receiving the first notification message transmitted by the CU, the method further includes:

transmitting a F1 setup request message to the CU;

receiving a F1 setup response message transmitted by the CU, and the F1 setup response message includes broadcast information; and transmitting broadcast information to the UE, wherein the broadcast information carries configuration information of a MBMS control channel.

Optionally, the F1 setup request message includes at least one of the following:

a name of a DU, information of a serving cell on a DU, a service area identifier (SAI) corresponding to a cell, and a MBMS synchronization area identifier of a cell.

Optionally, the F1 setup response message includes at least one of the following:

a list of activated cell identifiers, a list of available operator identifiers (PLMN List), radio resource control (RRC) version information, cell direction information, broadcast information, a service area identifier (SAI) corresponding to a cell, and MBMS synchronization area identifier to which the cell belongs.

Optionally, the broadcast information includes at least one of the following:

type of broadcast information, broadcast message, value tag, configuration information of synchronous multicast control channel (MCCH), configuration information of MBMS notification.

Optionally, the first message includes information of a downlink user plane allocated by the DU, and the information of the downlink user plane includes at least one of an Internet protocol (IP) address and a tunnel identifier allocated by the DU; the information of downlink user plane is used to receive the MBMS data transmitted by a core network; the MBMS message includes at least one of a temporary mobile group identifier (TMGI) included in a MBMS service identifier and configuration information of a MBMS data channel.

Optionally, after transmitting the MBMS control message to the UE, the method further includes:

transmitting an Internet Group Management Protocol (IGMP) join message to a core network.

An embodiment of the present application provides a MBMS transmission method, which is applied to a CU. A schematic flowchart of the method is shown in FIG. 18. The method includes:

Step S1801: receiving a MBMS service start request message transmitted by a core network.

Step S1802: transmitting a first notification message to the DU according to the MBMS service start request message, wherein the first notification message is used to notify the DU to transmit the MBMS notification message to the UE.

Step S1803: receiving a first message transmitted by the DU.

Step S1804, transmitting a MBMS service start response message to the core network according to the first message, and transmitting the MBMS service start request message to the DU, used for establishing a MBMS bearer and transmitting MBMS data.

Optionally, before receiving the MBMS service start request message transmitted by the core network, the method further includes:

receiving a F1 setup request transmitted by the DU; and
transmitting a F1 setup response to the DU, wherein the F1 setup response includes broadcast information.

Optionally, the MBMS service start request message includes at least one of the following:

a MBMS service identifier, MBMS quality of service (QoS) information, MBMS service scope information, protocol data unit (PDU) sessions identifier corresponding to MBMS, information of QoS flow contained in a protocol data unit (PDU) corresponding to MBMS, a multicast address, a source address, a tunnel identifier.

An embodiment of the present application provides a MBMS transmission method, which is applied to the CU-CP. A schematic flowchart of the method is shown in FIG. 19. The method includes:

Step S1901: receiving a MBMS service start request message transmitted by a multi-cell multicast coordination entity (MCE).

Step S1902: transmitting a first notification message to the DU according to a MBMS service start request message, wherein the first notification message is used to notify the DU to transmit a MBMS notification message to a UE.

Step S1903: receiving a first message transmitted by the DU.

Step S1904: transmitting a MBMS service start response message to the MCE according to the first message.

Step S1905: receiving a MBMS scheduling information request message transmitted by the MCE.

Step S1906: transmitting a MBMS scheduling information response message to the MCE according to the MBMS scheduling information request message, and transmitting a MBMS control message to the DU, used for the establishing a MBMS bearer and transmitting MBMS data.

Optionally, before receiving the MBMS service start request message transmitted by the MCE, the method further includes:

receiving a F1 setup request message transmitted by the DU;

transmitting a F1 setup response message to the DU;

transmitting a M2 setup request message to the MCE, wherein the M2 setup request message includes at least one of an identifier of a base station, a cell identifier of a base station, a service area identifier (SAI) of a cell on a base station, and single-cell multicast transmission capability information of a base station;

receiving a M2 setup response message transmitted by the MCE, wherein the M2 setup response message includes configuration information of MCE with respect to a base station; and transmitting a configuration update message to the DU, wherein the configuration update message including configuration information of an MBMS control channel.

Optionally, before transmitting the MBMS service start response message to the MCE, the method further includes:

transmitting an MBMS bearer setup request to the CU-UP; and receiving the MBMS bearer setup response transmitted by the CU-UP.

An embodiment of the present application provides an MBMS transmission method, which is applied to the MCE. A schematic flowchart of the method is shown in FIG. 20. The method includes:

Step S2001: receiving a MBMS service start request message transmitted by the core network.

Step S2002: transmitting a MBMS service start request message to the CU-CP.

Step S2003: receiving a MBMS service request response message transmitted by the CU-CP.

Step S2004: transmitting a MBMS service request response message to the core network according to the MBMS service request response message, and transmitting a MBMS scheduling information request message to the CU-CP, used for establishing a MBMS bearer and transmitting MBMS data. The MBMS scheduling information request message includes at east one of the MCCH update time and the configuration information of the MBMS data channel.

An embodiment of the present application provides an MBMS transmission method, which is applied to the MCE. A schematic flowchart of the method is shown in FIG. 21. The method includes:

Step S2101: transmitting a user statistics message to the CU or CU-CP, used for determining the number of users that receives MBMS services in a cell.

Step S2102: receiving a user statistics response message transmitted by the CU or CU-CP, used for determining that the CU or CU-CP receives the user statistics message.

Step S2103: receiving a user statistics report message transmitted by the CU or CU-CP, used for establishing a MBMS bearer and transmitting MBMS data. The user statistics report message includes at least one of an identifier of a service for performing user statistics, an identifier of a SFN area, an identifier of the cell where a UE is located, and a number of users.

The technical solutions provided in the embodiments of the present application have at least the following beneficial effects:

In the separated architecture, the MBMS bearer is successfully established, the signaling data is reduced, the number of interfaces is reduced, the MBMS data transmission delay is reduced, and the MBMS data is efficiently transmitted.

The following embodiments are used to describe the MBMS transmission method in the above embodiments in a comprehensive and detailed manner:

FIG. 22 describes the process of establishing the MBMS bearer. Taking the access network including the CU and the DU as an example, the CU may decide to transmit MBMS data in a broadcast manner in a cell of multiple DUs. The broadcast method and broadcast range are both determined by the CU. The broadcast method includes a method using MBSFN or a single-cell multicast method. A F1 interface is between the CU and the DU. The method in this embodiment can also be used in other separation architectures, for example, the CU is further divided into the CU-CP and CU-UP. To establish an MBMS bearer, the CU first transmits an MBMS-related broadcast message to the UE. The broadcast message is a radio connection control (RRC) message. The broadcast message carries the configuration information of the MBMS control channel (such as the MCCH channel). When the CU receives the MBMS service start request message transmitted by the core network, the CU transmits a message notifying the UE that the service is started to the UE through the MBMS control channel. The service start message contains the service identifier and configuration information of the MBMS data channel. The UE receives the configuration information of the MCCH if the UE wants to receive the MBMS service, the UE configures the corresponding data channel, and then it can start receiving the MBMS data. Specifically, FIG. 22 includes the following steps.

Step 2201: the DU transmits a F1 setup request message to the CU.

Optionally, the F1 setup request message includes the name of the DU and information of the serving cell on the DU. The information of these cells is configured on the DU by the OAM, and these cells are ready to be activated. The cell information includes the physical layer ID of the cell (PCI) which including the cell unique ID, such as the cell unique ID(CGI), and the operator ID (PLMN ID) of the cell. The message also contains the broadcast information of the DU and the supported slice information.

Optionally, the F1 setup request also includes the service area identifier (SAI) corresponding to the cell and the MBMS synchronization area identifier of the cell, such as MBSFN Sync Area ID, which indicates that the cell has reserved some resources and has the ability to form a synchronization transmission area. When the CU determines the broadcasting range, it refers to the MBMS Sync Area ID of the cell, and determines the broadcasting area according to the synchronization transmission capability of the cell. A cell can have multiple SAIs and one MBSFN Sync Area ID, which can be configured on the DU by the OAM.

Step 2202: the CU transmits a F1 setup response message to the DU.

Optionally, the F1 setup response message includes an identifier list of activated cells. The CU decides which cells to activate. Optionally, the CU can determine the PCI of these cells, the DU receives the list, and the DU activates the corresponding cell. The F1 setup response message also contains a list of available operator IDs (PLMN Lists), and the DU saves these lists and broadcasts the received PLMN Lists in broadcast information. The F1 setup response message also contains the RRC version information and the cell direction information. The cell direction can indicate whether the cell only provides uplink data transmission, or provide only downlink data transmission, or provide both uplink and uplink data transmission. Optionally, in addition to the above information, the F1 setup response message also carries broadcast information, for example, it may include broadcast information related to MBMS. In order to support MBMS services, a broadcast message (e.g., SIB13) containing MBMS information can be defined. The broadcast information contains the broadcast information type (SIB type), broadcast message and value tag. If the type of broadcast information indicates that this is MBMS broadcast information, for example, only the broadcast type is SIB13, the DU needs to parse the broadcast message. The broadcast message mainly contains the configuration information of the synchronous MBMS control channel (MCCH) and the configuration information notified by MBMS. The configuration information of the MCCH and the configuration information notified by the MBMS need to be obtained by the DU is saved and used in subsequent processes.

Optionally, the F1 setup response also includes the SAI corresponding to the cell, and the MBMS synchronization area identifier to which the cell belongs, such as the MBSFN Sync Area ID, which indicates that the cell has reserved some resources, has the ability to form a synchronization transmission area, and the cells with the same resources are reserved. The CU can configure these cells as an MBMS synchronization transmission area. A cell can have multiple SAIs and an MBSFN synchronization area identifier, which can be configured on the CU by the OAM, and the CU transmits the response message to the DU through the F1 setup response message. The DU saves this information for use in subsequent processes.

Step 2203: the DU transmits broadcast information to the UE.

Optionally, the DU transmits the broadcast information received from the CU to the UE through an air interface. As described in step 2202, the DU may parse and save the content of the MBMS broadcast information for subsequent MBMS control processes, for example, the DU transmits an MBMS message on the corresponding MCCH.

Step 2204: the CN transmits a MBMS service start request message to the CU.

Optionally, when the core network decides to start a certain MBMS service, the core network transmits an MBMS service start request message to the CU of the access network. The MBMS service start request message contains the MBMS service identifier, such as TMGI, quality of service (QoS) information of the quality requirements of MBMS, and the service scope of MBMS. It may also include the identifier of the PDU Sessions corresponding to the MBMS, the QoS flow information contained in the PDU corresponding to the MBMS, and the QoS flow information includes the QoS Flow identifier and the quality requirements of the QoS flow. The message also contains the time when the MBMS data is started to be transmitted. The MBMS service start request message also contains the multicast address of IP multicast, source address, and a tunnel identifier. When the core network transmits data to the IP multicast group, the packet header contains the source address, the multicast address of IP multicast, and the tunnel identifier.

Step 2205: the CU transmits a notification message (a first notification message) to the DU. The CU uses this notification message to notify the DU that the MBMS notification message needs to be transmitted to the UE through the air interface, and notifies the UE that it needs to listen to the information transmitted on the MBMS control channel.

When the CU receives the MBMS service start request message, the CU needs to transmit the message to the UE through the MBMS control channel. However, the UE can be in any state. If the UE is in an idle mode, the UE does not always receive the cell. Therefore, before the CU transmits the MCCH message, the CU or DU needs to first transmit an MBMS notification message to the UE to wake up the UE. Then the UE receives the Information transmitted on the MCCH. Optionally, the MBMS notification message of the air interface is generated by the DU and transmitted to the UE. The CU needs to transmit a notification message to notify the DU to generate the MBMS notification message of the air interface and transmit it to the UE.

Optionally, the notification message of the F1 interface is used to notify the DU to transmit an MBMS notification message on the air interface, and the notification message is used to notify the UE to receive information carried on the new MBMS control information. The notification message can be used in two cases. One case is that: the service starts, the CU notifies the DU that it is necessary to transmit a notification message of the air interface to notify the UE to receive specific service information and data channel configuration on the MBMS control channel. Another case is that: to count the number of UEs, the CU notifies the DU to transmit a notification message of the air interface, and notifies the UE to receive specific user statistics information on the MBMS control channel.

Optionally, after receiving the notification message transmitted by the CU, the DU needs to transmit an MBMS notification message to the UE. The MBMS notification message of the air interface only contains limited information, for example, it only informs that a service in a certain synchronization area is about to start, but no specific service identifier is notified. After receiving the MBMS notification message, the UE receives the complete MBMS control message on the MBMS control channel, including the service identifier and configuration information of the MCCH Optionally, the notification message is a common message, and CU configuration update message of the current F1 interface can be reused or a new F1 message is defined. The notification message includes the SFN area identifier and the MCCH update time. For example, it indicates at which change period the updated MCCH message starts to be transmitted. The DU obtains the SFN area identifier, and can determine the configuration for transmitting notifications on the air interface according to the synchronization area identifier, for example, on which bit the notification indication is transmitted. The DU obtains the MCCH update time. The DU needs to transmit an MBMS notification message to the UE in one period before the MCCH update time. Or, the notification message transmitted by the CU contains the SFN area identifier and the notification message transmitting time. For example, if the transmitting time is set to a certain change period, the DU needs to transmit the MBMS notification message to the UE in the change period.

Optionally, the notification message may further include a service identifier and/or a multicast address, such as a TMGI and an address of an IGMP group of the service. This information allows the DU to join an IGMP group through IGMP and receive MBMS data through IP multicast. If the CU-UP is allowed to receive the MBMS data transmitted from the core network to the DU, or the DU uses a tunnel to receive the MBMS data transmitted by the core network, the notification message may also include the service identifier, such as TMGI.

Optionally, the notification message and the real MBMS message, such as the MBMS service start request message, may also be transmitted to the DU through a F1 message, that is, the DU is notified through the process of step 2209. At this time, step 2209 occurs before step 2206. If the transmitting of an MBMS message is used to trigger the DU to generate the MBMS notification message of the air interface, then the CU needs to transmit the MBMS message to the DU a little in advance. After receiving the MBMS message, the DU first transmits the notification message to the UE, and then the DU transmits the MBMS message to the UE. Step 2209: The CU transmits a CU configuration update message to the DU. The CU configuration update message carries an MBMS message, such as an MBMS service start request message, an MBMS message type, and/or an MCCH update time. The MBMS message type can be set as user statistics message or MBMS service start request message or MBMS area configuration message. The MBMS area configuration message contains the service identifier of the MBMS and the configuration of the MBMS transmission channel to be started. The MBMS area configuration message can be used to notify the MBMS service. The MCCH update time indicates when the updated MCCH content is transmitted. The MBMS message is transmitted through the MCCH. The MCCH update time indicates when the MBMS message is transmitted on the MCCH. The DU transmits the MBMS message to the UE at the time indicated by the MCCH update time. In addition, the message also carries the MBMS service identifier, such as TMGI. Optionally, it also contains the MBMS notification transmitting time. After receiving the message in step 2209, the DU needs to transmit an MBMS notification message to the UE first. The MBMS notification message is transmitted in the previous update period of the MCCH update time contained in step 2209 or transmitted in the time indicated by the MBMS notification transmitting time. This ensures that the UE can receive the MBMS notification message before the MCCH update message is transmitted, and then can receive the updated MCCH message. Optionally, the message of step 2209 also needs to contain the service identifier and/or multicast address, such as the TMGI and/or the address of the IGMP group of the service. These pieces of information allows the DU to join an IGMP group through IGMP and receive MBMS data through IP multicast. If the DU uses a tunnel to receive MBMS data transmitted by the core network, the notification message may also include a service identifier, such as TMGI.

Step 2206: the DU transmits a message (first message) to the CU. Optionally, the message carries the DL TNL information allocated by the DU.

Optionally, the DU may transmit a message to the CU, and the message may be a response message to the message in step 2205 above, or a separate message. The message may include information of the downlink user plane allocated by the DU, for example, it includes an IP (Internet Protocol Address) address and a tunnel identifier allocated by the DU, and the information is used to receive MBMS data transmitted by the core network. If multiple cells on the DU need to receive MBMS data, then the DU can allocate an IP address and a tunnel identifier to these cells, and these cells use the IP address and tunnel identifier to receive MBMS data. Of course, it is also possible to allocate an IP address and a tunnel identifier to each cell. The advantage of using a tunnel to receive MBMS data is that it does not require the DU to have the function of the IP layer, which reduces the complexity of the DU.

Or, the IGMP is used to receive MBMS data. The DU receives the address of the IGMP group transmitted by the CU and joins the IGMP group by using an IP IGMP join message. After joining the group, it can receive MBMS data in multicast manner. The advantage is that this manner is the same as the current MBMS service transmitting mechanism, but requires the DU to support the IP multicast function.

Step 2207: the CU transmits a MBMS service start response message to the CN. Optionally, the message carries the DL TNL information allocated by the DU.

Optionally, the CU reports a response message of the service setup request to the core network. If the tunnel is used to transmit MBMS data, the CU transmits the tunnel information allocated by the DU to the core network. The message can contain TNL information for multiple DUs, and the user plane of the core network can transmit MBMS data to the tunnel.

Step 2208: the DU transmits a MBMS notification message of the air interface to the UE.

Optionally, the DU transmits a MBMS notification message to the UE, to notify the UE to receive a message transmitted on the MBMS control channel. This step may also be performed after step 2209.

Step 2209: the CU transmits a MBMS service start request message to the DU.

Optionally, the CU transmits the MBMS service start request message to the DU through a message common to the F1 interface. For example, the CU may transmit the MBMS service start request message through the CU configuration update message of the F1 interface, or define a new F1 message. The message contains the identifier of the cell, the MBMS message, the MBMS message type, and the MCCH update time. The MBMS messages can be transmitted through the RRC container, or a MBMS message information element can be added to the message. The MBMS message type can be set as user statistics message, MBMS service start request message, or MBMS area configuration message. The time when MBMS message is transmitted on the air interface (that is, the time when the MCCH message is updated) can be set as a period change identifier, indicate from which MCCH change period to start transmitting a new content. The MCCH change period can be configured on the DU by OAM. The DU transmits the MBMS message to the UE through the MCCH channel at the time indicated by the MCCH update time.

Optionally, the MBMS message is transmitted through the MBMS control channel, such as the MBMS control channel, over the air interface. The MBMS message carries the MBMS service identifier TMGI and also the configuration information of the MCCH Since the DU needs to process the MBMS data and transmit it to the UE through the MBMS data channel after processing, it also needs to know the configuration of the MCCH The DU needs to be able to parse out the MBMS message contained in the CU configuration update message and save the MBMS data channel configuration for the use in the process of subsequent data reception.

Or, the CU transmits a MBMS scheduling information request to the DU, the message carries the MCCH update time, the MBMS area configuration message, and the MBMS area configuration message contains the MBMS service identifier TMGI and the configuration information of the data channel. The DU can parse the content therein, first transmit an MBMS notification message to the UE, and then transmit the MBMS area configuration message to the UE through the MCCH at the time indicated by the MCCH update time. The DU can also transmit an MBMS scheduling information response message to the CU.

Step 2210: the DU transmits a MBMS message to the UE.

Optionally, the DU transmits the MBMS message to the UE on the air interface. As above, the MBMS message is transmitted on the air interface through the MBMS control channel, such as the MCCH for transmission. The MBMS message carries the MBMS service identifier TMGI and also carries the configuration information of the MCCH Optionally, step 2211: the DU transmits an IGMP (Internet Group Management Protocol) join message to the core network. The MBMS data starts to be transmitted from the core network to the DU. After processing, the DU transmits data to the UE.

FIG. 23 describes the process of establishing the MBMS bearer. Taking the access network including the CU and the DU as an example, the MCE is a separate entity, and the F1 interface is between the CU and the DU. The MCE can decide to transmit MBMS data by broadcasting in multiple cells. The broadcasting method and the broadcasting scope are determined by the MCE. The broadcast method includes a method using MBSFN or a single-cell multicast method. The method in this embodiment can also be used in other separation architectures, for example, the CU is further divided into the CU-CP and CU-UP. To establish an MBMS bearer, the CU first transmits a broadcast message to the UE. The broadcast message carries the configuration information of the MBMS control channel (such as the MCCH channel). When the MCE receives the MBMS service start request message transmitted by the core network, the MCE transmits the service start request message to the UE through the MBMS control channel (such as MCCH channel). The service start request message contains the service identifier and configuration information of the MBMS data channel. The UE received the configuration information of the MCCH If the UE wants to receive the MBMS service, the UE configures the corresponding data channel, and then it can start receiving MBMS data. Specifically, FIG. 23 includes the following steps.

Step 2301: the DU transmits a F1 setup request message to the CU.

Optionally, the F1 setup request message includes the name of the DU and information of the serving cell on the DU. The information of these cells is configured on the DU by the OAM, and these cells are ready to be activated. The cell information includes the physical layer ID of the cell (PCI) which including the cell unique ID, such as the cell unique ID (CGI), and the operator ID (PLMN ID) of the cell. The message also contains the broadcast information of the DU and the supported slice information.

Optionally, the F1 setup request also includes the service area identifier (SAI) corresponding to the cell and the MBMS synchronization area identifier of the cell, such as the MBSFN Sync Area ID, which indicates that the cell has reserved some resources and has the ability to form a synchronization transmission area, and the cells with the same resources are reserved. The MCE can configure these cells as a MBMS synchronization transmission area. A cell can have multiple SAIs and one MBSFN synchronization area identifier, which can be configured on the DU by the OAM.

Step 2302: the CU transmits a F1 setup response message to the DU.

Optionally, the F1 setup response message includes an identifier list of activated cells. The CU decides which cells to activate. Optionally, the CU can determine the PCIs of these cells, the DU receives the list, and the DU activates the corresponding cell. The F1 setup response message also contains a list of available operator identifiers (PLMN Lists), and the DU saves these lists and broadcasts the received available PLMN Lists in broadcast information. The F1 setup response message also contains the RRC version information and the cell direction information. The cell direction can indicate whether the cell only provides uplink data transmission, only downlink data transmission, or both uplink and uplink data transmission.

Optionally, the F1 setup response also includes the SAI corresponding to the cell, and the MBMS synchronization area identifier to which the cell belongs, such as the MBSFN Sync Area ID, which indicates that the cell has reserved some resources and has the ability to form a synchronization transmission area, and the cells with the same resources are reserved, the CU or MCE can configure these cells as an MBMS synchronization transmission area. A cell can have multiple SAIs and an MBSFN synchronization area identifier, which can be configured on the CU by the OAM, and the CU transmits the SAIs and the MBSFN synchronization area identifier to the DU through the F1 setup response message. The DU saves this information for use in the subsequent processes.

Step 2303: the CU transmits a M2 setup request message to the MCE.

Optionally, the M2 setup request message includes the identifier of the base station, the cell identifier of the base station, and the SAI of the cell on the base station. The M2 setup request message also carries the MBSFN synchronization area identifier to which the cell belongs.

Step 2304: the MCE transmits a M2 setup response message to the CU.

Optionally, the message carries configuration information of the MCE with respect to the base station, for example, containing the configuration information of the MBMS control channel. In order to support the MBMS service, the configuration information of the MBMS control channel can be transmitted through a broadcast message, and a broadcast message (for example, SIB13) containing MBMS-related information is defined. The broadcast information contains the broadcast information type (SIB type), broadcast message and value tag. If the type of broadcast information indicates that this is a piece of MBMS broadcast information, the DU needs to parse the broadcast message. The broadcast message mainly contains configuration information of the synchronous MBMS control channel and configuration information notified by the MBMS.

Step 2305: the CU transmits a configuration update message to the DU.

Optionally, the F1 message transmitted by the CU to the DU carries configuration information of the MBMS control channel, that is, MBMS-related broadcast information. In order to support the MBMS service, the configuration information of the MBMS control channel can be transmitted through a broadcast message, and a broadcast message (for example, SIB13) containing the MBMS information is defined. The broadcast information contains the broadcast information type (SIB type), broadcast message and value tag. If the type of broadcast information indicates that this is a piece of MBMS broadcast information, the DU needs to parse the broadcast message. The broadcast message mainly contains the configuration information of the synchronous MBMS control channel and the configuration information notified by the MBMS. The configuration information notified by MBMS is saved and used in later processes.

Step 2306: the DU transmits broadcast information to the UE.

Optionally, the DU transmits the broadcast information received from the CU to the UE through the air interface.

Step 2307: the CN transmits a MBMS service start request message to the MCE.

Optionally, when the core network decides to start a certain MBMS service, the core network transmits an MBMS service start request message to the CU of the access network. The MBMS service start request message contains the service identifier of the MBMS, such as TMGI, QoS information of quality requirements of the MBMS, and the service scope of the MBMS. It may also include the identifier of the PDU Sessions corresponding to the MBMS, the QoS flow information contained in the PDU corresponding to the MBMS, and the QoS flow information includes the QoS Flow identifier and QoS information of the quality requirements of the QoS flow. The message also contains when the MBMS data started to be transmitted. The MBMS service start request message also contains the multicast address of IP multicast, source address, and a tunnel identifier. When the core network transmits data to the IP multicast group, the packet header contains the source address, the multicast address of IP multicast, and the tunnel identifier.

Step 2308: the MCE transmits a MBMS service start request to the CU.

Optionally, the MCE determines the transmission mode of the MBMS. For example, the MCE decides to transmit data in the SFN mode, and the MCE transmits a service start request to the CU. The message carries information that can indicate the transmission mode.

Step 2309: the CU transmits a notification message (first notification message) to the DU. The CU uses this notification message to notify the DU that the MBMS notification message needs to be transmitted to the UE on the air interface, and notifies the UE that it is necessary to listen to the information transmitted on the MBMS control channel.

When the CU receives the MBMS service start request message, the CU needs to transmit the message to the UE through the MBMS control channel. However, the UE can be in any state. If the UE is in an idle mode, the UE does not always receive the cell. Therefore, before the CU transmits the MCCH message, the CU or DU needs to first transmit an MBMS notification message to the UE to wake up the UE. Then the UE receives the Information transmitted on the MCCH. Optionally, the MBMS notification message of the air interface is generated by the DU and transmitted to the UE. The CU needs to transmit a notification message to notify the DU to generate the MBMS notification message of the air interface and transmit it to the UE.

Optionally, the notification message of the F1 interface is used to notify the DU to transmit an MBMS notification message on the air interface, and notify the UE to receive information carried on the new MBMS control information. The notification message can be used in two cases. One case is that: the service starts, the CU notifies the DU that it is necessary to transmit a notification message of the air interface to notify the UE to receive specific service information and data channel configuration on the MBMS control channel. Another case is that: to count the number of UEs, the CU notifies the DU to transmit a notification message of the air interface, and notifies the UE to receive specific user statistics information on the MBMS control channel.

Optionally, after receiving the notification message transmitted by the CU, the DU needs to transmit an MBMS notification message to the UE. The MBMS notification message of the air interface only contains limited information, for example, it only informs that a service in a certain synchronization area is about to start, but no specific service identifier is notified. After receiving the MBMS notification message, the UE receives the complete MBMS control message on the MBMS control channel, including the service identifier and configuration information of the MCCH Optionally, the notification message is a common message, and CU configuration update message of the current F1 interface can be reused or a new F1 message is defined. The notification message includes the SFN area identifier and the MCCH update time. For example, it indicates at which change period the updated MCCH message starts to be transmitted. The DU obtains the SFN area identifier, and can determine the configuration for transmitting notifications on the air interface according to the synchronization area identifier, for example, on which bit the notification indication is transmitted. The DU obtains the MCCH update time. The DU needs to transmit an MBMS notification message to the UE in one period before the MCCH update time. Or, the notification message transmitted by the CU contains the SFN area identifier and the notification message transmitting time. For example, if the transmitting time is set to a certain change period, the DU needs to transmit the MBMS notification message to the UE in the change period.

Optionally, the notification message may further contain a service identifier and/or a multicast address, such as a TMGI and an address of an IGMP group of the service. These information allows the DU to join an IGMP group through IGMP and receive MBMS data through IP multicast. If the CU-UP is allowed to receive the MBMS data transmitted from the core network to the DU, or the DU uses a tunnel to receive the MBMS data transmitted by the core network, the notification message may also contain the service identifier, such as TMGI.

Optionally, the DU can also be notified to start transmitting the MBMS notification message to the UE by transmitting a MBMS service start message, or the DU can be notified to start transmitting the MBMS notification message to the UE through the message in step 2316. At this time, the step 2316 occurs before step 2310. If the transmitting of an MBMS message is used to trigger the DU to generate the MBMS notification message of the air interface, the CU needs to transmit the MBMS message to the DU a little in advance. After receiving the MBMS message, the DU first transmits the notification message to the UE, and then the DU transmits the MBMS message to the UE. The CU transmits a F1 message of the DU, such as a CU configuration update message, and the message carries a MBMS message, such as a MBMS service start request message, or the type of the MBMSMBMS message and/or the MCCH update time. The MBMS message type can be set as a user statistics message or a MBMS service start request message, or MBMS scheduling information request, or MBMS area configuration message, the MBMS scheduling information request message or the MBMS area configuration message contains the MBMS service identifier and configuration of the MBMS transmission channel to be started. The scheduling information request message or the MBMS area configuration message can be used to notify that the MBMS service is started. The MCCH update time indicates when the updated MCCH content is transmitted. The MBMS message is transmitted through the MCCH. The MCCH update time indicates when the MBMS message is transmitted on the MCCH. The DU transmits the MBMS message to the UE at the time indicated by the MCCH update time. In addition, the message also carries the MBMS service identifier, such as TMGI. Optionally, it also contains the MBMS notification transmitting time. After receiving the message in step 2316, the DU needs to first transmit the MBMS notification message to the UE. The MBMS notification message is transmitted in the previous update period of the MCCH update time contained in step 2316 or transmitted in the time indicated by the notification transmitting time. This ensures that the UE can receive the MBMS notification message before the MCCH update message is transmitted, and then can receive the updated MCCH message. Optionally, the message in step 2316 also needs to contain the service identifier and/or multicast address, such as the TMGI and/or the address of the IGMP group of the service. These pieces of information allow the DU to join an IGMP group through the IGMP and receive the MBMS data through IP multicast. If the DU uses a tunnel to receive the MBMS data transmitted by the core network, the notification message may also contain a service identifier, such as TMGI.

Step 2310: the DU transmits a message (a first message) to the CU. Optionally, the message carries the DL TNL information allocated by the DU.

The DU can transmit a message to the CU. The message can be a response message to the message in the step 2309 above, or a separate message. The message may contain information of the downlink user plane allocated by the DU, for example, containing the IP address and tunnel identifier allocated by the DU, and the information is used to receive MBMS data transmitted by the core network. If multiple cells on the DU need to receive MBMS data, the DU can allocate an IP address and a tunnel identifier to these cells, and these cells use the IP address and tunnel identifier to receive MBMS data. Of course, it is also possible to allocate an IP address and a tunnel identifier to each cell. The advantage of using a tunnel to receive MBMS data is that it does not require the DU to have the function of the IP layer, which reduces the complexity of the DU.

Or, the IGMP is used to receive MBMS data. The DU receives the address of the IGMP group transmitted by the CU and joins the IGMP group by using an IP IGMP join message. After joining the group, it can receive MBMS data in multicast manner. The advantage is that this manner is the same as the current MBMS service transmitting mechanism, but requires the DU to support the IP multicast function.

Step 2311: the CU transmits a MBMS service start response message to the MCE. Optionally, the message carries the DL TNL information allocated by the DU.

Step 2312: the MCE transmits a MBMS service start response message to the CN. Optionally, the message carries the DL TNL information allocated by the DU.

Optionally, the MCE reports a response message to the service setup request to the core network. If the tunnel is used to transmit MBMS data, the MCE transmits the tunnel information allocated by the DU to the core network. The message can contain TNL information for multiple DUs, and the user plane of the core network can transmit MBMS data to the tunnel.

Step 2313: the DU transmits a MBMS notification message of the air interface to the UE.

Optionally, the DU transmits a MBMS notification message to the UE, to notify the UE to receive a message transmitted on the MBMS control channel. This step may also be performed after step 2316.

Step 2314: the MCE transmits a MBMS scheduling information request message to the CU. The MCE scheduling information contains MBMS service identifier and configuration information of the MBMS transmission channel.

Step 2315: the CU transmits a MBMS scheduling information response message to the MCE.

Step 2316: the CU transmits a MBMS message to the DU. The MBMS messages, such as MBMS scheduling information requests or MBMS area configuration messages, are carried in F1 messages transmitted by the CU to the DU.

Optionally, the CU transmits the MBMS message to the DU through a message common to the F1 interface. For example, the MBMS message can be transmitted to the DU through the CU configuration update information of the F1 interface or a new F1 message is defined. The message contains the identifier of the cell, including the MBMS message, the type of the MBMS message, and the MCCH update time. The MBMS messages can be transmitted through the RRC container, or an MBMS message information element can be added to the message. The MBMS type can be set to MBMS service start request, or user statistics message, or MBMS scheduling information request, or MBMS area configuration message. The time when MBMS message is transmitted on the air interface (that is, the time when the MCCH message is updated) can be set as a period change identifier, indicate from which MCCH change period to start transmitting a new content. The MCCH change period can be configured on the DU by OAM. The DU transmits the MBMS message to the UE through the MCCH at the time indicated by the MCCH update time.

Optionally, the MBMS message is transmitted through the MBMS control channel, such as the MBMS control channel, through the air interface. The MBMS message carries the MBMS service identifier TMGI and also the configuration information of the MCCH Since the DU needs to process the MBMS data and transmit it to the UE through the MBMS data channel after processing, it also needs to obtain the configuration of the MBMS data channel. The DU needs to be able to parse out the MBMS control message contained in the CU configuration update message and save the configuration of the MBMS data channel, for use in the subsequent data reception process.

Or, the CU transmits the MBMS scheduling information request to the DU, and the message carries the MCCH update time and the configuration information of the MBMS data channel, that is, the MBMS area configuration message, which contains the MBMS service identifier TMGI and its configuration information of the data channel. Since the final data processing is performed on the DU, the CU is not responsible for the specific data. Therefore, if the CU receives the MBMS scheduling information request message transmitted by the MCE, the CU transmits the scheduling information to the DU. As described above, the DU can parse the content therein, first transmit an MBMS notification message to the UE, and then transmit the MBMS area configuration message to the UE through the MCCH at the time indicated by the MCCH update time. The DU can also transmit an MBMS scheduling information response message to the CU.

Step 2317: the DU transmits a MBMS message to the UE.

Optionally, the DU transmits a MBMS message to the UE on the air interface. As above, the MBMS message is transmitted on the air interface through the MBMS channel, such as the MCCH. The MBMS message carries the MBMS service identifier TMGI and also carries the configuration information of the MCCH Optionally, step 2318: the DU transmits an IGMP join message to the core network. The data starts to be transmitted from the core network to the DU. After processing, the DU transmits the data to the UE.

FIG. 24 describes the process of establishing the MBMS bearer. Take the access network including the CU-CP, CU-UP and DU as an example, the MCE is a separate entity, the F1 interface is between the CU-CP and DU, and an E1 interface is between the CU-CP and CU-UP. The functions of SDAP and PDCP are implemented on the CU-UP, and other user plane functions such as RLC and MAC are implemented on the DU. The method of the embodiment can also be used in other separation architectures. To establish an MBMS bearer, the CU-CP first transmits the MBMS-related broadcast messages to the UE. The broadcast message is a radio connection control (RRC) message. The broadcast message carries the configuration information of the MBMS control channel (such as the MCCH channel). When the access network receives the message that the core network transmits an MBMS service start request, the CU of the access network transmits a message notifying the UE the start of the service to the UE through the MBMS control channel. The service start message is also an RRC message and is transmitted through the MBMS control channel to the UE. The message transmitted to the UE notifying the start of the service includes the service identifier and the configuration information of the MCCH The UE received the configuration information of the MCCH If the UE wants to receive the MBMS service, the UE configures the corresponding data channel, and then it can start receiving MBMS data. The data is transmitted by the core network to the CU-UP, and then transmitted by the CU-UP to the DU. Specifically, FIG. 24 includes the following steps.

Step 2401: the DU transmits a F1 setup request message to the CU-CP.

Optionally, the F1 setup request message includes the name of the DU and information of the serving cell on the DU. The information of these cells is configured on the DU by the OAM, and these cells are ready to be activated. The cell information includes the physical layer ID of the cell (PCI) which including the cell unique ID, such as the cell unique ID(CGI), and the operator ID (PLMN ID) of the cell. The message also contains the broadcast information of the DU and the supported slice information.

Optionally, the F1 setup request also includes the SAI corresponding to the cell and the MBMS synchronization area identifier of the cell, such as the MBSFN Sync Area ID, which indicates that the cell has reserved some resources and has the ability to form a synchronization transmission area, and the cells with the same resources are reserved. The MCE can configure these cells as an MBMS synchronization transmission area. A cell can have multiple SAIs and one MBSFN synchronization area identifier, which can be configured on the DU by the OAM. Step 2402: The CU-CP transmits an F1 setup response message to the DU.

Optionally, the F1 setup response message includes an identifier list of activated cells. The CU decides which cells to activate. Optionally, the CU-CP can determine the PCIs of these cells, the DU receives the list, and the DU activates the corresponding cell. The F1 setup response message also contains a list of available operator identifiers (PLMN Lists), and the DU saves these lists and broadcasts the received available PLMN Lists in broadcast information. The F1 setup response message also contains the RRC version information and the cell direction information. The cell direction can indicate whether the cell only provides uplink data transmission, only downlink data transmission, or both uplink and uplink data transmission.

Optionally, the F1 setup response also includes the SAI corresponding to the cell, and the MBMS synchronization area identifier to which the cell belongs, such as the MBSFN Sync Area ID, which indicates that the cell has reserved some resources and has the ability to form a synchronization transmission area, and the cells with the same resources are reserved, the CU or MCE can configure these cells as an MBMS synchronization transmission area. A cell can have multiple SAIs and an MBSFN synchronization area identifier, which can be configured on the CU by the OAM, and the CU transmits the SAIs and the MBSFN synchronization area identifier to the DU through the F1 setup response message. The DU saves this information for use in the subsequent processes.

Step 2403: the CU-CP transmits a M2 setup request message to the MCE.

Optionally, the M2 setup request message includes the identifier of the base station, the cell identifier of the base station, and the SAI of the cell on the base station. The message also carries the single-cell multicast transmission capability information of the base station, that is, the indication information of whether the base station supports single-cell multicast transmission.

Step 2404: the MCE transmits a M2 setup response message to the CU-CP.

Optionally, the message carries configuration information of the MCE with respect to the base station, for example, containing the configuration information of the MBMS control channel. In order to support the MBMS service, the configuration information of the MBMS control channel can be transmitted through a broadcast message, and a broadcast message (for example, SIB13) containing MBMS-related information is defined. The broadcast information contains the broadcast information type (SIB type), broadcast message and value tag. If the type of broadcast information indicates that this is a piece of MBMS broadcast information, the DU needs to parse the broadcast message. The broadcast message mainly contains configuration information of the synchronous MBMS control channel and configuration information notified by the MBMS.

Step 2405: the CU-CP transmits a configuration update message to the DU.

Optionally, the F1 message transmitted by the CU-CP to the DU carries configuration information of the MBMS control channel, that is, MBMS-related broadcast information. In order to support the MBMS service, the configuration information of the MBMS control channel can be transmitted through a broadcast message, and a broadcast information (for example, SIB13) containing the MBMS information is defined. The broadcast information contains the broadcast information type (SIB type), broadcast message and value tag. If the type of broadcast information indicates that this is a piece of MBMS broadcast information, the DU needs to parse the broadcast message. The broadcast message mainly contains the configuration information of the synchronous MBMS control channel and the configuration information notified by the MBMS. The configuration information of the MCCH need to be obtained by the DU and the configuration information notified by the MBMS is saved and used in later processes Step 2406: the DU transmits broadcast information to the UE.

Optionally, the DU transmits the broadcast information received from the CU-CP to the UE through the air interface.

Step 2407: the CN transmits a MBMS service start request message to the MCE.

Optionally, when the core network decides to start a certain MBMS service, the core network transmits an MBMS service start request message to the CU of the access network. The MBMS service start request message contains the service identifier of the MBMS, such as TMGI, QoS information of quality requirements of the MBMS, and the service scope of the MBMS. It may also include the identifier of the PDU Sessions corresponding to the MBMS, the QoS flow information contained in the PDU corresponding to the MBMS, and the QoS flow information includes the QoS Flow identifier and QoS information of the quality requirements of the QoS flow. The message also contains when the MBMS data started to be transmitted. The MBMS service start request message also contains the multicast address of IP multicast, source address, and a tunnel identifier. When the core network transmits data to the IP multicast group, the packet header contains the source address, the multicast address of IP multicast, and the tunnel identifier.

Step 2408: the MCE transmits a MBMS service start request to the CU-CP.

Optionally, the MCE decides the transmission mode of the MBMS. For example, the MCE decides to transmit data in the SFN mode, and the MCE forwards the service start request to the CU-CP. The message carries information that can indicate the transmission mode.

Step 2409: the CU-CP transmits a notification message (first notification message) to the DU. The CU-CP uses this notification message to notify the DU that the MBMS notification message needs to be transmitted to the UE through the air interface, and notifies the UE that it is necessary to listen to information transmitted on the MBMS control channel.

When the CU-CP receives the MBMS service start request message, the CU-CP needs to transmit this message to the UE through the MBMS control channel. However, the UE can be in any state. If the UE is in idle mode, the UE does not always receive the cell. Therefore, before the CU-CP transmits the MCCH message, the CU-CP or DU needs to first transmit an MBMS notification message to the UE to wake up the UE. Then the UE receives the information transmitted on the MCCH. Optionally, the MBMS notification message of the air interface is generated by the DU and transmitted to the UE, and the CU-CP needs to transmit a notification message to notify the DU to generate the MBMS notification message of the air interface and transmit it to the UE.

Optionally, the notification message of the F1 interface is used to notify the DU to transmit an MBMS notification message on the air interface, and notify the UE to receive information carried on the new MBMS control information. This notification message can be used in two cases. One case is that: the service starts, the CU notifies the DU that it is necessary to transmit a notification message of the air interface to notify the UE to receive specific service information and data channel configuration on the MBMS control channel. Another case is that: to count the number of UEs, the CU notifies the DU to transmit a notification message of the air interface, and notifies the UE to receive specific user statistics information on the MBMS control channel.

Optionally, after receiving the notification message transmitted by the CU-CP, the DU needs to transmit an MBMS notification message to the UE. The MBMS notification message of the air interface only contains limited information, for example, it only informs that a service in a certain synchronization area is about to start. However, the specific service identifier is not notified. After receiving the MBMS notification message, the UE receives the complete MBMS control message on the MCCH, including the service identifier and configuration information of the MCCH Optionally, the notification message is a common message, and the CU configuration update message of the current F1 interface can be reused or a new F1 message is defined. The notification message includes the SFN area identifier and the MCCH update time. For example, it indicates at which change period the updated MCCH message starts to be transmitted. The DU obtains the SFN area identifier, and can determine the configuration for transmitting notifications on the air interface according to the synchronization area identifier, such as at which bit the notification indication is transmitted. The DU gets the MCCH update time. The DU needs to transmit an MBMS notification message to the UE one period before the MCCH update time. Or, the notification message transmitted by the CU-CP contains the SFN area identifier and the notification message transmitting time. For example, if the transmitting time is set to a certain change period, the DU needs to transmit the MBMS notification message to the UE in the change period.

Optionally, the notification message may further include a service identifier and/or a multicast address, that is, the message in step 2409 notifies the service start information, such as the TMGI and the address of the IGMP group of the service. These pieces of information allows the DU to join an IGMP group through IGMP and receive the MBMS data through IP multicast. If the CU-UP is allowed to receive the MBMS data transmitted from the core network to the DU, or the DU uses a tunnel to receive the MBMS data transmitted by the core network, the notification message may also include the service identifier, such as TMGI.

Step 2410: the DU transmits a message (first message) to the CU-CP. Optionally, the message carries the DL TNL information allocated by the DU.

Optionally, the DU may transmit a message to the CU-CP, and the message may be a response message to the above 2409 message, for example, the message 2409 is a service start request message, 2410 is a service start response message, or a separate message. The message may include information of the downlink user plane allocated by the DU, for example, the IP address and tunnel identifier allocated by the DU, and the information is used to receive MBMS data transmitted by the core network. If multiple cells on the DU need to receive MBMS data, the DU can assign an IP address and a tunnel identifier to these cells, and these cells use the IP address and tunnel identifier to receive MBMS data. Of course, it is also possible to assign an IP address and a tunnel identifier to each cell. The advantage of using a tunnel to receive MBMS data is that it does not require the DU to have the function of the IP layer, which reduces the complexity of the DU.

Step 2411: the CU-CP transmits a MBMS bearer setup request to the CU-UP.

Step 2412: the CU-UP transmits a MBMS bearer setup response to the CU-CP.

Step 2413: the DU transmits a MBMS notification message of the air interface to the UE.

Optionally, the DU transmits a MBMS notification message to the UE, to notify the UE to receive a message transmitted on the MBMS control channel. This step may also be performed after step 2418.

Step 2414: the CU-CP transmits a MBMS service start response message to the MCE. Optionally, the message carries the DL TNL information allocated by the CU-UP.

Step 2415: the MCE transmits a MBMS service start response message to the CN. Optionally, the message carries the DL TNL information allocated by the CU-UP.

Optionally, the CU reports a response message to the service setup request to the core network. If a tunnel is used to transmit the MBMS data, the CU-CP transmits the tunnel information allocated by the CU-UP to the core network. The message can contain TNL information of multiple CU-UPs, and the user plane of the core network can transmit the MBMS data to the tunnel.

Step 2416: the MCE transmits a MBMS scheduling information request message to the CU-CP.

Step 2417: the CU-CP transmits a MBMS scheduling information response message to the MCE.

Step 2418: the CU-CP transmits a MBMS control message to the DU.

Optionally, the CU-CP transmits the MBMS control message to the DU through a message common to the F1 interface. For example, the CU-CP can transmit the CU configuration update message to the DU through the F1 interface, or define a new F1 message. The message contains the cell identifier and the MBMS control message, the type of the MBMS control message, and the MCCH update time. The MBMS control message can be transmitted through the RRC container, or an MBMS control message information element is added to the message. The MBMS control type can be set as a user statistics message and MBMS area configuration message. The time when the MBMS control message is transmitted on the air interface (that is, the time when the MCCH message is updated) can be set as a period change identifier, indicate from which MCCH change period to start transmitting a new content. The MCCH change period can be configured on the DU by OAM. The DU transmits the MBMS control message to the UE at the time indicated by the MCCH update time.

Optionally, the MBMS control message is transmitted through the MBMS control channel, such as the MCCH channel, on the air interface. The MBMS control message carries the MBMS service identifier TMGI and also the configuration information of the MBMS control channel. Since the DU needs to process the MBMS data and transmit it to the UE through the MBMS data channel after processing, it also needs to obtain the configuration of the MBMS data channel. The DU needs to be able to parse out the MBMS control message contained in the CU configuration update message and save the configuration of the MBMS data channel, for use in the subsequent data reception process.

Or, the CU-CP transmits a MBMS scheduling information request to the DU, and the message carries the MCCH update time, the MBMS data channel configuration information, that is, the MBMS area configuration message, which contains the MBMS service identifier TMGI and its data channel configuration information. Since the final data processing is performed on the DU, the CU is not responsible for the specific data. Therefore, if the CU receives the MBMS scheduling information request message transmitted by the MCE, the CU transmits the scheduling information to the DU. As described above, the DU can parse the content, first transmit an MBMS notification message to the UE, and then transmit the MBMS area configuration message to the UE through the MCCH channel at the time indicated by the MCCH update time. The DU can also transmit an MBMS scheduling information response message to the CU.

Step 2419: the DU transmits a MBMS control message to the UE.

Optionally, the DU transmits the MBMS control message to the UE on the air interface. As above, the MBMS control message is transmitted on the air interface through the MBMS control channel, such as the MBMS control message is transmitted through the MCCH. The MBMS control message carries the MBMS service identifier TMGI and also the MBMS data channel configuration information.

Optionally, step 2420: the DU transmits an IGMP join message to the core network. The data starts to be transmitted from the core network to the DU. After processing, the DU transmits the data to the UE.

FIG. 25 describes the process of counting the number of users for the MBMS. FIG. 25 contains the following steps.

Step 2501: the MCE transmits a user statistics message to the CU.

Optionally, the MCE decides to initiate user data statistics, and the purpose of the user statistics is to determine the number of users in a cell who receive a certain MBMS service. The MCE transmits a user statistics request message to the CU (or CU-CP, the same below). The CU (or CU-CP) counts the number of users and/or the identifier of the cell in which the user is located. The CU (or CU-CP) reports the results of the user statistics to the MCE. The MCE knows the location of the cell in which the UE is located and determine whether to use the single-cell multicast mode or the MBSFN mode. For example, many users are in the same cell or the same group of cells, and the single-cell multicast transmission manner can reduce the waste of air interface resources. At this time, it is determined that the single-cell multicast manner is used.

Step 2502: the CU transmits a user statistics request message to the DU.

Optionally, through the message newly defined by the F1 interface, the CU transmits a user statistics request message to the DU. Or, through the current CU configuration update message, the message carries a user statistics message, and the user statistics message includes the MBMS control channel MCCH update time, the SFN area identifier, and the MBMS service identifier to be counted, such as TMGI.

Step 2503: the DU transmits a user statistics response message to the CU to confirm that the message is received.

Step 2504: the CU transmits a user statistics response message to the MCE, and confirms that the message is received.

Step 2505: the DU transmits a MBMS notification message to the UE. According to the SFN area identifier contained in the message in step 2502, the DU finds the corresponding control notification resource and transmits a notification message to the UE.

Step 2506: the DU transmits a MBMS control message to the UE. The MBMS control message is for user number counting and contains an identifier of a service to be subjected to user statistics, such as TMGI.

Step 2507: the UE transmits a dedicated RRC message: a user statistics message to the CU. The UE-specific RRC message transmitted by the UE is forwarded to the CU through the DU.

Step 2508: the CU transmits a user statistics report to the MCE, and the message carries the identifier of the service to be subjected to user statistics, such as the TMGI, the SFN area identifier, the identifier of the cell where the UE is located, and the user statistics result, that is, the number of users. The number of users can be the number of users of a service in an SFN area, or the number of users in a cell.

FIG. 26 illustrates another schematic diagram of a network architecture related to the present invention. The access network includes the CU-CP, the CU-UP, and the DU. Wherein, the CU-CP and CU-UP can be on one entity, and this entity is the CU. Optionally, the DU supports the IP multicast function, and the DU can transmit an IGMP join message to the core network. The access network also contains a node MCE that is controlled centrally by the MBMS. The MCE is the CU of the MBMS. The MCE decides whether to use MBSFN (MBMS single frequency network) or the non-MBSFN to transmit data. The MBSFN is a transmission mode that: in a SFN area, all cells are on the same frequency and synchronized. Here, the SFN is also used to indicate that all cells use the same air interface resources to transmit the same MBMS data at the same time. Other name can also be used in 5G. This MCE can be a single physical node, the interface between the MCE and the non-separated base station is called as an M2 interface here. If the base station has a separate architecture, the interface between the MCE and the DU is an M2 interface, and there is no interface between the MCE and the CU-CP. If the MCE is placed on the CU-CP, then the interface between the MCE and the DU is the M2 interface, the interface between the CU-CP and the DU is the F1 interface, or an enhancement on the current F1 interface. Since the user statistics transmitted by the UE is a UE-specific RRC message, the message is transmitted to the CU-CP. Therefore, the CU-CP needs to transmit the results of the user statistics to the DU, and the DU reports to the MCE. The advantage of this is that: the interface data is reduced. When the base station is a separate base station, centralized control of MBMS is performed at the MCE, and the CU-CP does not handle the transmission control function of the MBMS service. The M2 interface can basically adopt the process of the M2 interface in LTE. The difference is that when the DU transmits the M2 setup request message, the message carries the identifier of the DU. If the non-separated base station transmits the M2 setup request message, the message carries the identifier of the base station. Another advantage is that the process of the F1 interface is also changed little, and only the process of user statistics is introduced.

FIG. 27 describes the process of counting the number of users for the MBMS of the broadcast multicast service. FIG. 27 contains the following steps.

Step 2701: the MCE transmits a user statistics message to the DU.

Optionally, the MCE decides to initiate user data statistics, and the purpose of the user statistics is to determine the number of users in a cell who receive a certain MBMS service. The MCE transmits a user statistics request message to the DU. The DU counts the number of users and/or obtains the identifier of the cell where the user is located through the CU (or CU-CP). The DU reports the results of the user statistics to the MCE. The MCE knows the location of the cell where the UE is located, obtains user data, and determines whether to use the single-cell multicast mode or use the MBSFN mode. For example, many users are in the same cell or the same group of cells, and the single-cell multicast transmission manner can reduce the waste of air interface resources. At this time, it is determined to use use the single-cell multicast manner.

Step 2702: the DU transmits a user statistics request message to the CU.

Optionally, through a message newly defined by the F1 interface, the DU transmits a user statistics request message to the CU. Or, through the current DU configuration update message, the message carries a user statistics message, and the user statistics message includes the reporting time, the identifier of the SFN area, and the service identifier of the MBMS to be counted, such as TMGI.

Step 2703: the CU transmits a user statistics response message to the DU, confirming that the message is received.

Step 2704: the DU transmits a user statistics response message to the MCE, confirming that the message is received.

Step 2705: the DU transmits an MBMS notification message to the UE. According to the SFN area identifier contained in the message in step 2701, the DU finds the corresponding control notification resource and transmits a notification message to the UE.

Step 2706: the DU transmits an MBMS control message to the UE. The MBMS control message is for user number counting and contains an identifier of a service to be subjected to user statistics, such as TMGI.

Step 2707: the UE transmits a dedicated RRC message: a user statistics message to the CU. The UE-specific RRC message transmitted by the UE is forwarded to the CU through the DU.

Step 2708: the CU transmits a user statistics report to the DU, and the message carries the identifier of the service to be subjected to user statistics, such as the TMGI, the SFN area, the identifier of the cell where the UE is located, and the user statistics result, that is, the number of users. The number of users can be the number of users of a service in an SFN area, or the number of users in a cell.

Step 2709: the DU transmits a user statistics report to the MCE, and the message carries the identifier of the service to be subjected to user statistics, such as the TMGI, the SFN area, the identifier of the cell where the UE is located, and the user statistics result, that is, the number of users. The number of users can be the number of users of a service in an SFN area, or the number of users in a cell.

Embodiment 4

Based on the same inventive concept of the first embodiment, an embodiment of the present application further provides a DU. The structure diagram of the device is shown in FIG. 28. The DU 280 includes a first processing module 2801, a second processing module 2802, and a third processing module 2803, a fourth processing module 2804, and fifth processing module 2805, wherein, the first processing module 2801 is configured to receive a first notification message transmitted by a CU;

the second processing module 2802 is configured to transmit a first message to the CU;

the third processing module 2803 is configured to transmit an MBMS notification message to the UE according to the first notification message, and the MBMS notification message is used to notify the UE to receive a message transmitted on the MBMS control channel;

the fourth processing module 2804 is configured to receive a MBMS service start request message transmitted by the CU; and the fifth processing module 2805 is configured to transmit a MBMS message to the UE, used for establishing a MBMS bearer and transmitting MBMS data.

Optionally, before receiving the first notification message transmitted by the CU, the method further includes:

transmitting a F1 setup request message to the CU;

receiving the F1 setup response message transmitted by the CU, and the F1 setup response message includes broadcast information; and transmitting broadcast information to the UE, wherein the broadcast information carries configuration information of the MBMS control channel.

Optionally, the F1 setup request message includes at least one of the following:

a name of a DU, information of a serving cell on a DU, a service area identifier (SAI) corresponding to a cell, and an MBMS synchronization area identifier of a cell.

Optionally, the F1 setup response message includes at least one of the following:

a list of activated cell identifiers, a list of available operator identifiers (PLMN List), radio resource control (RRC) version information, cell direction information, broadcast information, a service area identifier (SAI) corresponding to a cell, and MBMS synchronization area identifier to which the cell belongs.

Optionally, the broadcast information includes at least one of the following:

type of broadcast information, broadcast message, value tag, configuration information of MCCH, configuration information of MBMS notification.

Optionally, the first message includes information of a downlink user plane allocated by the DU, and the information of the downlink user plane includes at least one of an IP address and a tunnel identifier allocated by the DU; the information of downlink user plane is used to receive the MBMS data transmitted by a core network; the MBMS message includes at least one of a TMGI included in an MBMS service identifier and configuration information of an MBMS data channel.

Optionally, after transmitting the MBMS control message to the UE, the method further includes:

transmitting an IGMP join message to the core network for the core network to transmit MBMS data to the DU.

For the content that is not described in detail in the DU provided in the embodiment of the present application, reference may be made to the above-mentioned method for supporting MBMS transmission. The beneficial effects that can be achieved by the DU provided in the embodiment of the present application are the same as the abovementioned MBMS transmission method, and details are not described herein again.

The embodiments of the present application have at least the following beneficial effects:

receiving a first notification message transmitted by the CU; transmitting a first message to the CU; transmitting a MBMS notification message to the UE according to the first notification message, the MBMS notification message is used to notify the UE to receive a message transmitted on the MBMS control channel; receiving an MBMS service start request message transmitted by the CU; transmitting the MBMS message to the UE used for establishing an MBMS bearer and transmitting MBMS data. In this way, under the separated architecture, the MBMS bearer is successfully established and the MBMS data is effectively transmitted.

Based on the same inventive concept of the first embodiment, an embodiment of the present application further provides a CU. The structure diagram of the device is shown in FIG. 29. The CU 290 includes a sixth processing module 2901, a seventh processing module 2902, and an eighth processing module 2903 and a ninth processing module 2904, wherein, the sixth processing module 2901 is configured to receive an MBMS service start request message transmitted by the core network;

the seventh processing module 2902 is configured to transmit a first notification message to the DU according to the MBMS service start request message, and the first notification message is used to notify the DU to transmit the MBMS notification message to the UE; and the eighth processing module 2903 is configured to receive a first message transmitted by a DU; and the ninth processing module 2904 is configured to transmit a MBMS service start response message to the core network according to the first message and transmit a MBMS service start request message to the DU, used for establishing a MBMS bearer and transmitting MBMS data.

Optionally, before receiving the MBMS service start request message transmitted by the core network, the method further includes:

receiving the F1 setup request transmitted by the DU; and transmitting the F1 setup response to the DU, wherein the F1 setup response includes broadcast information.

Optionally, the MBMS service start request message includes at least one of the following:

a MBMS service identifier, MBMS QoS information, MBMS service scope information, PDU sessions identifier corresponding to MBMS, information of QoS flow contained in a PDU corresponding to MBMS, a multicast address, a source address, a tunnel identifier.

For the content that is not described in detail in the CU provided in the embodiment of the present application, reference may be made to the above-mentioned method for supporting MBMS transmission. The beneficial effects achieved by the CU provided in the embodiment of the present application are the same as those of the abovementioned MBMS transmission method, and are not repeated here.

The embodiments of the present application have at least the following beneficial effects:

It realizes that under the separated architecture, the MBMS bearer is successfully established and the MBMS data is effectively transmitted.

Based on the same inventive concept of the first embodiment, this embodiment of the present application also provides a CU-CP. The structure diagram of the device is shown in FIG. 30. The CU-CP 300 comprises: a tenth processing module 3001, an eleventh processing 3002, a twelfth processing module 3003, a thirteenth processing module 3004, a fourteenth processing module 3005, and a fifteenth processing module 3006, wherein, the tenth processing module 3001 is configured to receive a MBMS service start request message transmitted by a MCE;

the eleventh processing module 3002 is configured to transmit a first notification message to the DU according to the MBMS service start request message, and the first notification message is used to notify the DU to transmit the MBMS notification message to the UE;

the twelfth processing module 3003 is configured to receive a first message transmitted by a DU;

the thirteenth processing module 3004 is configured to transmit a MBMS service start response message to the MCE according to the first message;

the fourteenth processing module 3005 is configured to receive a MBMS scheduling information request message transmitted by a MCE; and the fifteenth processing module 3006 is configured to transmit a MBMS scheduling information response message to the MCE according to the MBMS scheduling information request message, and transmit a MBMS control message to the DU, used for establishing the MBMS bearer and transmitting MBMS data.

Optionally, before receiving the MBMS service start request message transmitted by the MCE, the method further includes:

receiving the F1 setup request message transmitted by the DU;

transmitting the F1 setup response message to DU;

transmitting a M2 setup request message to the MCE, wherein the M2 setup request message includes at least one of an identifier of the base station, a cell identifier of the base station, an SAI of the cell on the base station, and single-cell multicast transmission capability information of the base station;

receiving a M2 setup response message transmitted by the MCE, wherein the M2 setup response message includes configuration information of the MCE with respect to the base station; and transmitting a configuration update message to the DU, the configuration update message including configuration information of the MBMS control channel.

Optionally, before transmitting the MBMS service start response message to the MCE, the method further includes:

transmitting a MBMS bearer setup request to the CU-UP; and receiving the MBMS bearer setup response transmitted by the CU-UP.

For the content that is not described in detail in the CU-CP provided in the embodiment of the present application, reference may be made to the above-mentioned method for supporting MBMS transmission. The beneficial effects achieved by the CU-CP provided in the embodiment of the present application are the same as the above-mentioned MBMS transmission method, and are not repeated here.

The embodiments of the present application have at least the following beneficial effects:

It realizes that under the separated architecture, the MBMS bearer is successfully established and the MBMS data is effectively transmitted.

Based on the same inventive concept of the first embodiment, an embodiment of the present application also provides an MCE. The structure diagram of the device is shown in FIG. 31, and the MCE 310 includes a sixteenth processing module 3101, a seventeenth processing module 3102, an eighteenth processing module 3103 and a nineteenth processing module 3104, wherein, the sixteenth processing module 3101 is configured to receive a MBMS service start request message transmitted by a core network;

the seventeenth processing module 3102 is configured to transmit a MBMS service start request message to the CU-CP;

the eighteenth processing module 3103 is configured to receive a MBMS service request response message transmitted by the CU-CP; and the nineteenth processing module 3104 is configured to transmit a MBMS service request response message to the core network according to the MBMS service request response message, and transmit a MBMS scheduling information request message to the CU-CP used for establishing the MBMS bearer and transmitting the MBMS data. The MBMS scheduling information request message includes at least one of the MCCH update time and the configuration information of the MBMS control channel.

For the content not described in detail in the MCE provided in the embodiment of the present application, reference may be made to the above-mentioned method for supporting MBMS transmission. The beneficial effects achieved by the MCE provided in the embodiment of the present application are the same as those of the abovementioned MBMS transmission method, and will not be repeated here.

The embodiments of the present application have at least the following beneficial effects:

It realizes that under the separated architecture, the MBMS bearer is successfully established and the MBMS data is effectively transmitted.

Based on the same inventive concept of the first embodiment, an embodiment of the present application further provides a MCE. The structure diagram of the device is shown in FIG. 19. The MCE 320 includes a twentieth processing module 3201, a twenty-first processing module 3202, and a twenty-second processing module 3203, wherein, the twentieth processing module 3201 is configured to transmit user statistics messages to the CU or CU-CP, and determine the number of users that receives MBMS services in the cell;

the twenty-first processing module 3202 is configured to receive a user statistics response message transmitted by the CU or CU-CP, and confirm that the CU or CU-CP has received the user statistics message; and the twenty-second processing module 3203 is configured to receive a user statistics report message transmitted by the CU or CU-CP used for establishing a MBMS bearer and transmitting MBMS data. The user statistics report message includes at least one of an identifier of a service for performing user statistics, an identifier of an SFN area, an identifier of the cell where a UE is located, and a number of users.

For the content not described in detail in the MCE provided in the embodiment of the present application, reference may be made to the above-mentioned method for supporting MBMS transmission. The beneficial effects achieved by the MCE provided in the embodiment of the present application are the same as those of the abovementioned MBMS transmission method, and will not be repeated here.

The embodiments of the present application have at least the following beneficial effects:

It realizes that under the separated architecture, the MBMS bearer is successfully established and the MBMS data is effectively transmitted.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure can also be alternated, changed, rearranged, decomposed, combined or deleted. Further, the steps, measures and solutions of the prior art in the operations, methods and operations disclosed in the present disclosure can also be alternated, changed, rearranged, decomposed, combined or deleted.

The foregoing descriptions are merely some implementations of the present disclosure. It should be pointed out that, to those skilled in the art, various improvements and modifications can be made without departing from the principle of the present disclosure, and these improvements and modifications shall be regarded as falling into the protection scope of the present disclosure.

The invention claimed is:

1. A method for channel establishment performed by a base station in a wireless communication system, the method comprising:
   receiving, from a multi-cell multicast coordination entity (MCE), a multimedia broadcast multicast service (MBMS) statistics request message comprising at least one of information on a time for updating an MBMS control channel (MCCH), an identifier of a single-frequency network (SFN) area, or an identifier of MBMS service to be performed with statistics;
   transmitting, to the MCE, an MBMS statistics report comprising information on a number of user equipments (UEs) receiving MBMS in a cell of the base station;
   receiving, from the MCE, a point-to-point establishment request message; and
   transmitting, to a core network, a bearer establishment request message in accordance with the point-to-point establishment request message,
   wherein the point-to-point establishment request message is used to indicate establishment of a point-to-point channel for transmission of the MBMS, and the point-to-point establishment request message comprises at least one of an MBMS service identifier or a protocol data unit (PDU) session identifier.

2. The method of claim 1, further comprising:
   transmitting, to the MCE, an MBMS statistics response message, to confirm that the base station has received the MBMS statistics request message from the MCE;
   transmitting, to a UE, the MBMS statistics request message; and
   receiving, from the UE, an MBMS statistics response message, to confirm that the UE has received the MBMS statistics request message from the base station.

3. The method of claim 1, further comprising:
   receiving, from the core network, a PDU session establishment request message; and
   establishing the point-to-point channel,
   wherein the PDU session establishment request message comprises at least one of the MBMS service identifier or the PDU session identifier, and the MBMS service identifier or the PDU session identifier is used to convert an MBMS bearer from point-to-multipoint transmission to point-to-point transmission.

4. The method of claim 1, wherein transmitting, to the core network, the bearer establishment request message comprises at least one of the following:
   transmitting, to the core network, the bearer establishment request message through a signaling bearer that has been established with the core network in case that a UE is in a connection mode;
   establishing a radio resource control (RRC) connection between the base station and the UE;
   transmitting, to the core network, the bearer establishment request message, in case that the UE is in an idle mode;
   transmitting, an MBMS control signaling, the MBMS control signaling being used to indicate establishing an RRC connection between the base station and the UE, in case that the UE is in the idle mode; and
   transmitting, to the core network, the bearer establishment request message.

5. A method for channel establishment performed by a multi-cell multicast coordination entity (MCE) in a wireless communication system, the method comprising:
   transmitting, to a base station, a multimedia broadcast multicast service (MBMS) statistics request message comprising at least one of information on a time for updating an MBMS control channel (MCCH), an identifier of a single-frequency network (SFN) area, or an identifier of MBMS service to be performed with statistics;
   receiving, from the base station, an MBMS statistics report comprising information on a number of user equipments (UEs) receiving MBMS in a cell of the base station; and
   transmitting, to the base station, a point-to-point establishment request message,
   wherein a bearer establishment request message is transmitted to a core network in accordance with the point-to-point establishment request message, and
   wherein the point-to-point establishment request message is used to indicate establishment of a point-to-point channel for transmission of the MBMS, and the point-to-point establishment request message comprises at least one of an MBMS service identifier, or a protocol data unit (PDU) session identifier.

6. A base station in a wireless communication system, the base station comprising:
   a transceiver; and
   at least one controller coupled with the transceiver and configured to:
      receive, from a multi-cell multicast coordination entity (MCE) via the transceiver, a multimedia broadcast multicast service (MBMS) statistics request message comprising at least one of information on a time for updating an MBMS control channel (MCCH), an identifier of a single-frequency network (SFN) area, or an identifier of MBMS service to be performed with statistics, transmit, to the MCE via the transceiver, an MBMS statistics report comprising information on a number of user equipments (UEs) receiving MBMS in a cell of the base station, receive, from the MCE via the transceiver, a point-to-point establishment request message, and transmit, to a core network via the transceiver, a bearer establishment request message in accordance with the point-to-point establishment request message, wherein the point-to-point establishment request message is used to indicate establishment of a point-to-point channel for transmission of the MBMS, and the point-to-point establishment request message comprises at least one of an MBMS service identifier or a protocol data unit (PDU) session identifier.

7. A multi-cell multicast coordination entity (MCE) in a wireless communication system, the MCE comprising:

a transceiver; and at least one controller coupled with the transceiver and configured to:

transmit, to a base station via the transceiver, a multimedia broadcast multicast service (MBMS) statistics request message comprising at least one of information on a time for updating an MBMS control channel (MCCH), an identifier of a single-frequency network (SFN) area, or an identifier of MBMS service to be performed with statistics, receive, from the base station via the transceiver an MBMS statistics report comprising information on a number of user equipments (UEs) receiving MBMS in a cell of the base station, and transmit, to the base station via the transceiver, a point-to-point establishment request message, wherein a bearer establishment request message is transmitted to a core network in accordance with the point-to-point establishment request message, and wherein the point-to-point establishment request message is used to indicate establishment of a point-to-point channel for transmission of the MBMS, and the point-to-point establishment request message comprises at least one of an MBMS service identifier or a protocol data unit (PDU) session identifier.

8. The method of claim 5, further comprising:

receiving, from the base station, an MBMS statistics response message, to confirm that the base station has received the MBMS statistics request message from the MCE.

9. The method of claim 5, wherein a PDU session establishment request message comprises at least one of the MBMS service identifier or the PDU session identifier, and the MBMS service identifier or the PDU session identifier is used to convert an MBMS bearer from point-to-multipoint transmission to point-to-point transmission.

10. The method of claim 5, wherein a radio resource control (RRC) connection between the base station and a UE is established.

11. The base station of claim 6, wherein the at least one controller is further configured to:

transmit, to the MCE, an MBMS statistics response message, to confirm that the base station has received the MBMS statistics request message from the MCE, transmit, to a UE, the MBMS statistics request message, and receive, from the UE, an MBMS statistics response message, to confirm that the UE has received the MBMS statistics request message from the base station.

12. The base station of claim 6, wherein the at least one controller is further configured to:

receive, from the core network, a PDU session establishment request message, and establish the point-to-point channel, wherein the PDU session establishment request message comprises at least one of the MBMS service identifier or the PDU session identifier, and the MBMS service identifier or the PDU session identifier is used to convert an MBMS bearer from point-to-multipoint transmission to point-to-point transmission.

13. The base station of claim 6, wherein the at least one controller is further configured to:

transmit, to the core network, the bearer establishment request message through a signaling bearer that has been established with the core network in case that a UE is in a connection mode, establish a radio resource control (RRC) connection between the base station and the UE, transmit, to the core network, the bearer establishment request message, in case that the UE is in an idle mode, transmit, an MBMS control signaling, the MBMS control signaling being used to indicate establishing an RRC connection between the base station and the UE, in case that the UE is in the idle mode, and transmit, to the core network, the bearer establishment request message.

14. The MCE of claim 7, wherein the at least one controller is further configured to:

receive, from the base station, an MBMS statistics response message, to confirm that the base station has received the MBMS statistics request message from the MCE.

15. The MCE of claim 7, wherein a PDU session establishment request message comprises at least one of the MBMS service identifier or the PDU session identifier, and the MBMS service identifier or the PDU session identifier is used to convert an MBMS bearer from point-to-multipoint transmission to point-to-point transmission.

16. The MCE of claim 7, wherein a radio resource control (RRC) connection between the base station and a UE is established.

* * * * *